United States Patent [19]
Bartlett et al.

[11] Patent Number: 5,871,389
[45] Date of Patent: Feb. 16, 1999

[54] CONTROL OF 2-AXIS MACHINE TOOL

[76] Inventors: Christopher David Bartlett, 6 Thornhill Road, Keighley, West Yorkshire, United Kingdom, BD20 6SS; Michael Laycock, 9 Newlands Drive, Cross Hills-Keighley, United Kingdom, BD20 7DH; Peter Brian Leadbeater, 26 Blackthorn Grove, Woburn Sands, Milton Keynes, Bucks, United Kingdom, MK17 8PZ

[21] Appl. No.: 586,814
[22] PCT Filed: Aug. 1, 1994
[86] PCT No.: PCT/GB94/01664
  § 371 Date: Jan. 26, 1996
  § 102(e) Date: Jan. 26, 1996
[87] PCT Pub. No.: WO95/03921
  PCT Pub. Date: Feb. 9, 1995

[30] Foreign Application Priority Data

Jul. 30, 1993 [GB] United Kingdom .................. 9315843

[51] Int. Cl.[6] .................................................. B24B 49/00
[52] U.S. Cl. ................................. 451/5; 451/9; 451/11; 451/242; 451/246
[58] Field of Search ................................ 451/5, 8, 9, 10, 451/11, 242, 246

[56] References Cited

U.S. PATENT DOCUMENTS 4,219,974  9/1980  Schmidt .
4,512,110  4/1985  Stump .
4,686,796  8/1987  Giebmanns .

FOREIGN PATENT DOCUMENTS 395576    10/1990  European Pat. Off. .
3613755    4/1986  Germany .
2143756    2/1985  United Kingdom .
2255636   11/1992  United Kingdom .
WO91/12111  8/1991  WIPO .

Primary Examiner—Eileen P. Morgan
Attorney, Agent, or Firm—Morris I. Pollack

[57] ABSTRACT

A CNC cylindrical grinding machine comprising a bed, a worktable movable relative to the bed along a linear path, wheelhead movable in a direction generally perpendicular to the direction of worktable travel, a rotatable grinding wheel mounted thereon for engagement with a workpiece mounted on the worktable, wheel drive means on the wheelhead for rotating the grinding wheel, headstock and tailstock means carried by the worktable for supporting a workpiece at its opposite ends, drive means associated with the headstock and tailstock means for rotating the workpiece, worktable drive means for effecting movement of the worktable relative to the bed and therefore the wheelhead, wheelhead drive means for effecting movement of the wheelhead and therefore the grinding wheel towards and away from the workpiece, control means by which all of the drive means and particularly the worktable and wheelhead drive means, are controlled, thereby to enable the workpiece to be positioned axially and rotationally relative to the grinding wheel, and to move the grinding wheel into engagement with the workpiece, further comprising transducer means for generating position and speed of rotation signals from at least the worktable and the wheelhead, and the headstock drive, for supply to the said control means, thereby to enable complex shapes and forms to be ground in the surface of the workpiece.

9 Claims, 60 Drawing Sheets

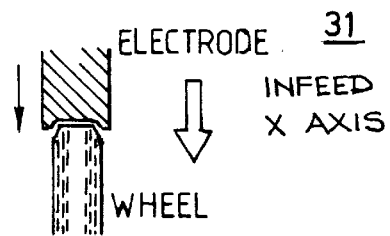
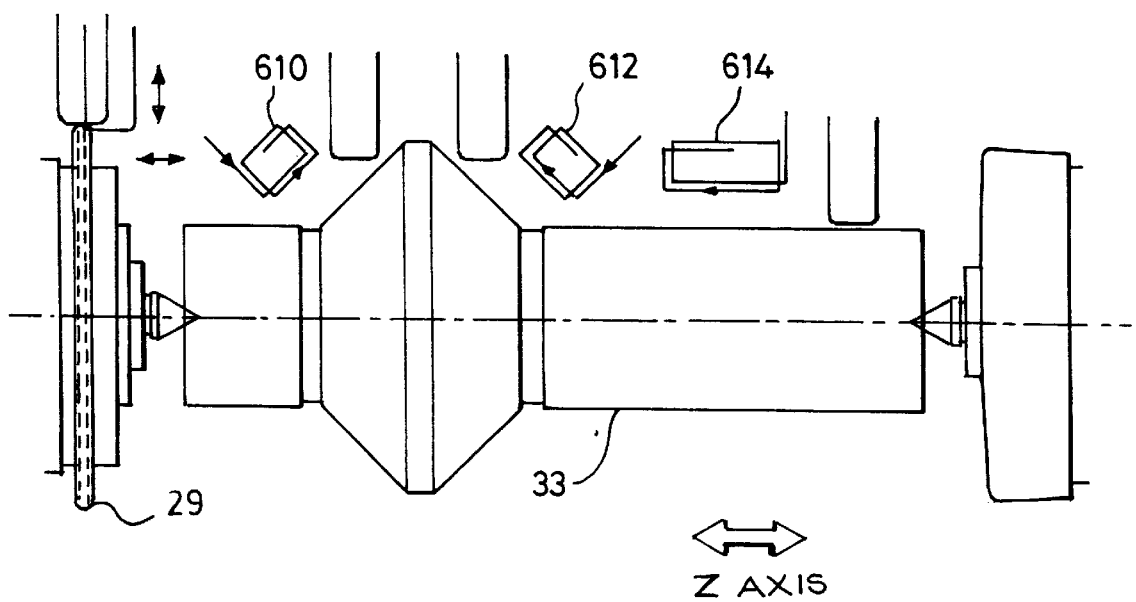
Fig. 16
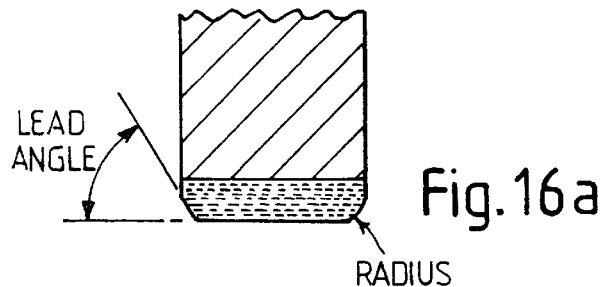
Fig. 16a

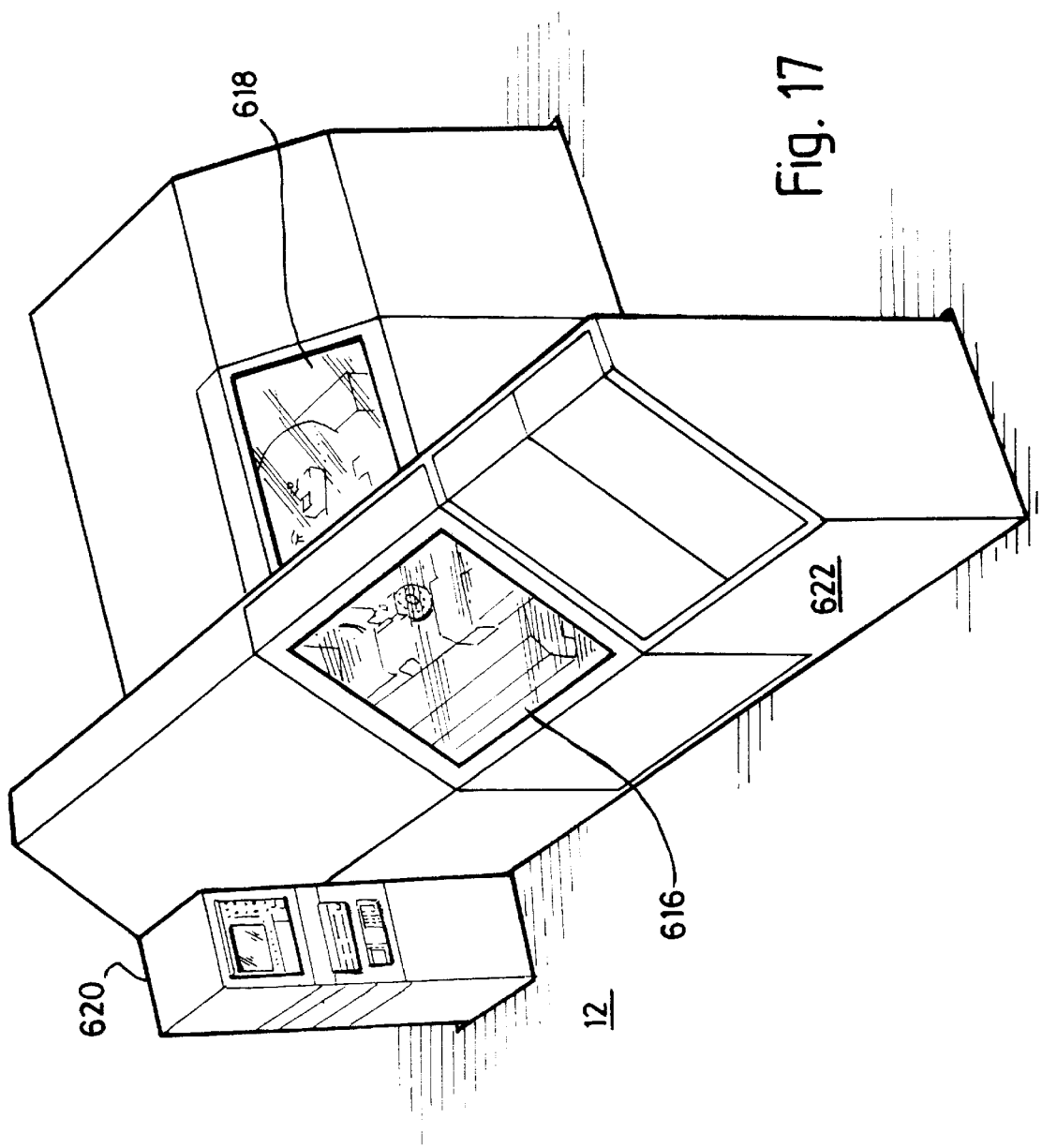

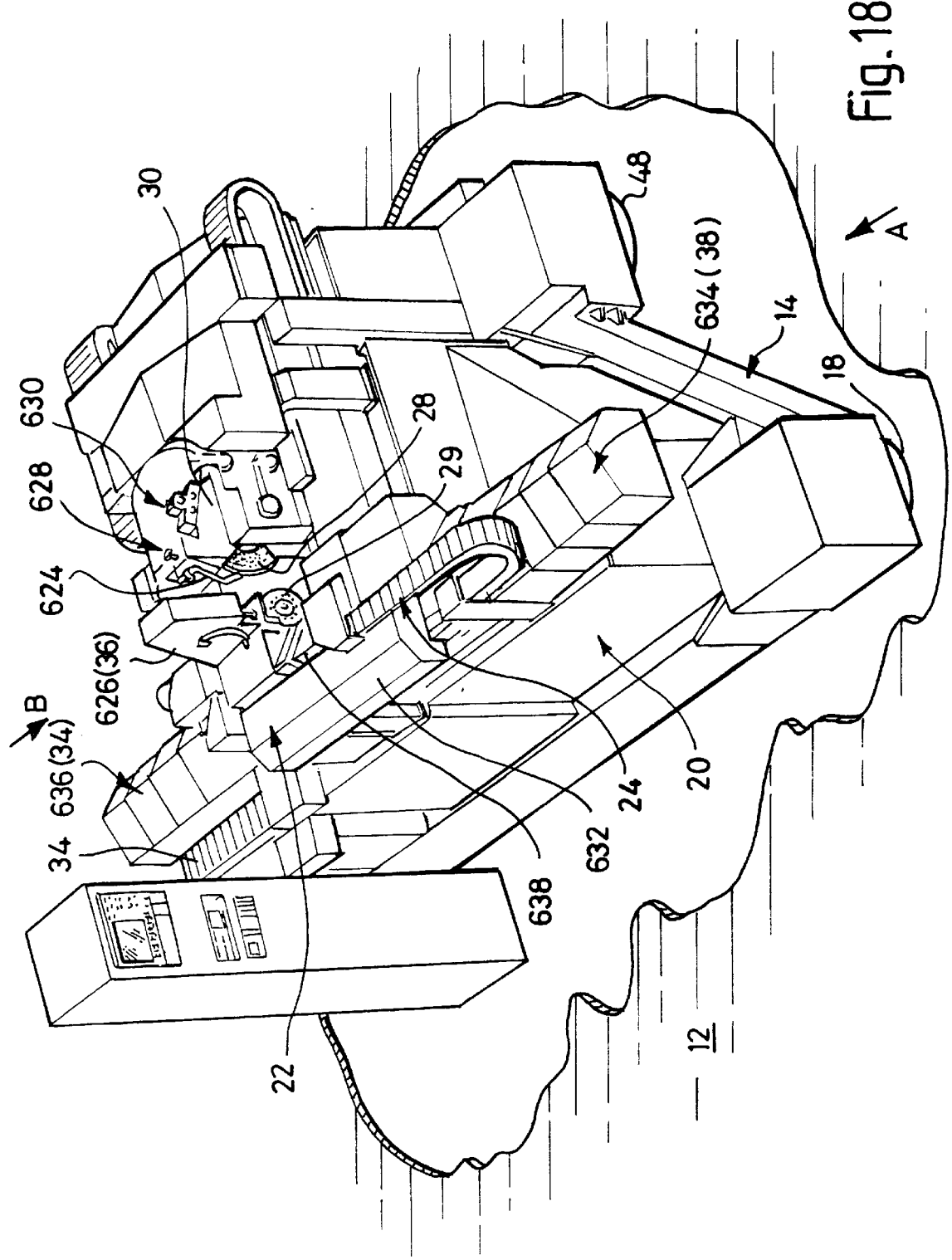

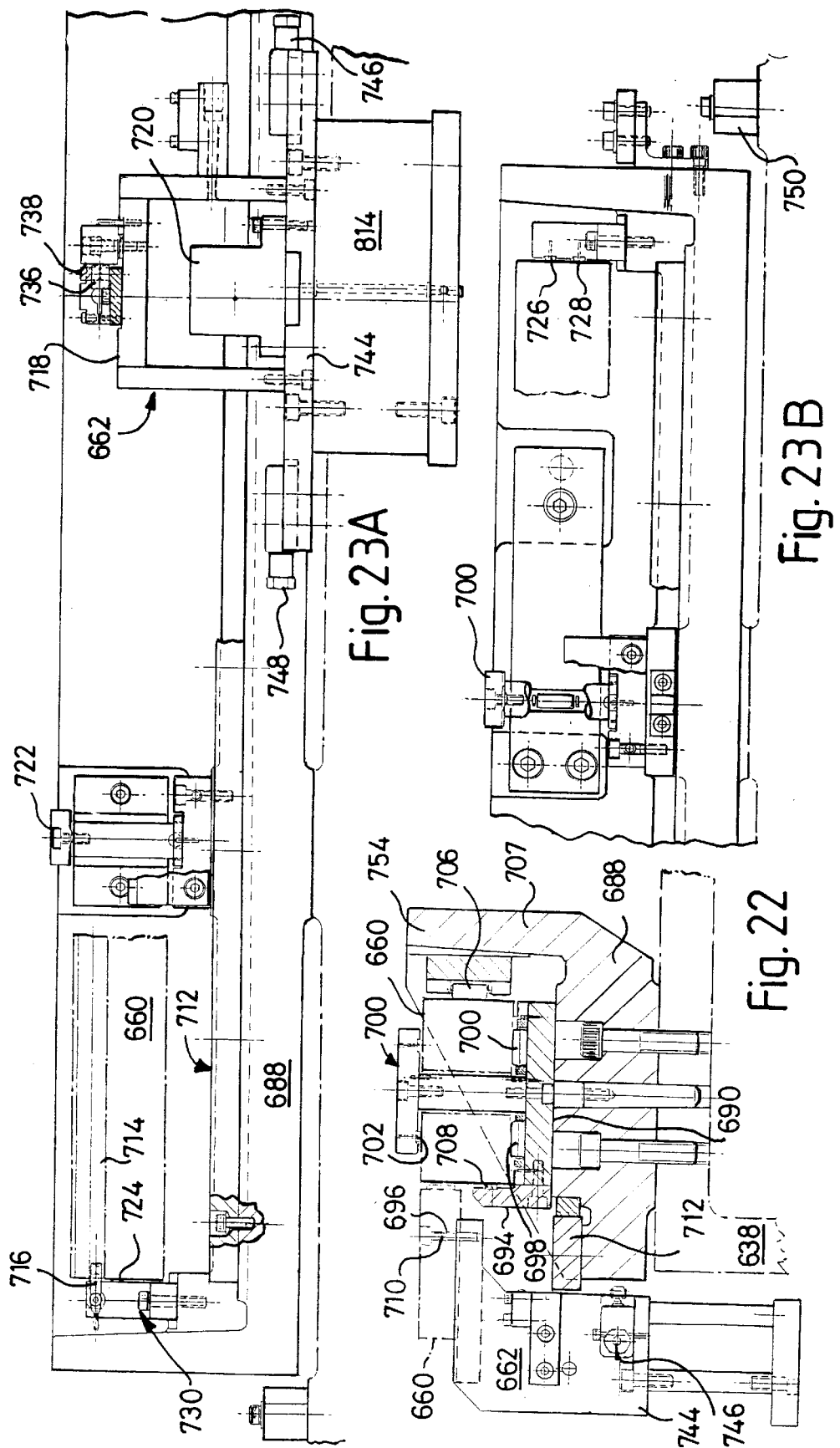

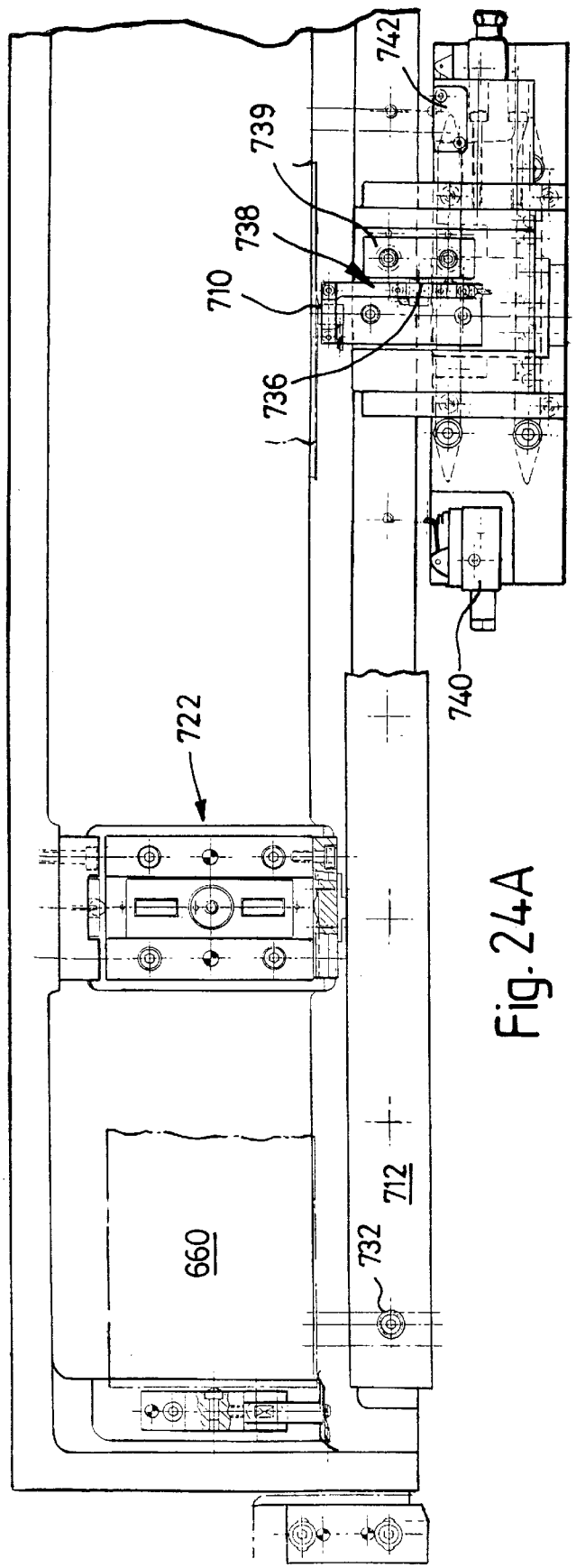

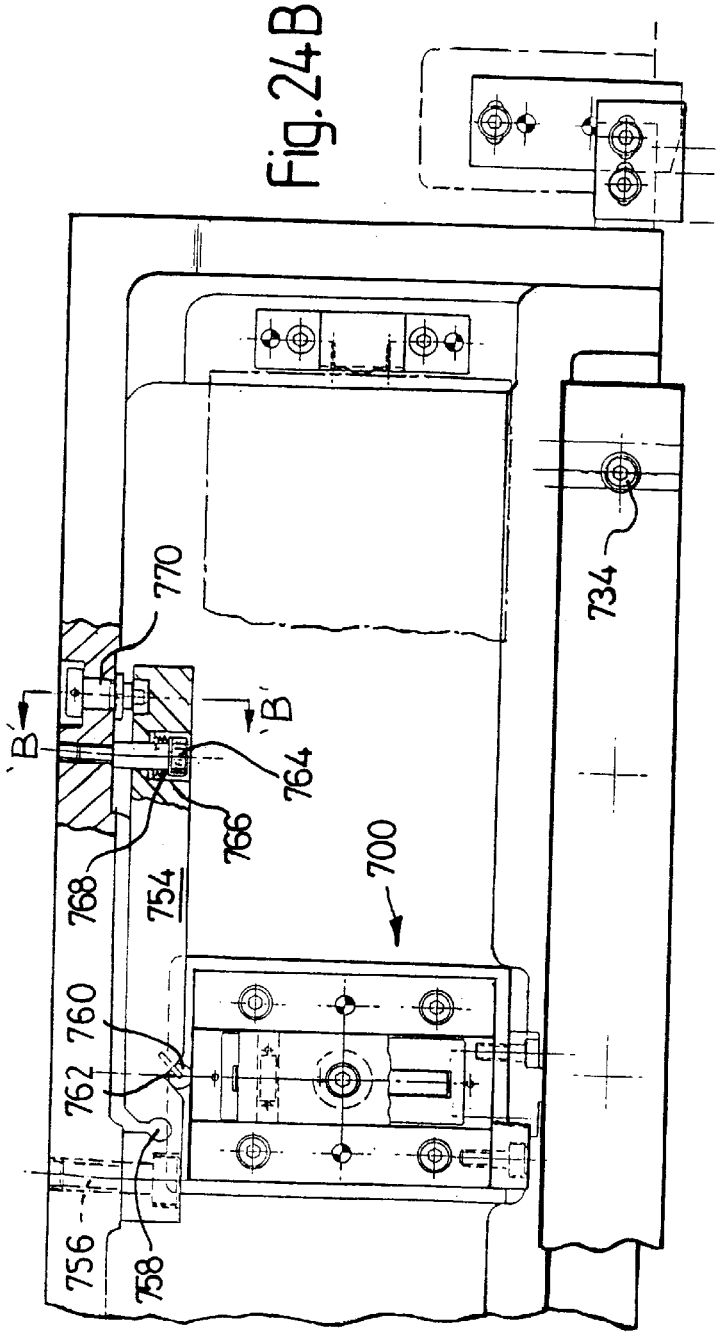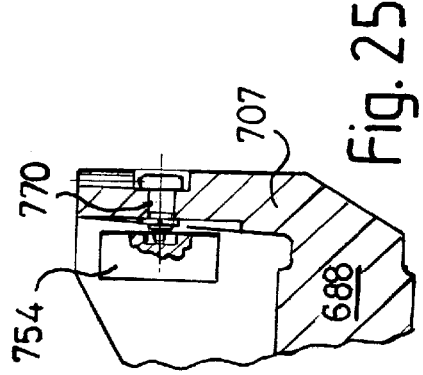

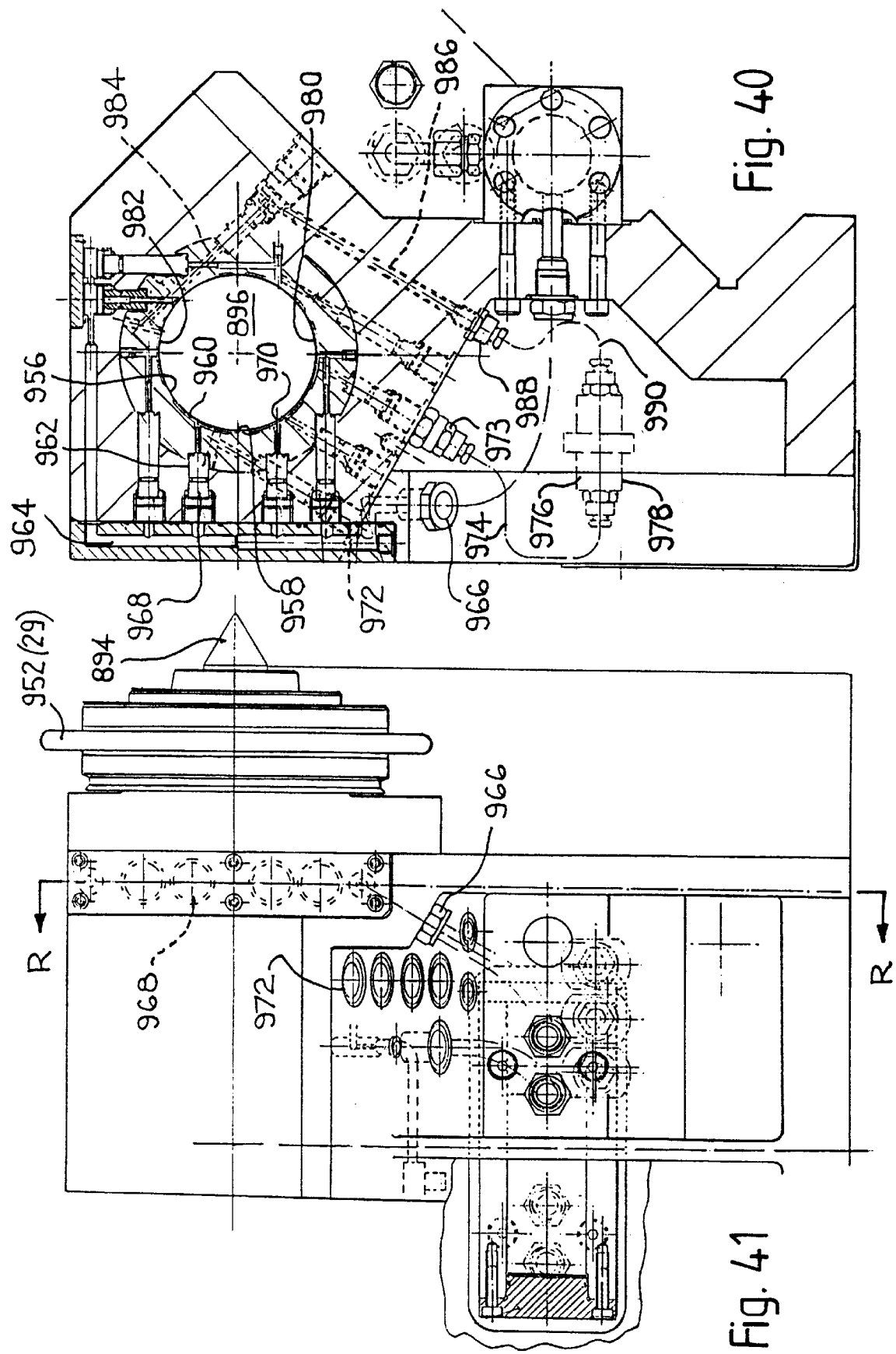

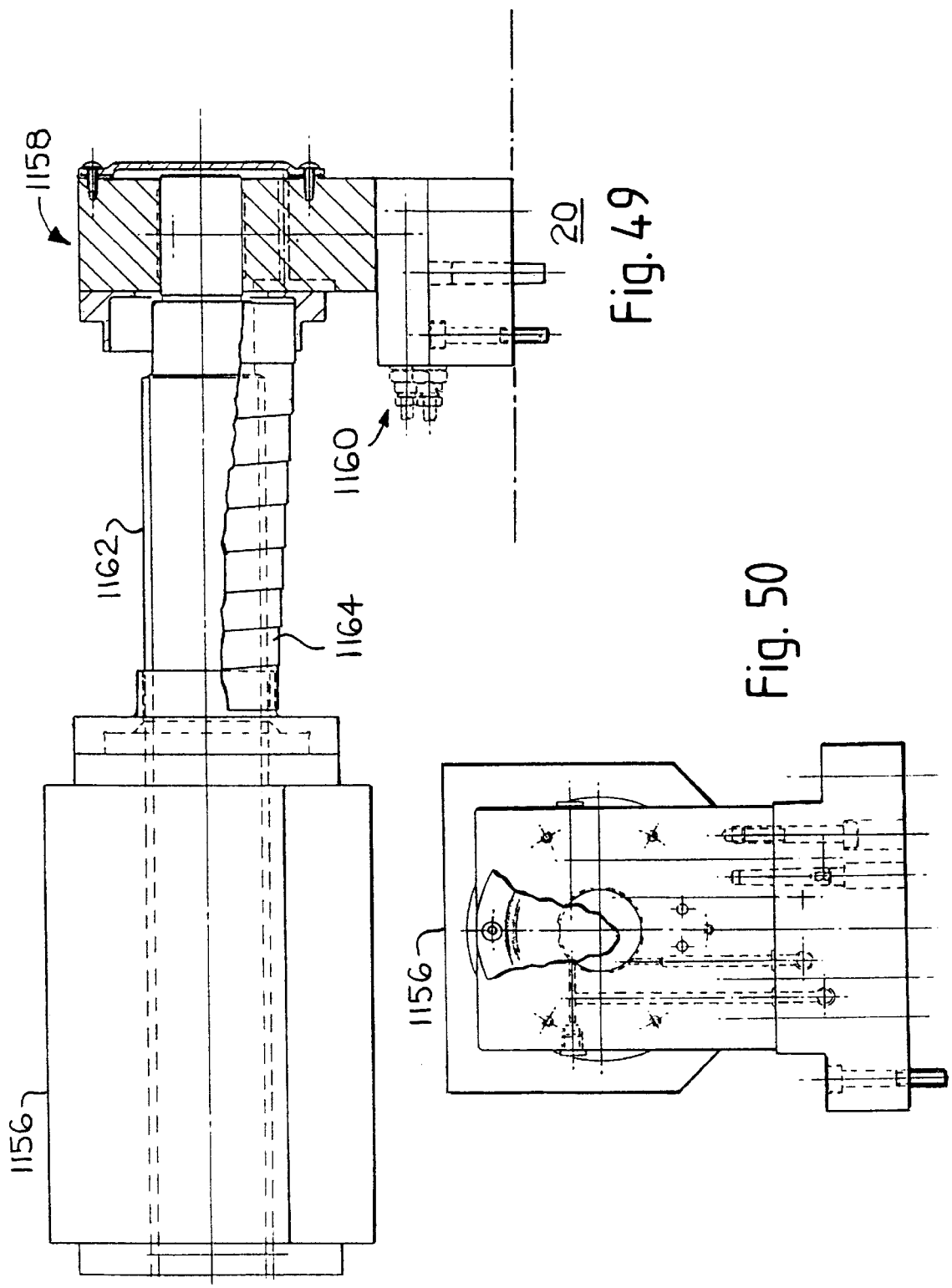

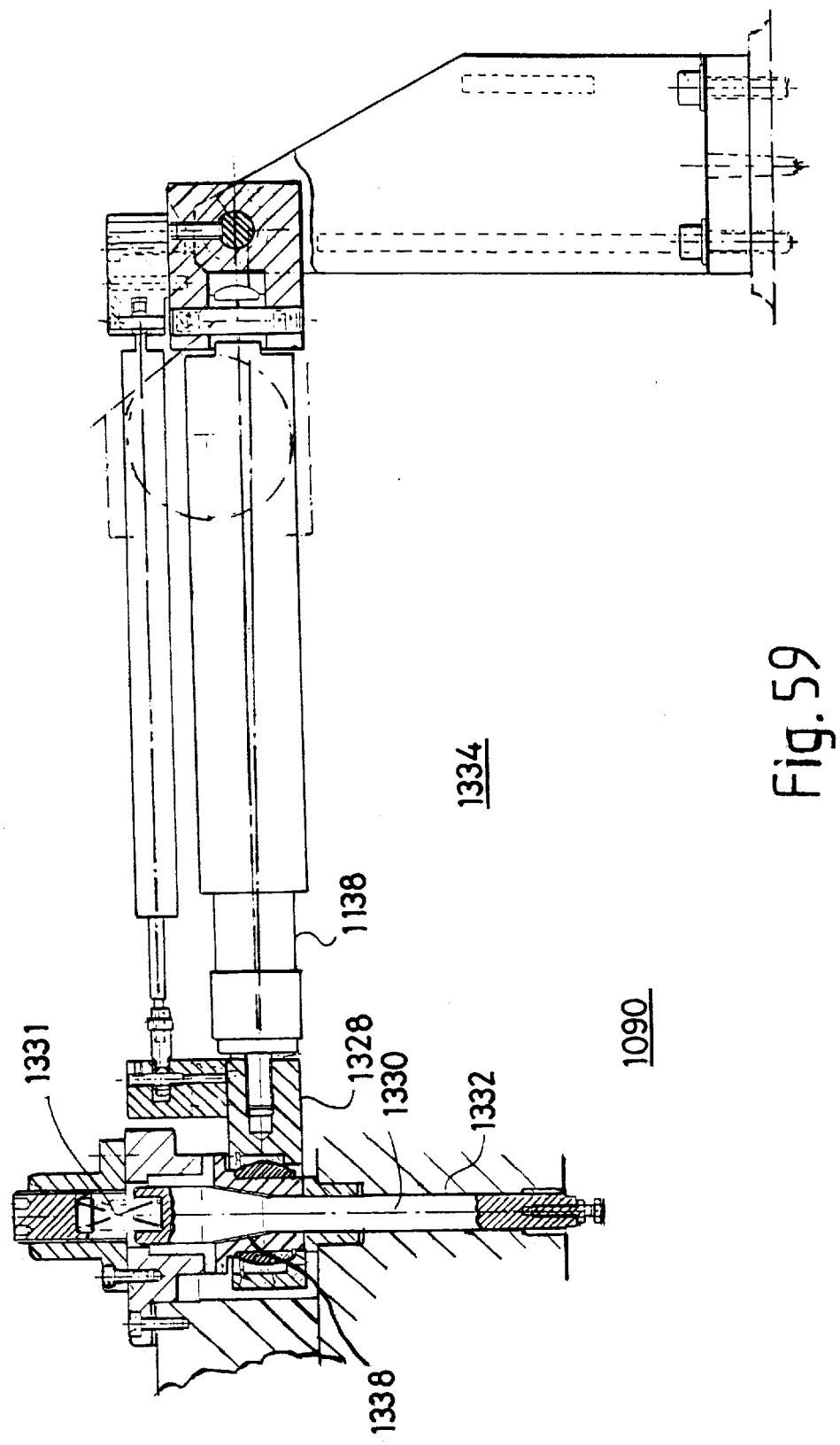

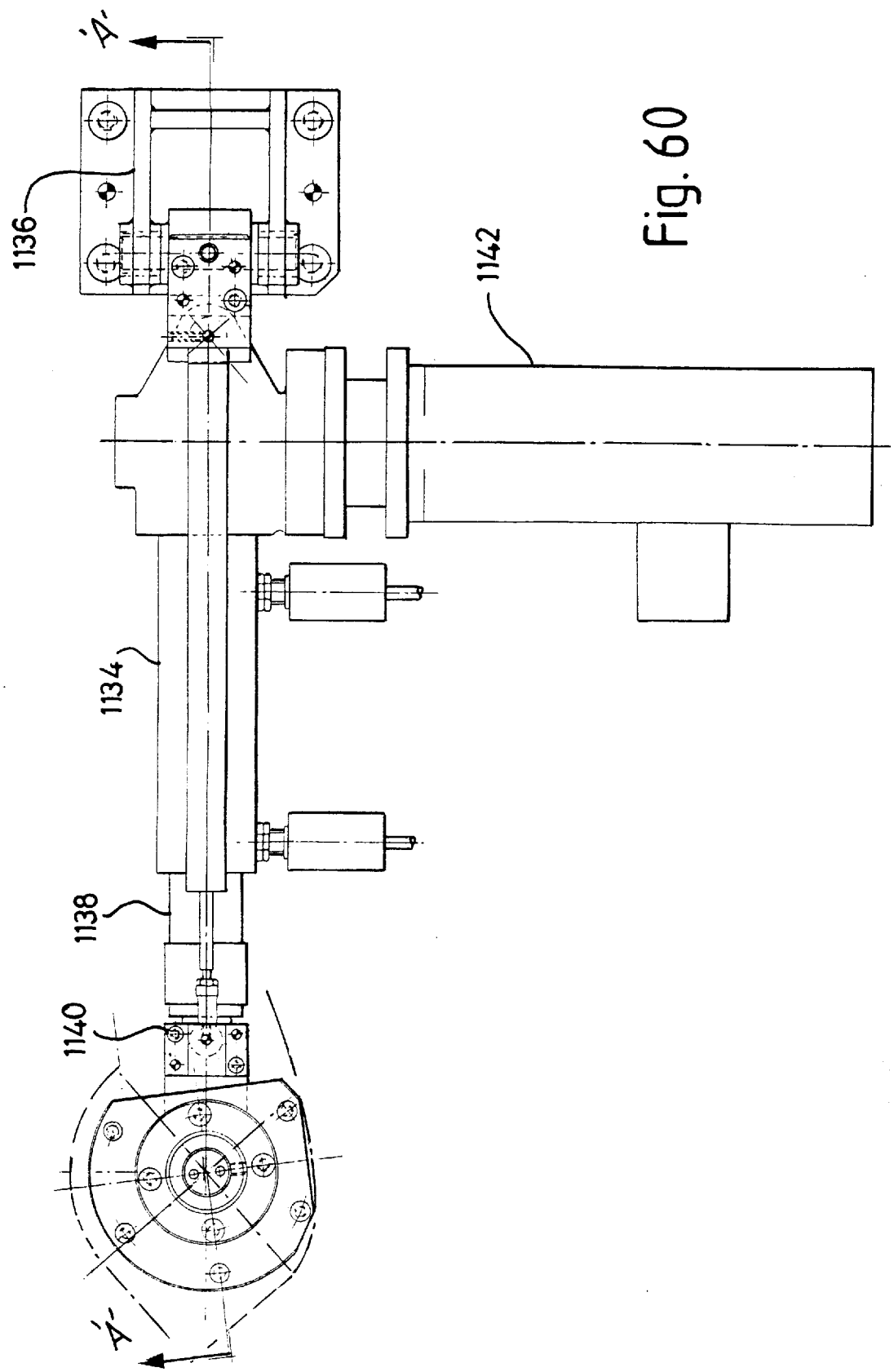

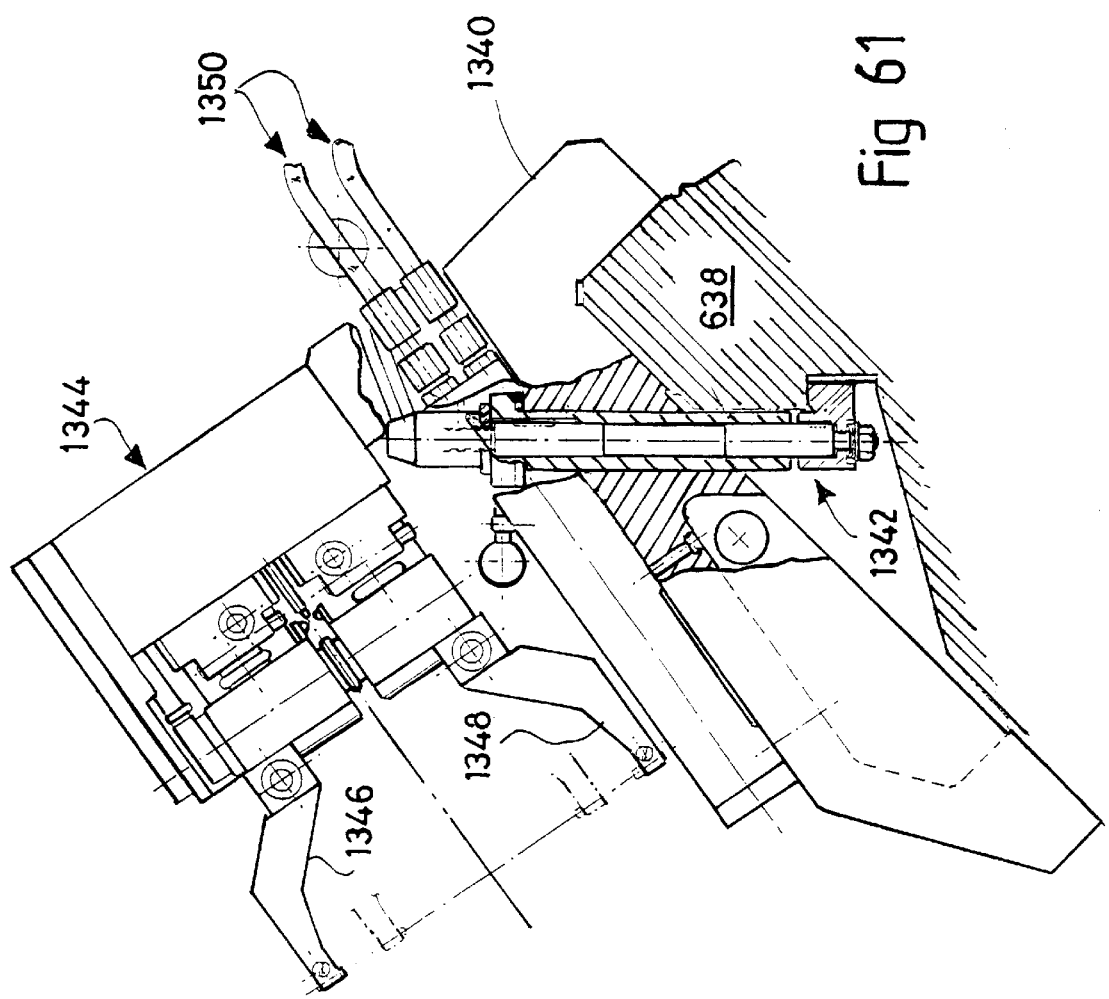

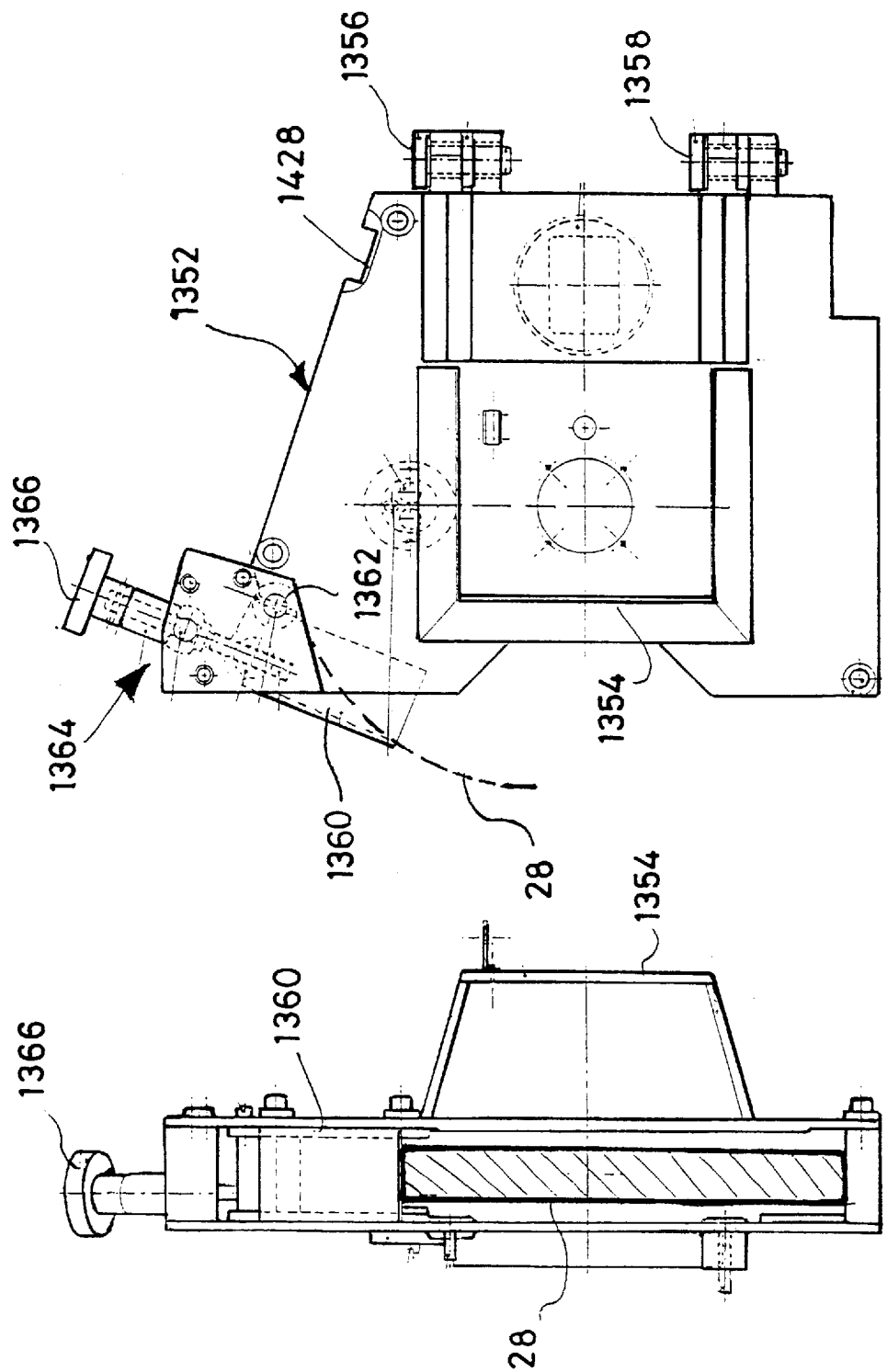

CONTROL OF 2-AXIS MACHINE TOOL

FIELD OF THE INVENTION

This invention concerns machine tools particularly apparatus for grinding piece parts and other components to a very high accuracy, particularly but not exclusively components which have complex shapes and forms.

BACKGROUND OF THE INVENTION

Due to forces exerted on a workpiece, the worktable and workpiece supporting structures of such machines, distortions and misalignments occur. These result in inaccuracies in the dimensions and shape of the final machined article.

Where the dimensional errors are of the same order as the accuracy to which the article is to be machined it is impossible reliably to machine the article.

Distortions misalignments and other error producing effects which can arise amd tend to be cumulative must therefore be reduced to a level which is such that the magnitude of the cummulative error in the final article is much less than the error which can be permitted therein.

One of the primary controlling parameters in a machining operation is the accuracy with which the workpiece position relative to a machining tool is known. This parameter has been addressed and solutions proposed in our co-pending applications No (our references C421.01/L, C422.01/L,) filed concurrently herewith.

It is an object of the present invention to provide a system and method of operation of such a machine by which complex shapes and forms can be machined (typically by way of grinding) thereby to take advantage of the high accuracy now available when using such a machine.

The invention is of particular relevance to a cylindrical grinding machine.

SUMMARY OF THE INVENTION

This invention relates to a machine tool comprising a machine frame, a workpiece carrier on the frame, a workhead assembly carried by the workpiece carrier and including a tailstock drive, said workhead assembly and said tailstock assembly being carried by said workpiece carrier for coaction with each other to mount therebetween workpieces for machining and to drive such workpieces about a predetermioned work axis, a worktool carried by said machine frame for movement towards and away from said work axis and so as to coact with a workpiece when disposed thereat, to machine said workpiece, a worktool drive for said worktool, and control means for controlling said workhead drive, said tailstock drive and said worktool drive to effect machining of predetermined forms.

In particular the invention concerns a CNC cylindrical grinding machine comprising a bed, a worktable movable relative to the bed along a linear path, a wheelhead movable in a direction generally perpendicular to the direction of worktable travel, a rotatable grinding wheel mounted thereon for engagement with a workpiece mounted on the worktable, wheel drive means on the wheelhead for rotating the grinding wheel, headstock and tailstock means carried by the worktable for supporting a workpiece at its opposite ends, drive means associated with the headstock and tailstock means for rotating the workpiece, worktable drive means for effecting movement of the worktable relative to the bed and therefore the wheelhead, wheelhead drive means for effecting movement of the wheelhead and therefore the grinding wheel towards and away from the workpiece, control means by which all of the drive means and particularly the worktable and wheelhead drive means, are controlled, thereby to enable the workpiece to be positioned axially and rotationally relative to the grinding wheel, and to move the grinding wheel into engagement with the workpiece, further comprising transducer means for generating position and speed of rotation signals from at least the worktable and the wheelhead, and the headstock drive, for supply to the said control means, thereby to enable complex shapes and forms to be ground in the surface of the workpiece.

Preferably the transducer means for determining the linear position of the worktable along its traverse comprises a linear scale and a reading head associated therewith.

Preferably the transducer for determining the linear position of the wheelhead along its traverse comprises a linear scale and an optical reading head associated therewith.

Preferably the transducer associated with the rotational drives, particularly the headstock drive comprises a tachometer.

Conveniently the machine further comprises means for detecting any shift in the position of the worktable in a direction perpendicular to the direction of traverse thereof and produced for example by yaw or roll of the table, together with means for associating any such detected shift with the measurement of the position of the wheelhead in the same direction so as to compensate for lateral shift produced for example by roll or yaw of the worktable and enable the drive to the wheelhead to be adjusted thereby to position the wheelhead so as to take any such shift into account.

The invention will now be described with reference to the accompany drawings:

FIGS. 12 to 16 illustrate different grinding techniques

FIG. 17 is a perspective view of the grinding machine of FIGS. 1 to 3 with all the covers in place and with the controller cabinet 620 in place;

FIG. 18 is a similar view to that of FIG. 17, with some of the covers removed;

FIG. 22 is a cross-section (on line AA, see FIG. 23B) through the assembly which is bolted to the top right hand corner of the casting of FIG. 21, and which contains the ceramic straight edge for accurately delivering the X-axis position of the worktable relative to the machine frame, and the grating for determining the Z axis position of the worktable relative to the machine frame;

Figure 27:
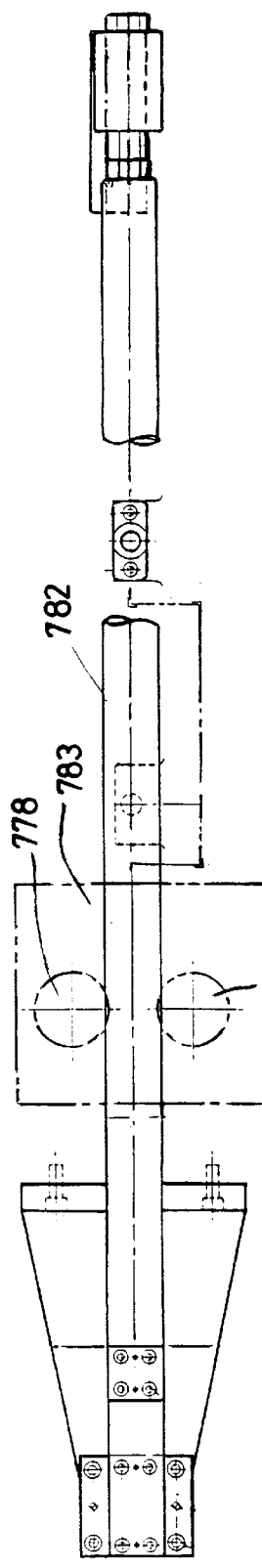
Figure 26:
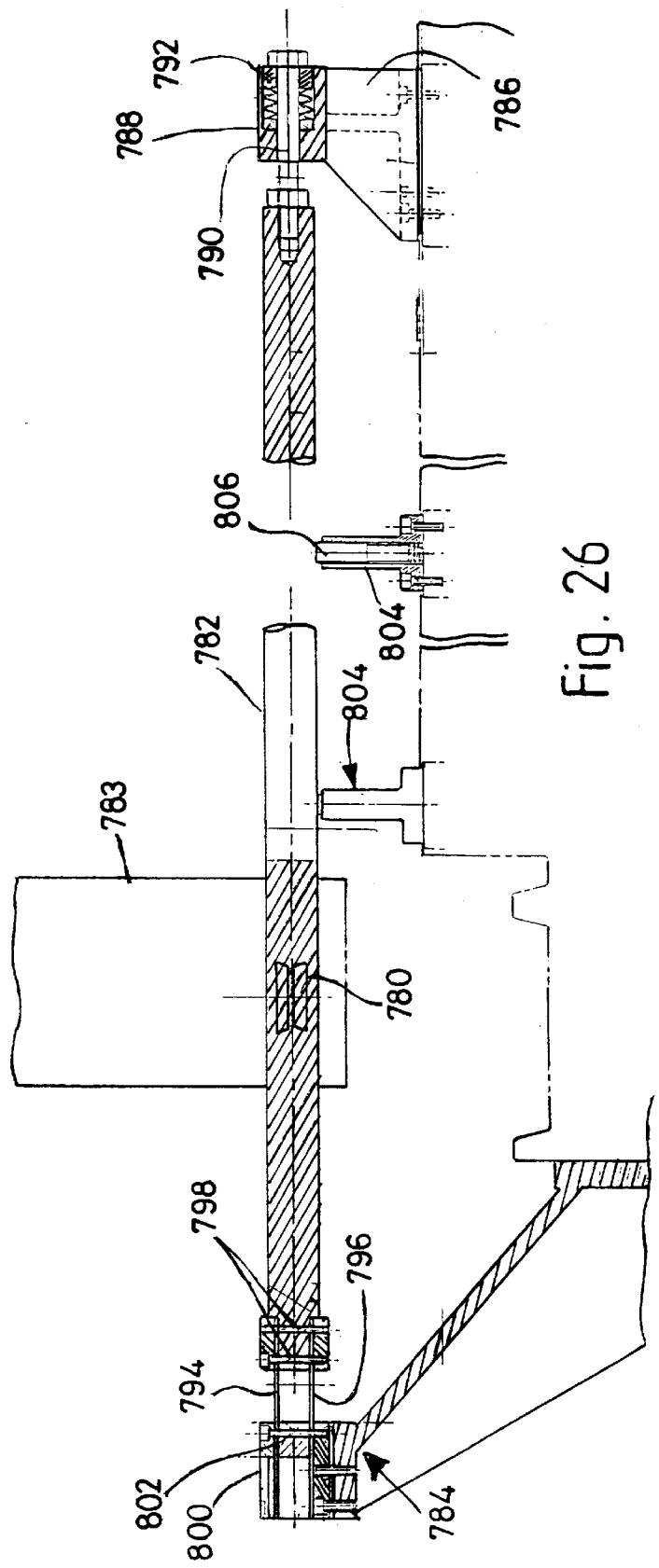
Figure 28:
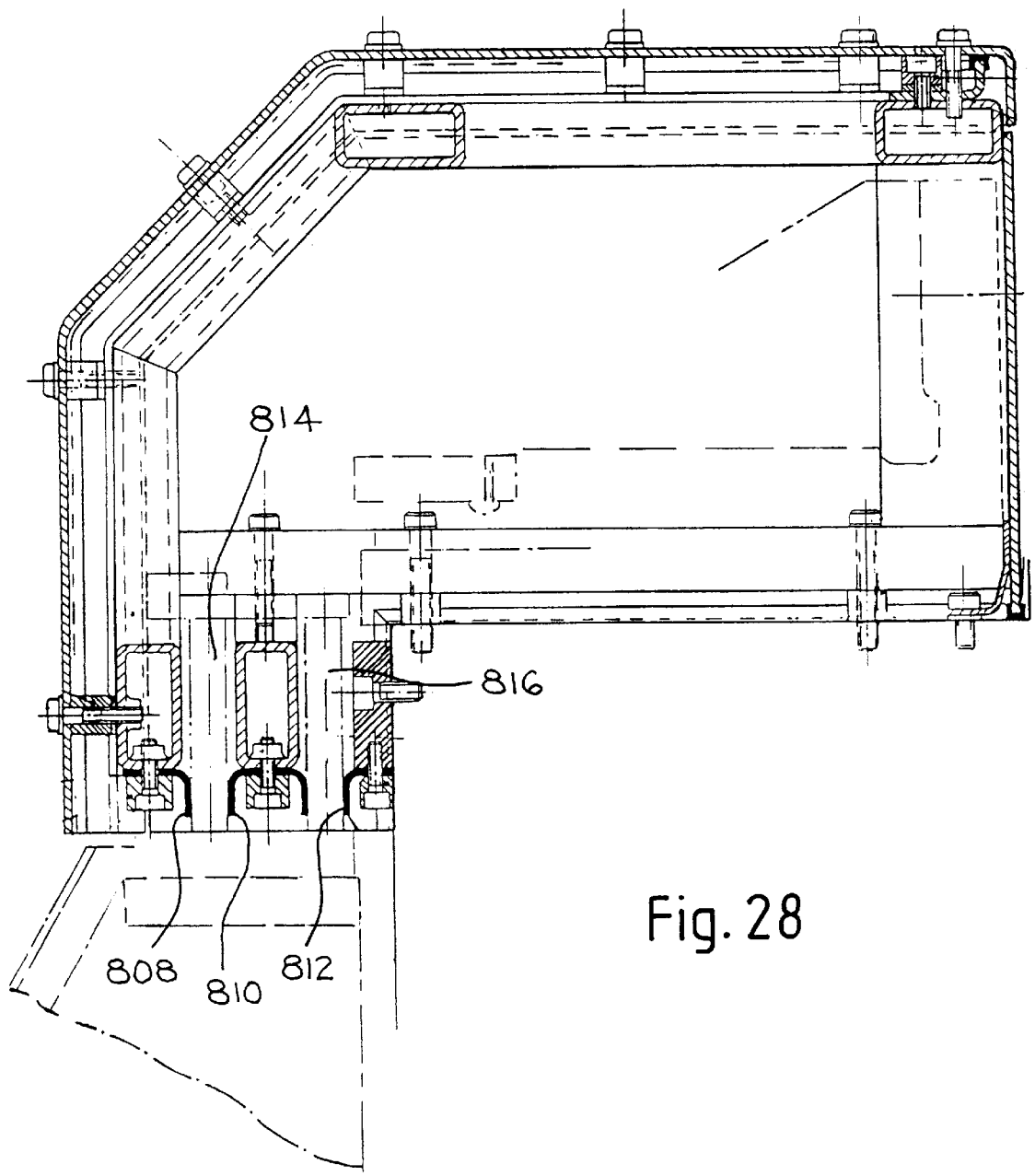
Figure 29:
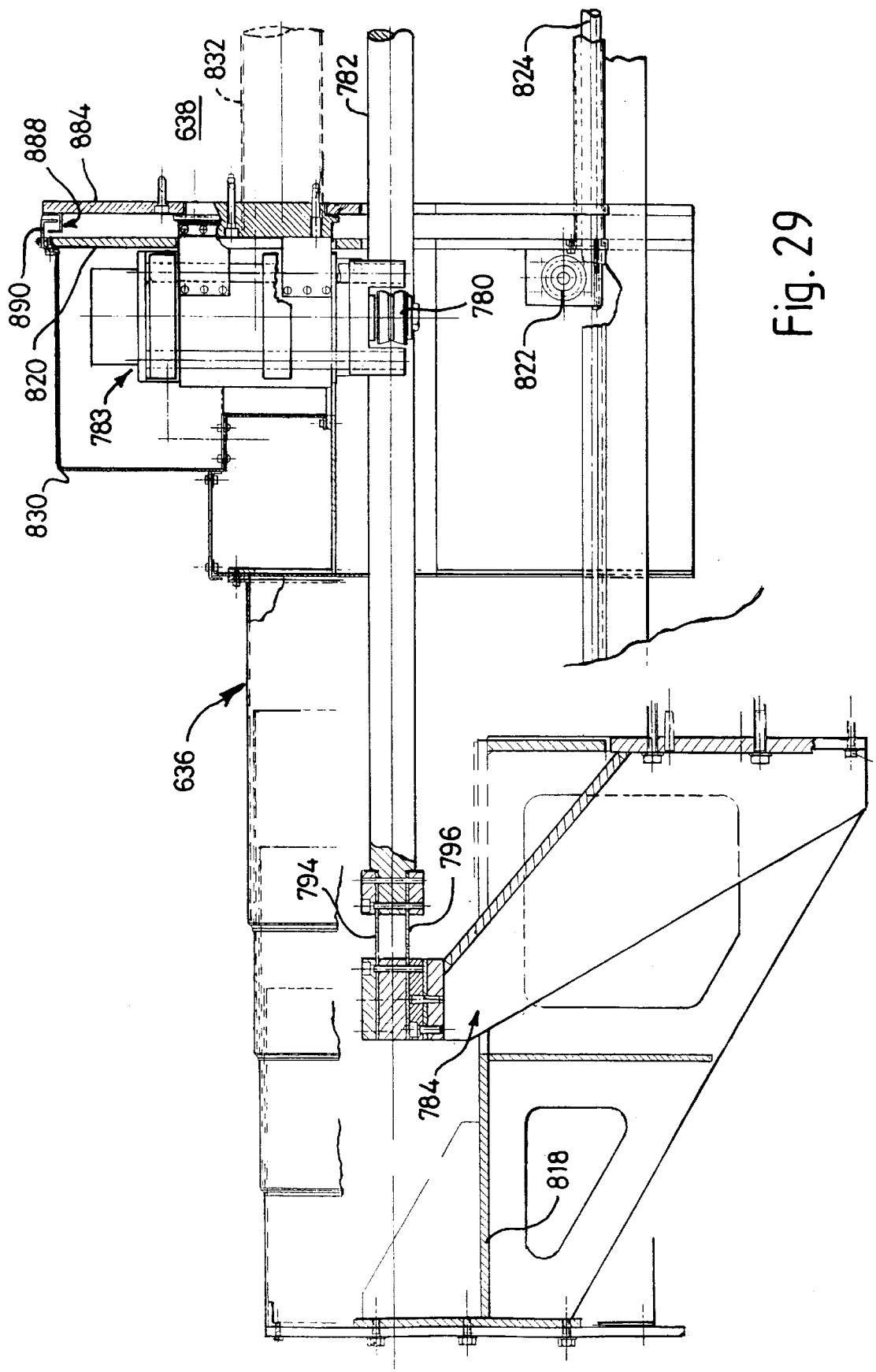
Figure 30:
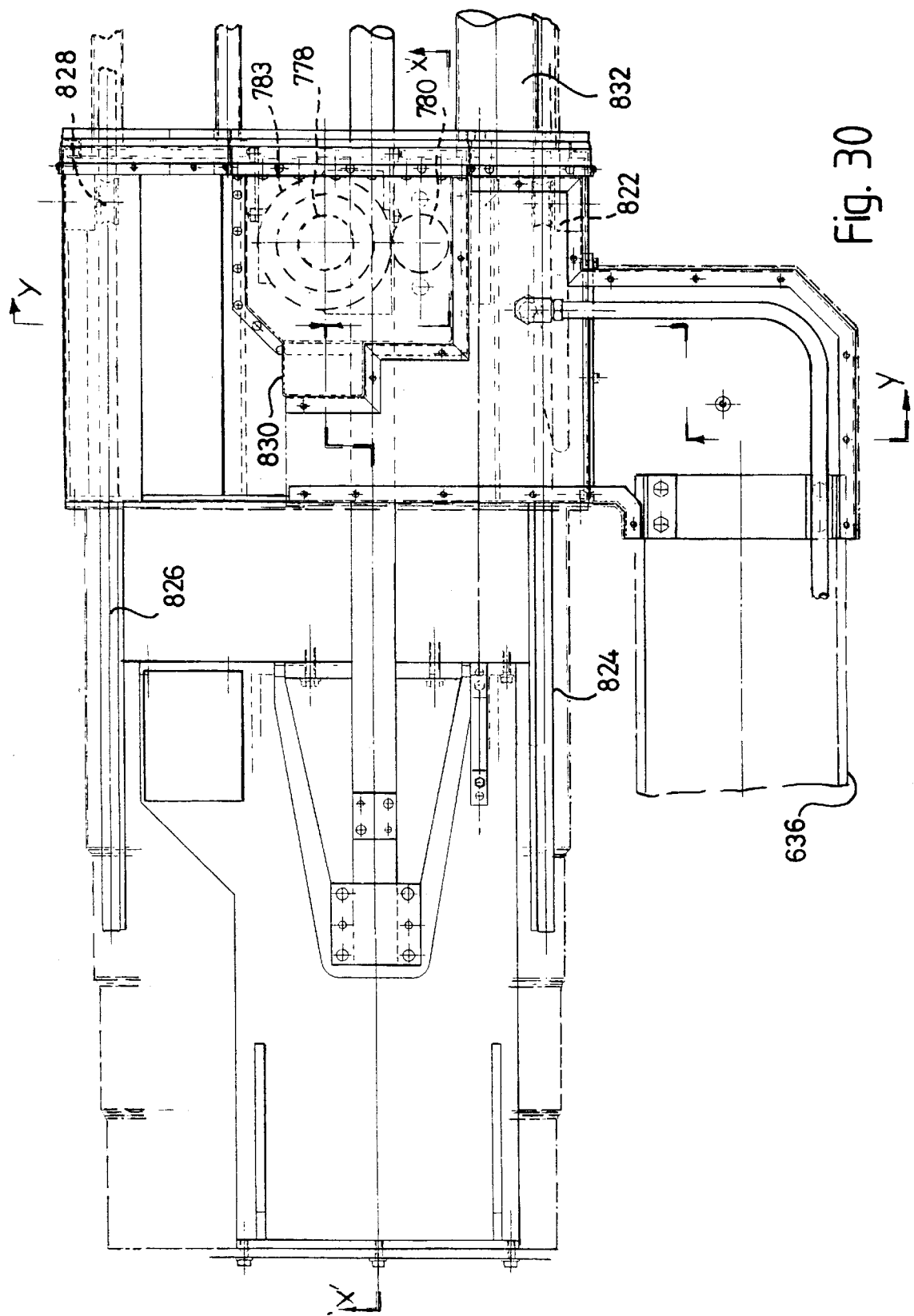
Figure 31:
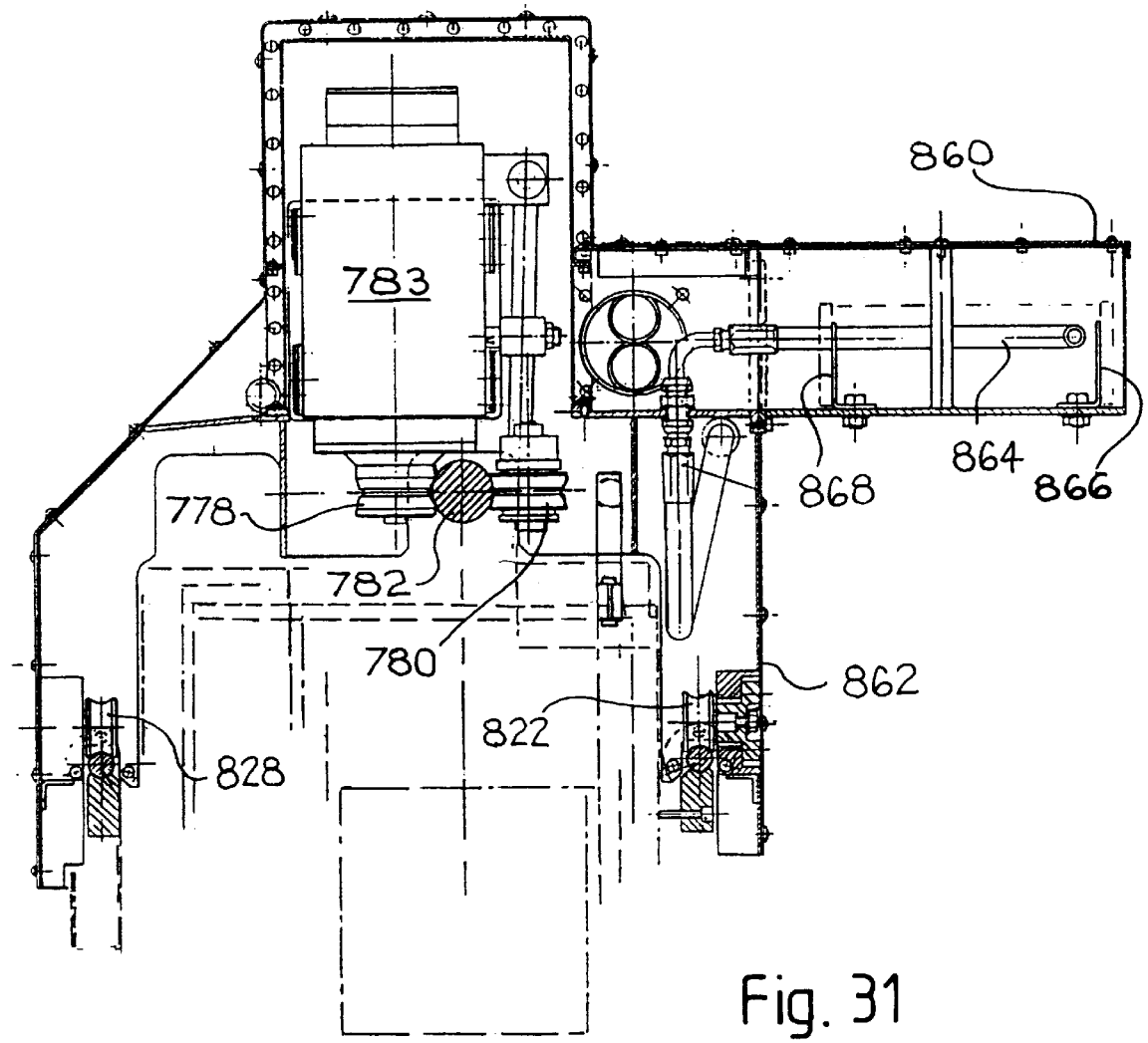

FIGS. 23A/B is an elevation of one end of the assembly shown in section in FIG. 22;

FIGS. 24A/B is a plan view of the assembly shown in FIGS. 23A/B;

FIG. 25 is a cross-section on the line BB of FIG. 24B;

FIG. 26 is an elevation partly in section and partly cut away, showing end and intermediate mounting detail of a rod which is engaged by the pinch rollers of a friction drive mounted at the left hand end of the worktable for driving the worktable from side to side;

FIG. 27 is a plan view of the rod arrangement of FIG. 26;

FIG. 28 is a typical cross-section through the cover which is fitted over the assembly shown in FIGS. 22–24, and is secured to the worktable;

FIG. 29 is an elevation of the left hand end of the machine with the worktable located nearer the left than the right hand end of its traverse, and showing a set of telescoping covers protecting the left hand end of the worktable and the friction drive engaging the rod of FIGS. 26 and 27;

FIG. 30 is a plan view in the direction of arrow A in FIG. 29;

FIG. 31 is an elevation sectioned on the line YY of FIG. 30.

Figure 32:
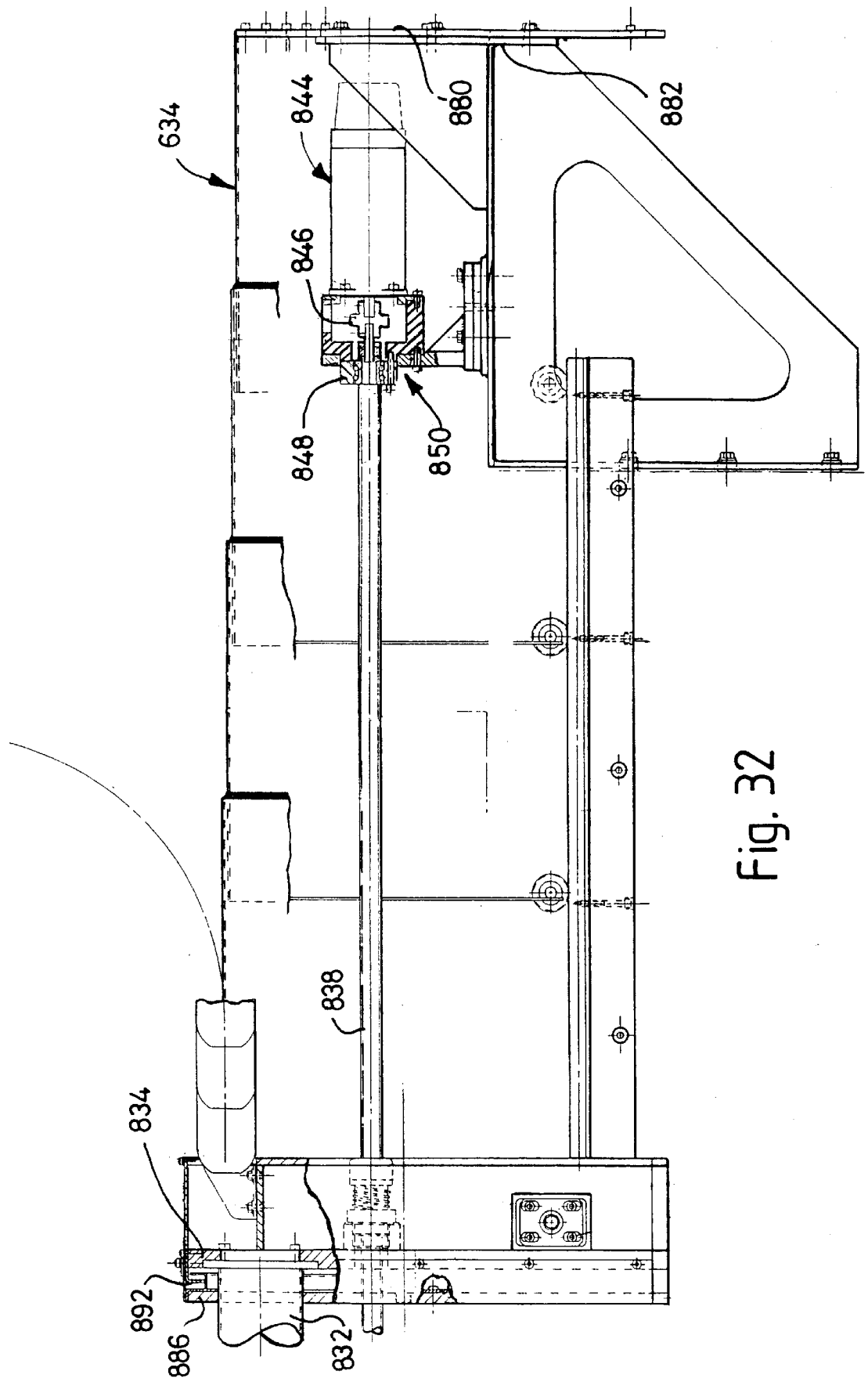
Figure 33:
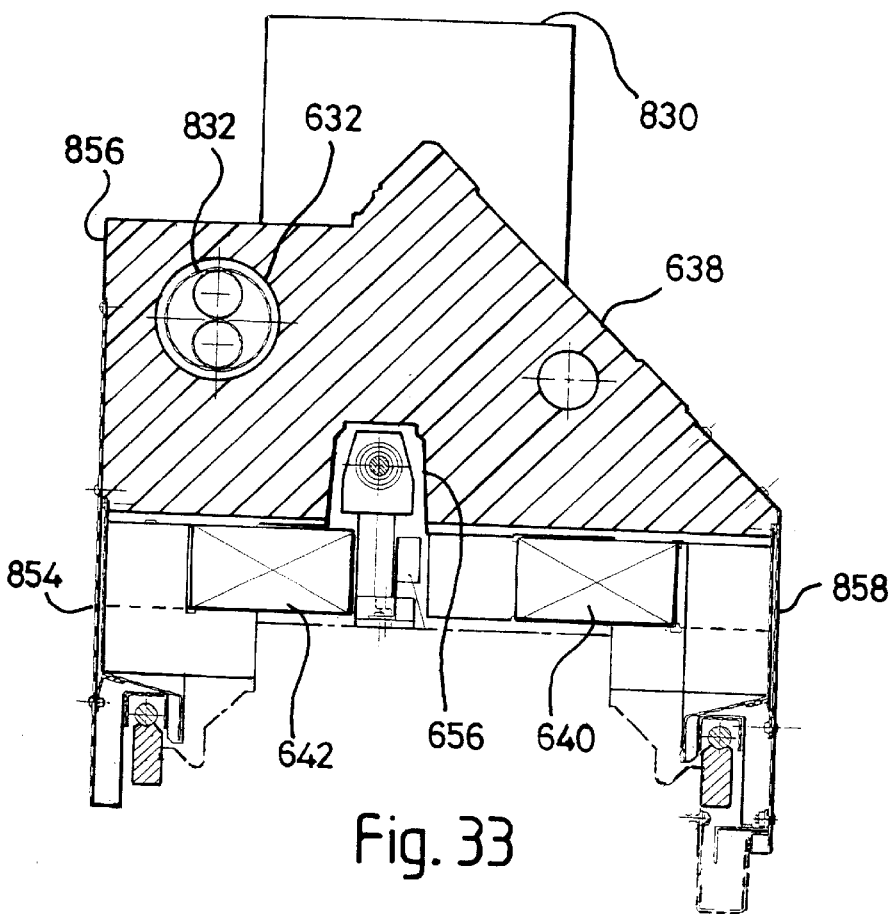
Figure 34:
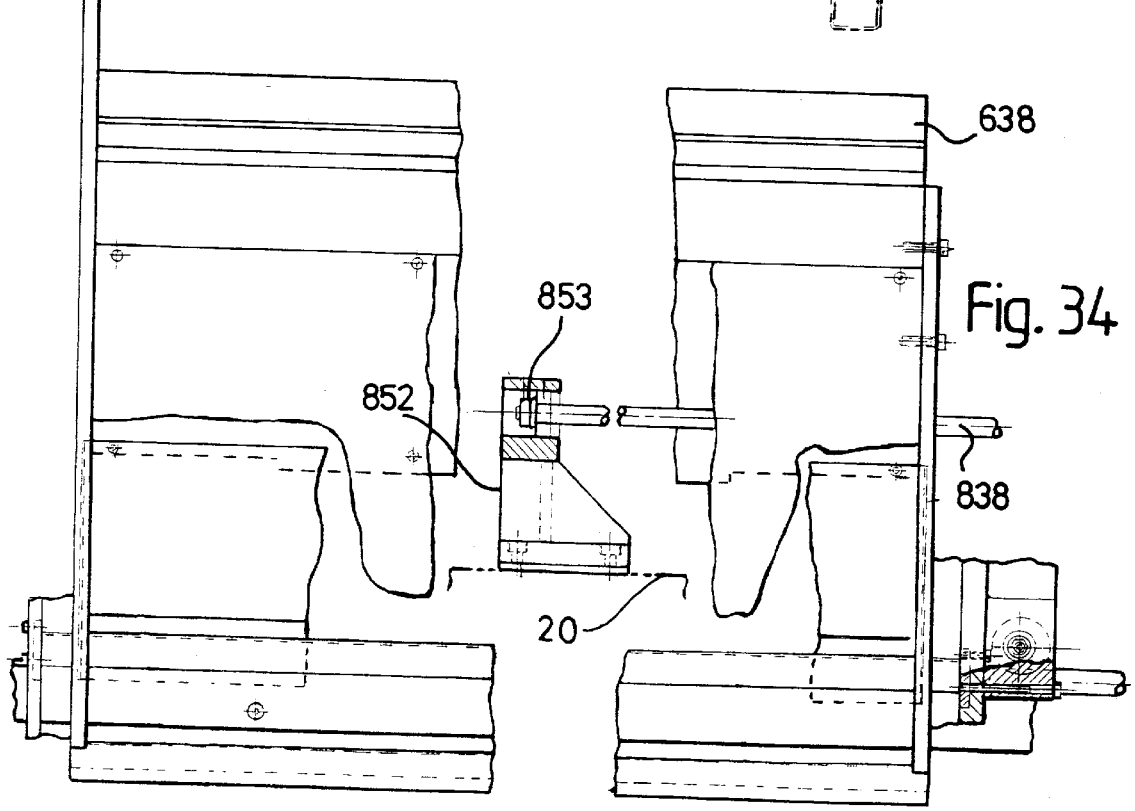
Figure 35:
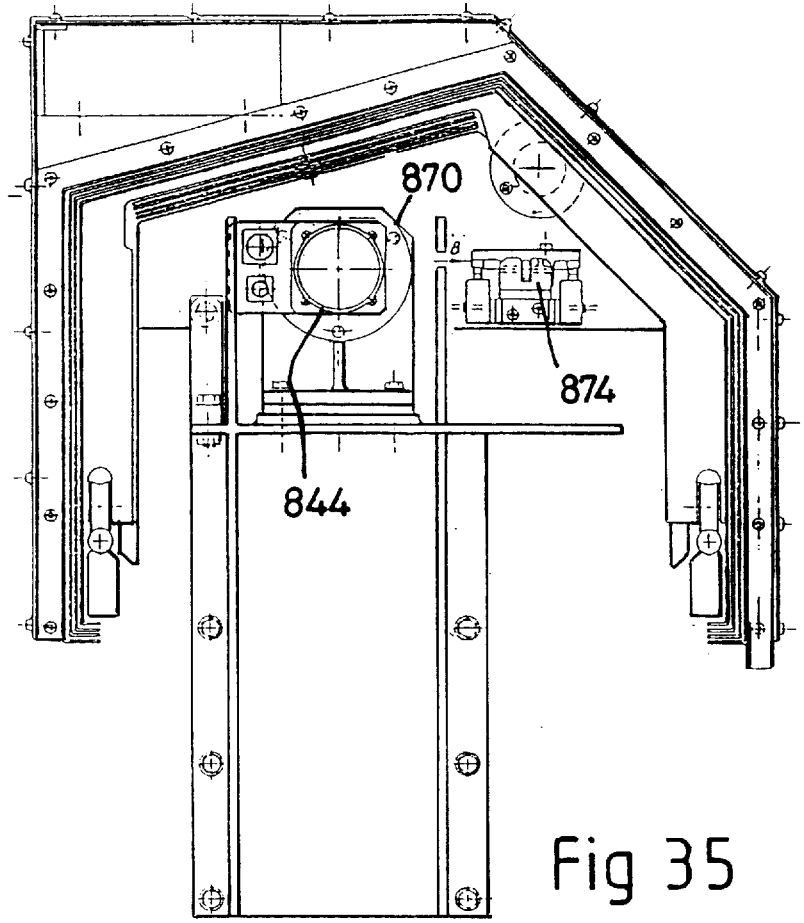
Figure 36:
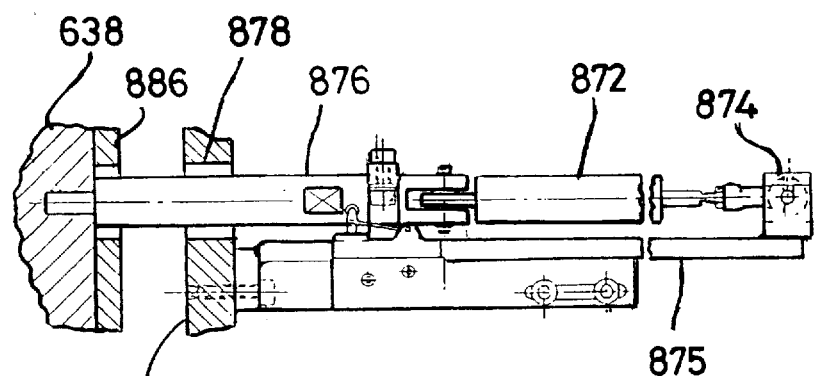
Figure 37:
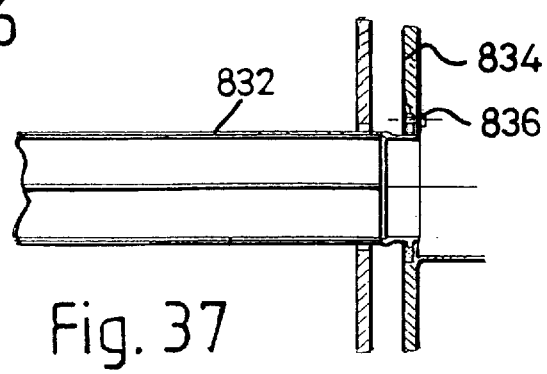
Figure 38:
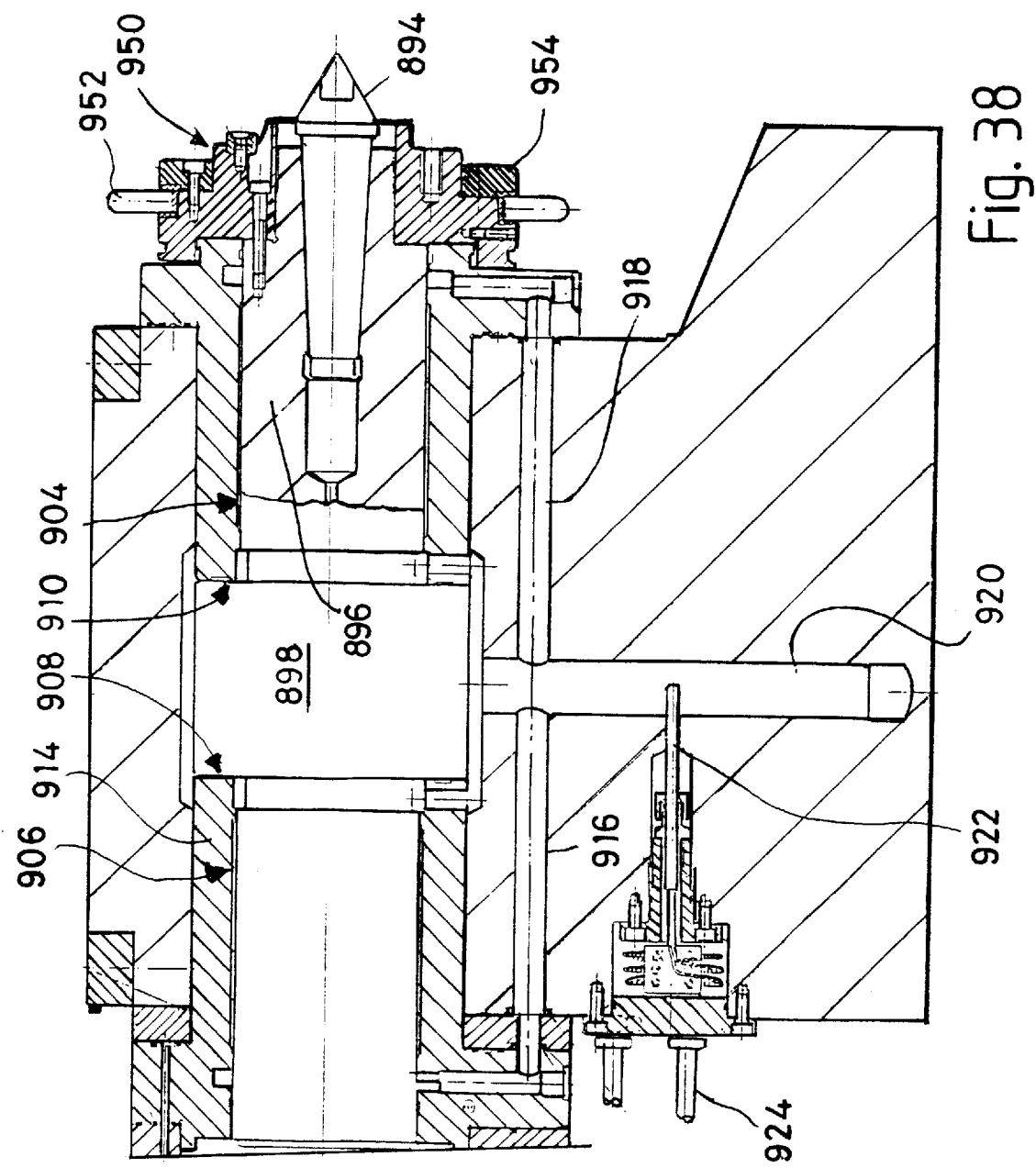
Figure 39:
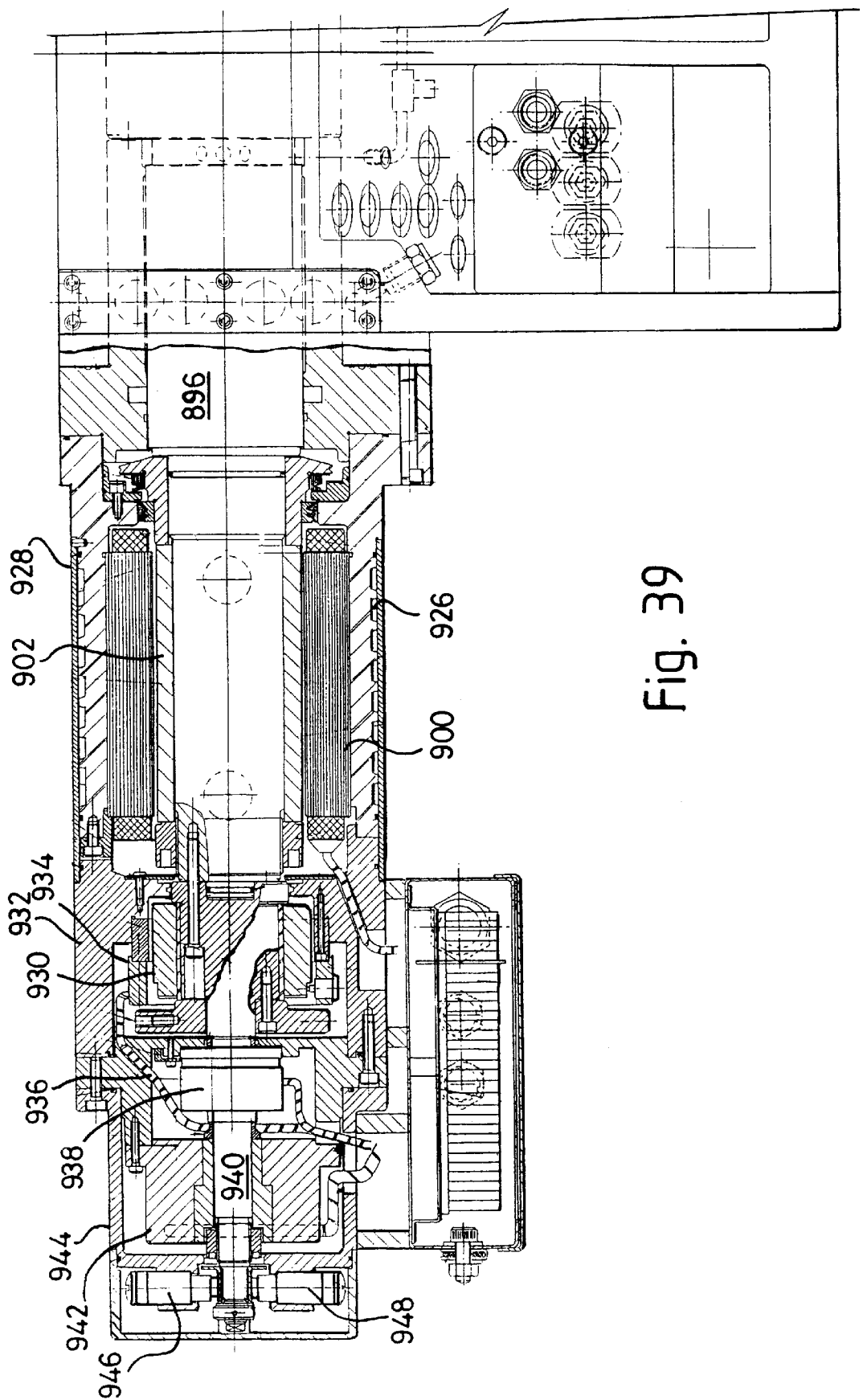
Figure 42A:
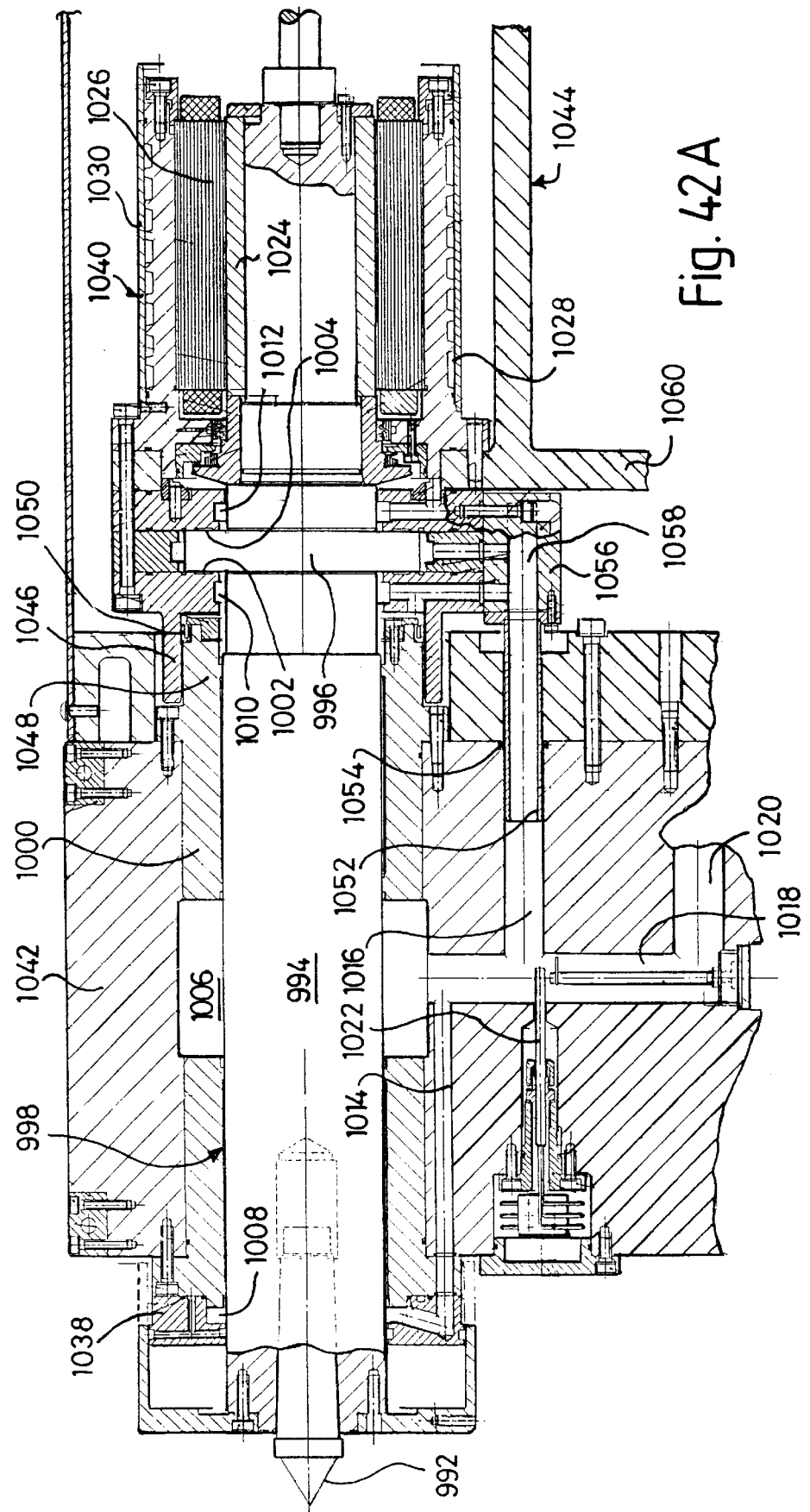
Figure 44:
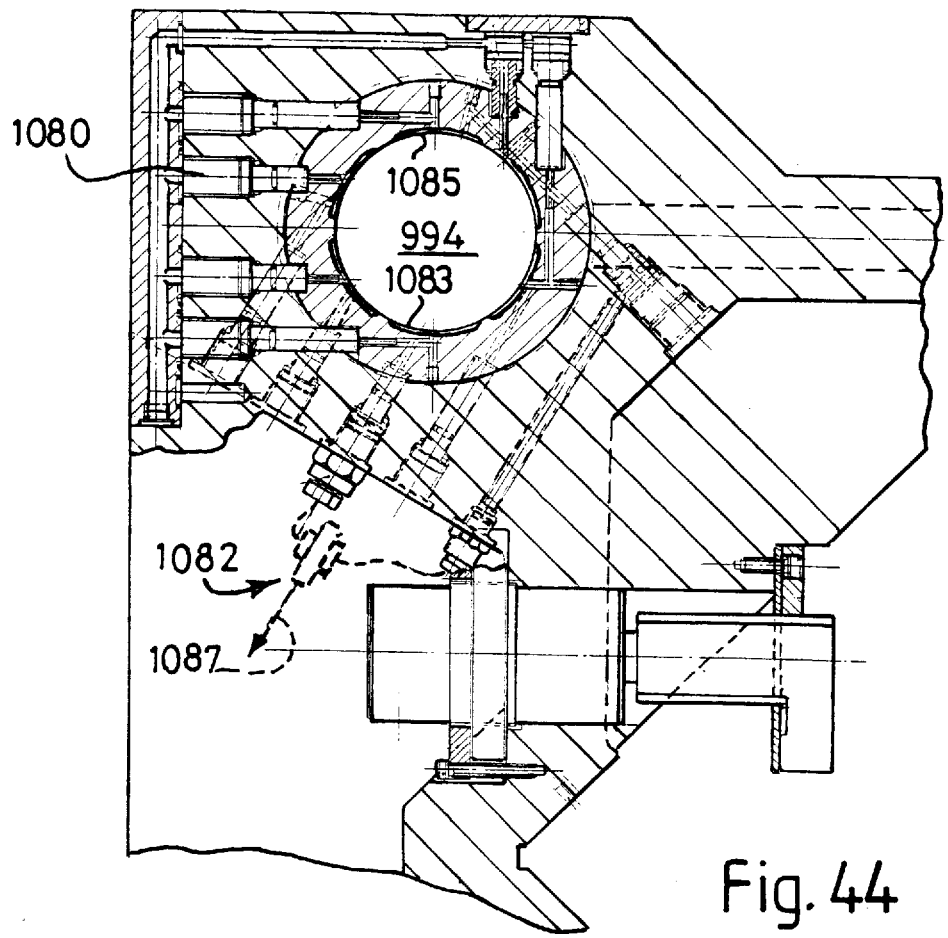
Figure 42B:
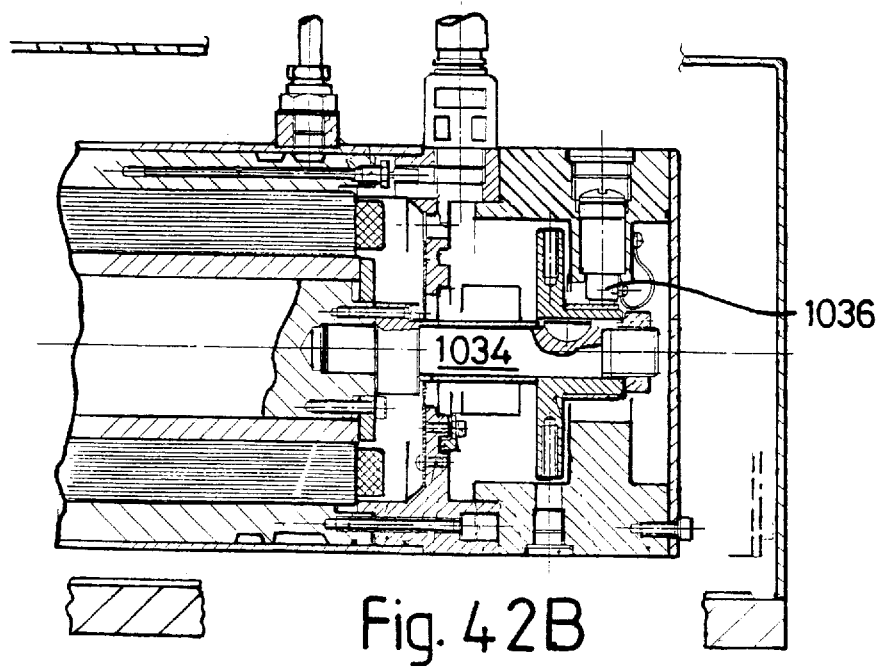
Figure 43A:
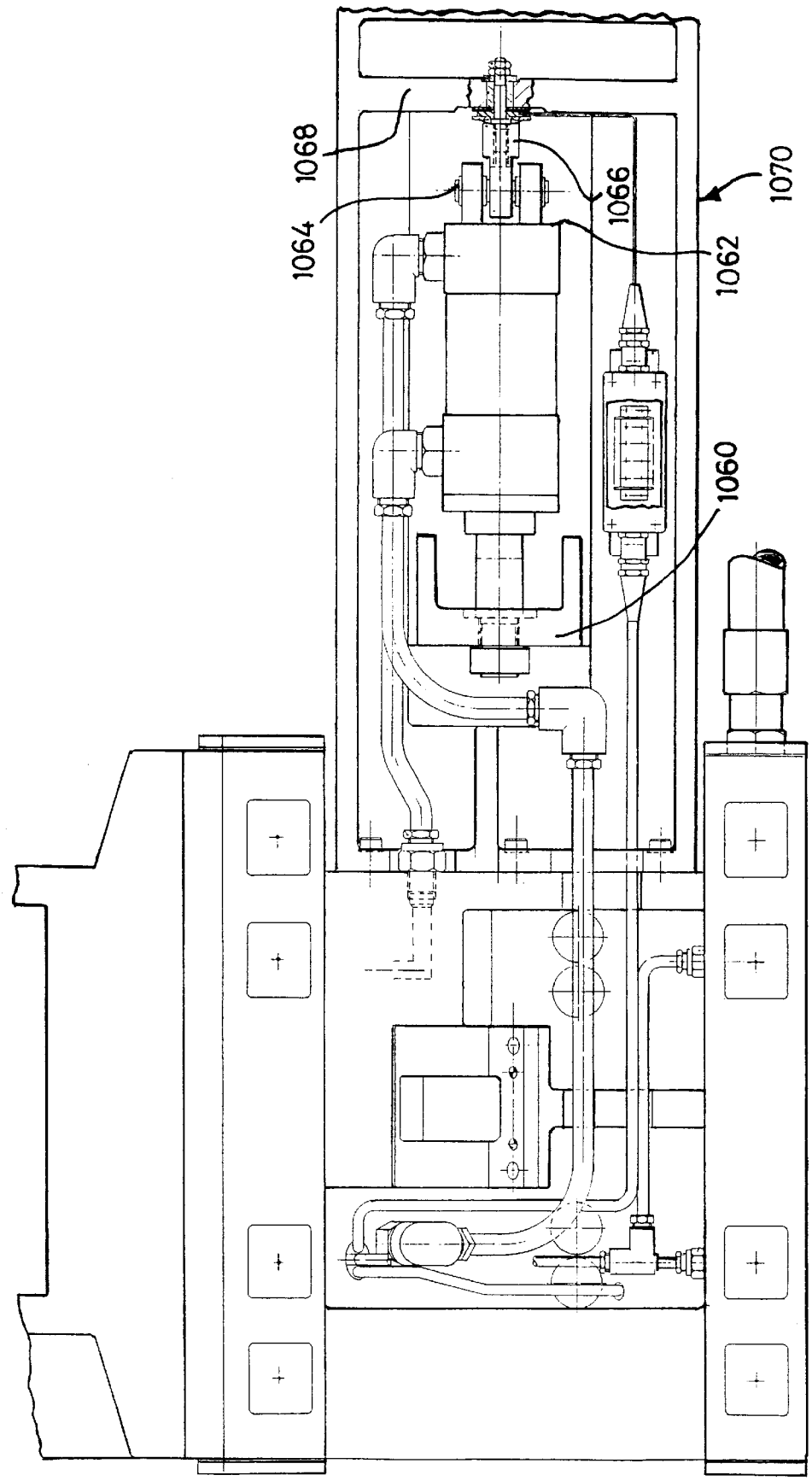
Figure 45:
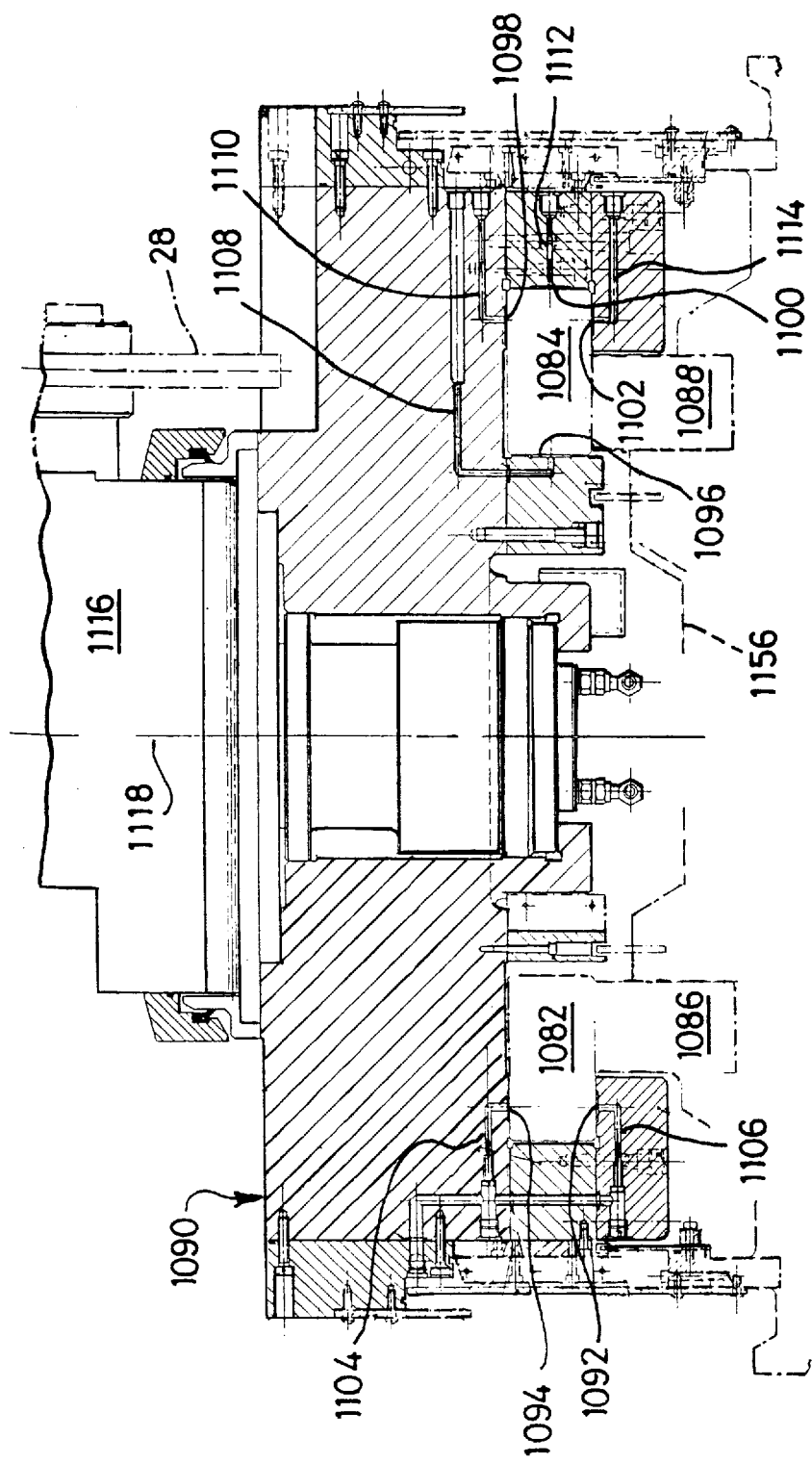
Figure 46:
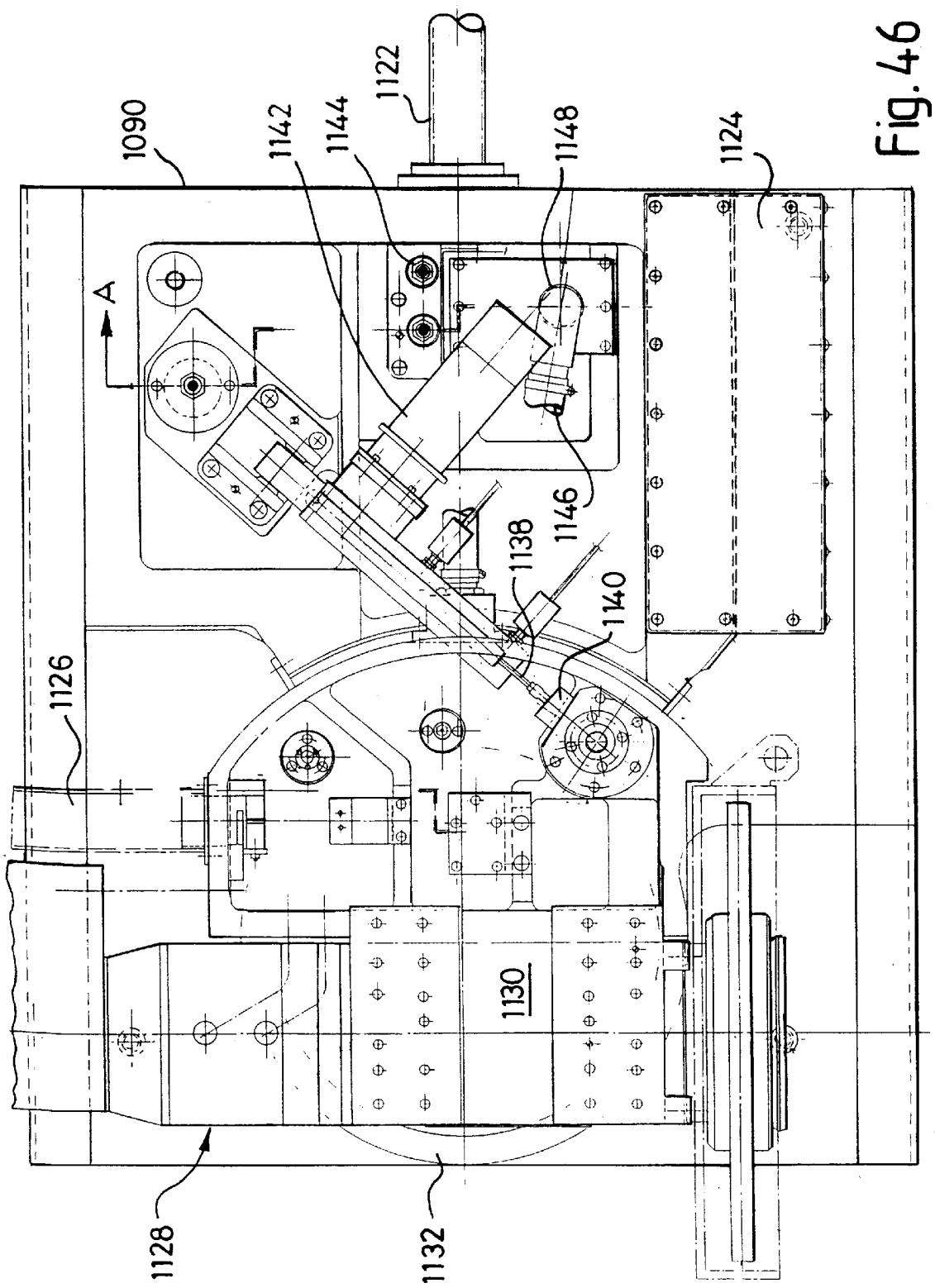
Figure 47:
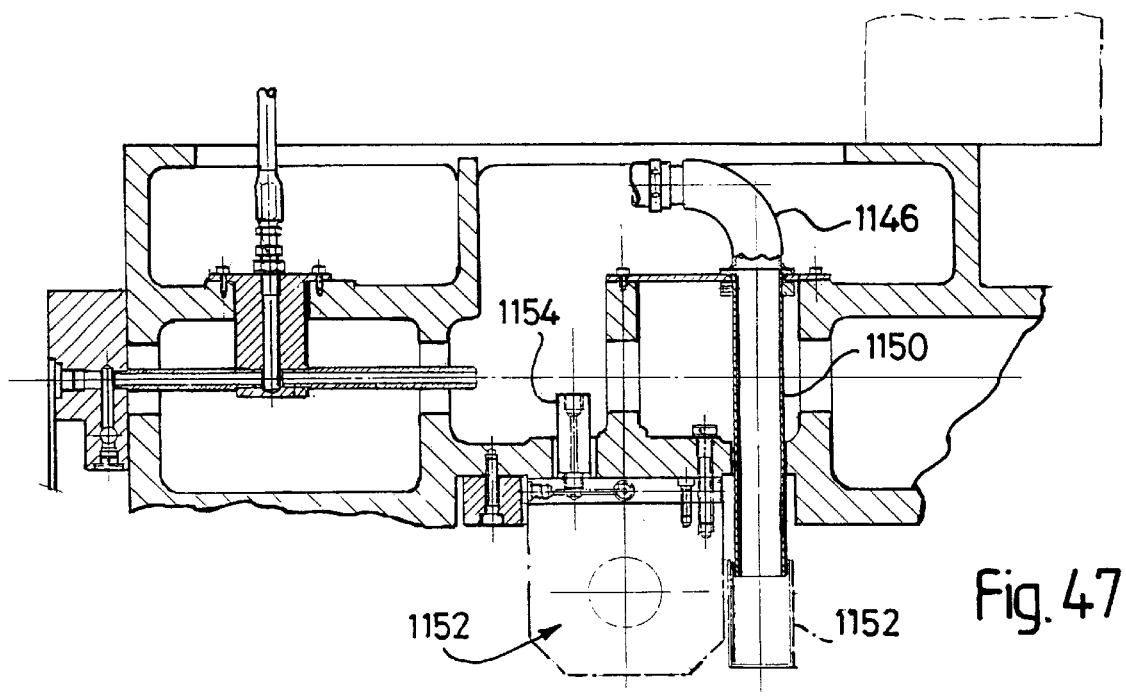
Figure 48:
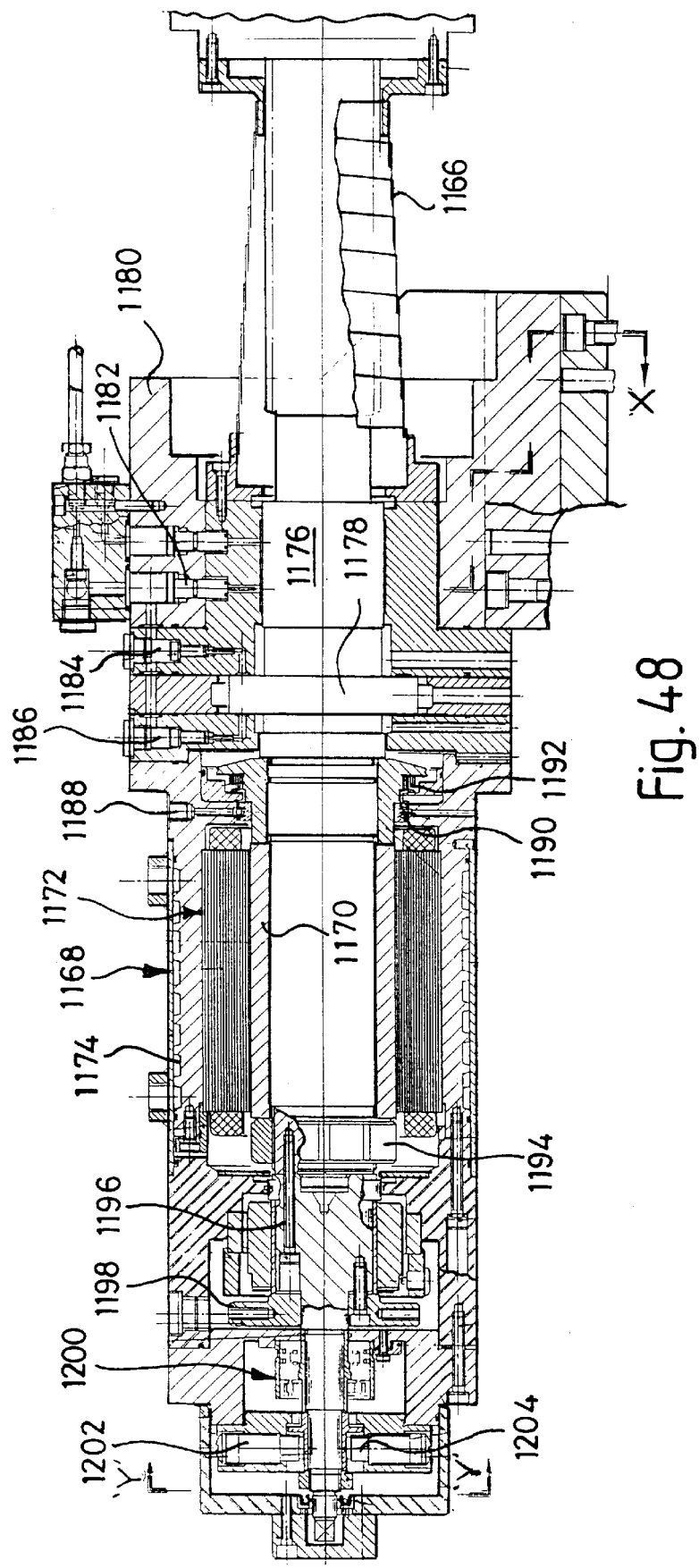
Figure 51:
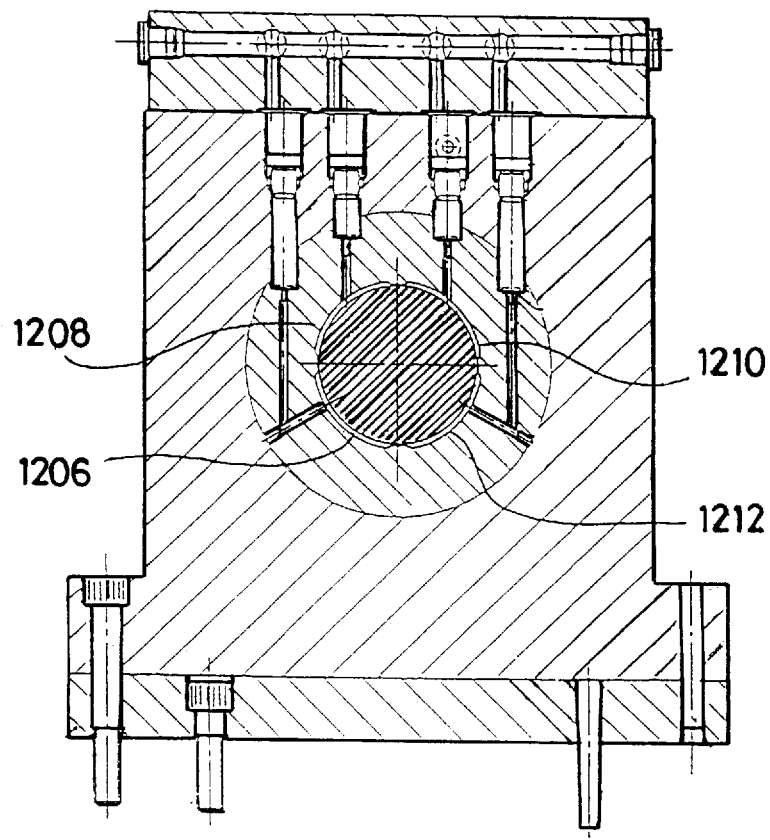
Figure 52:
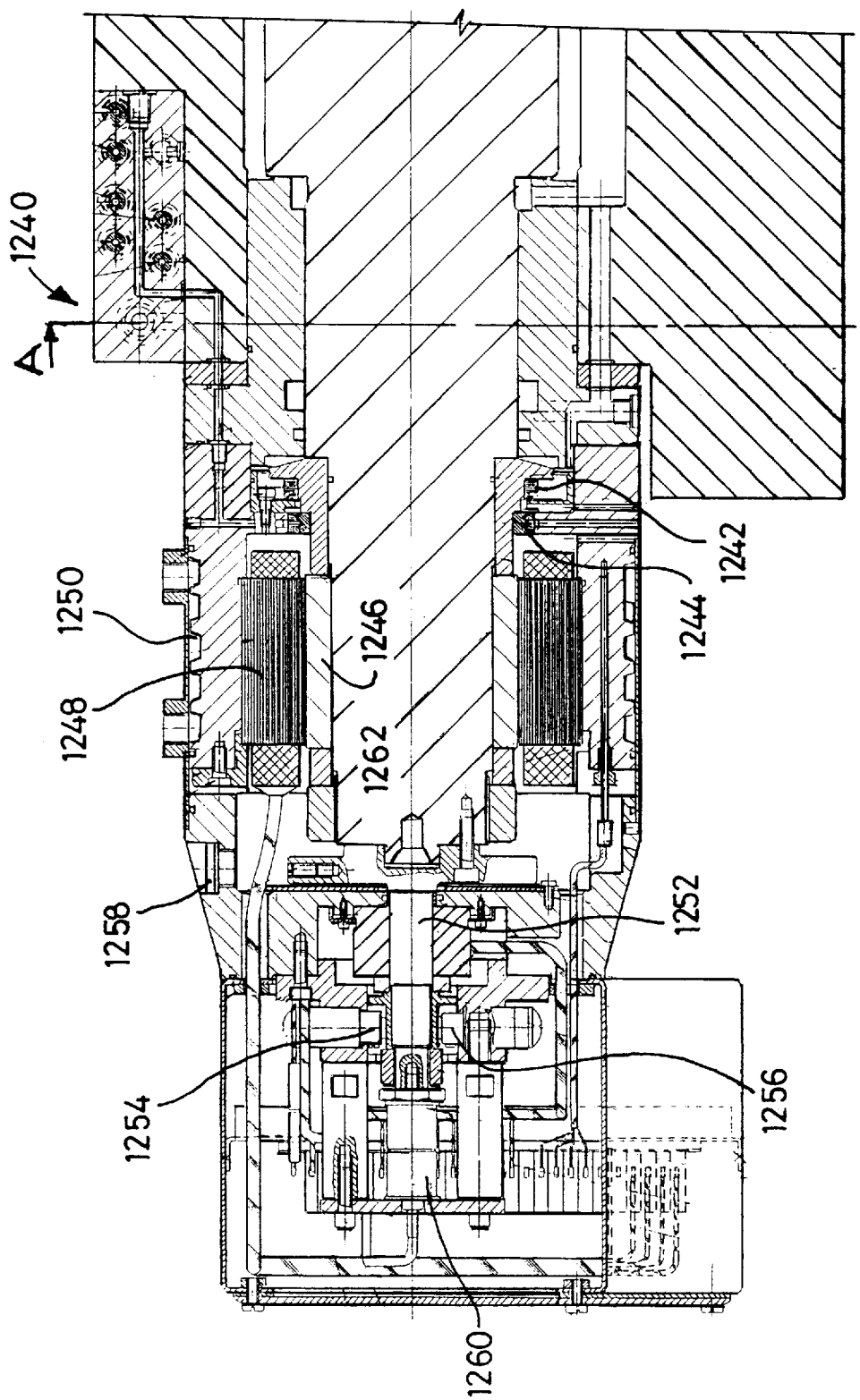
Figure 54:
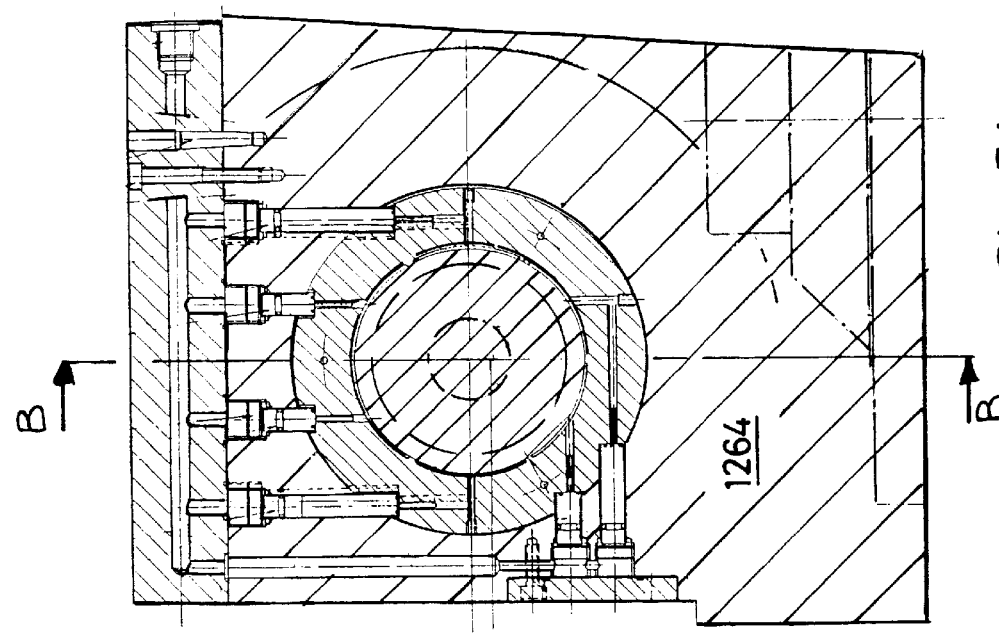
Figure 53:
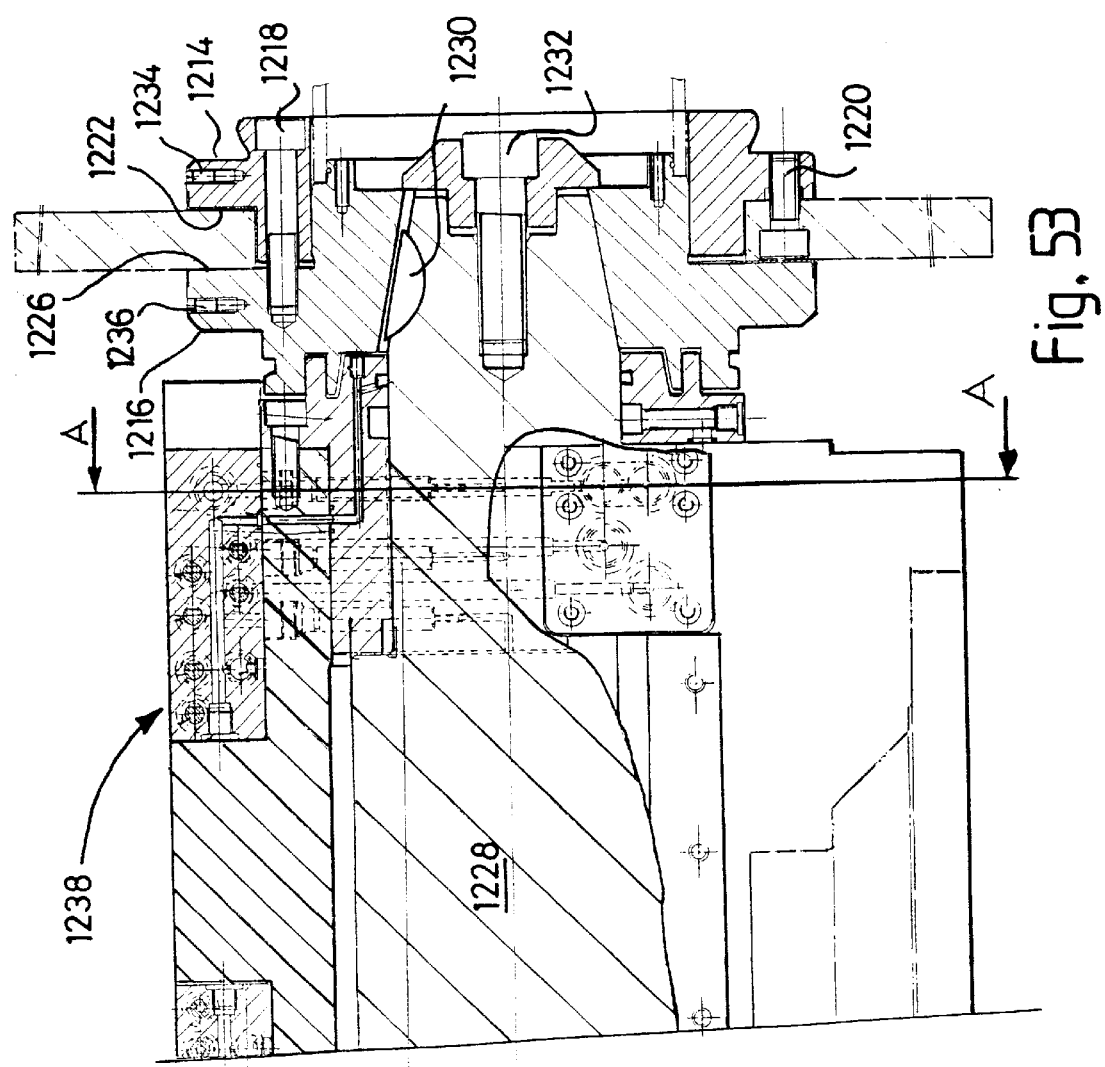
Figure 55:
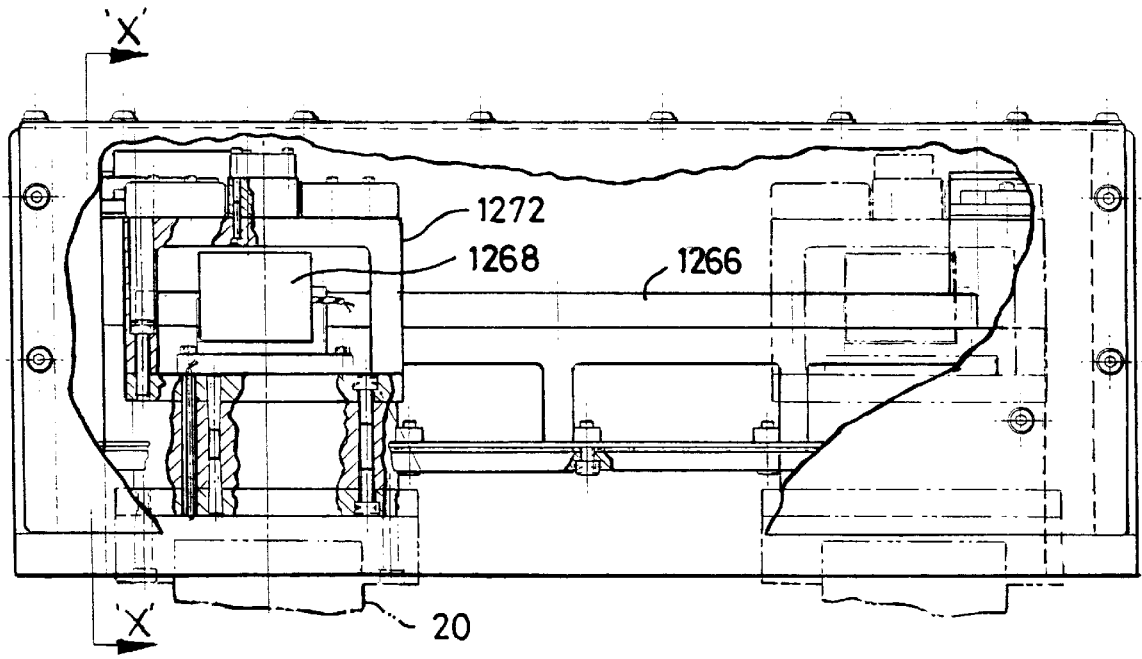
Figure 56:
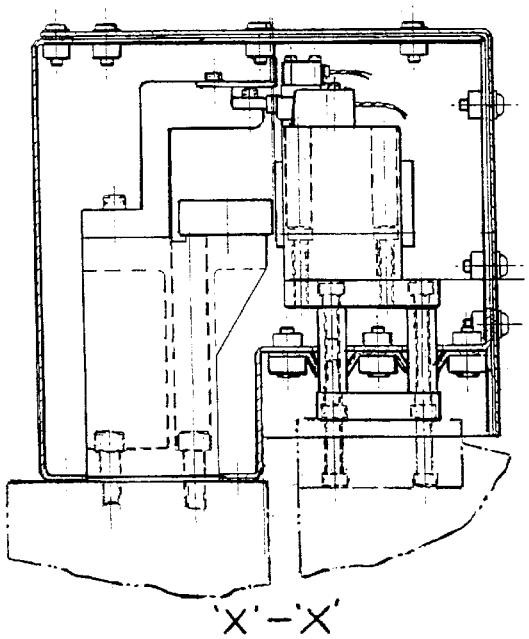
Figure 57:
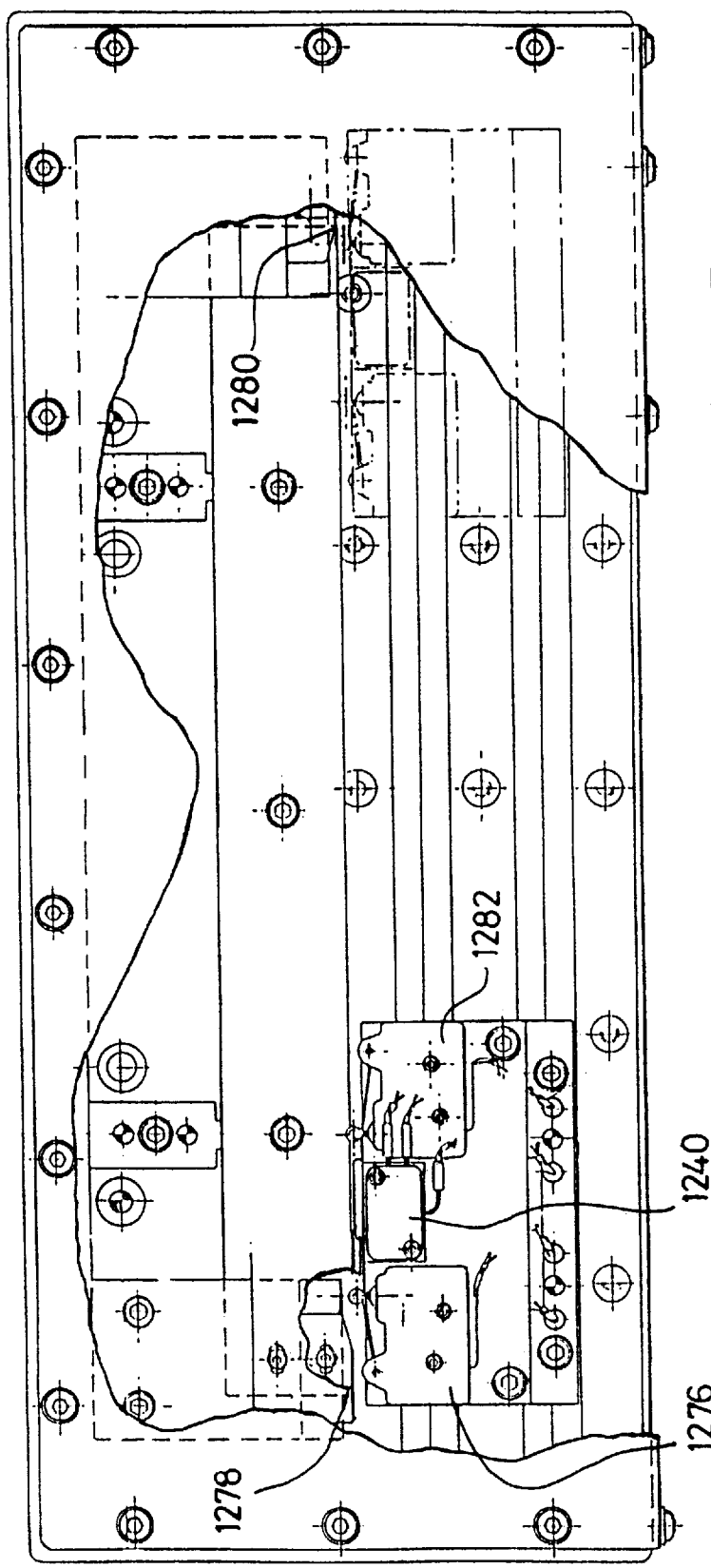
Figure 58:
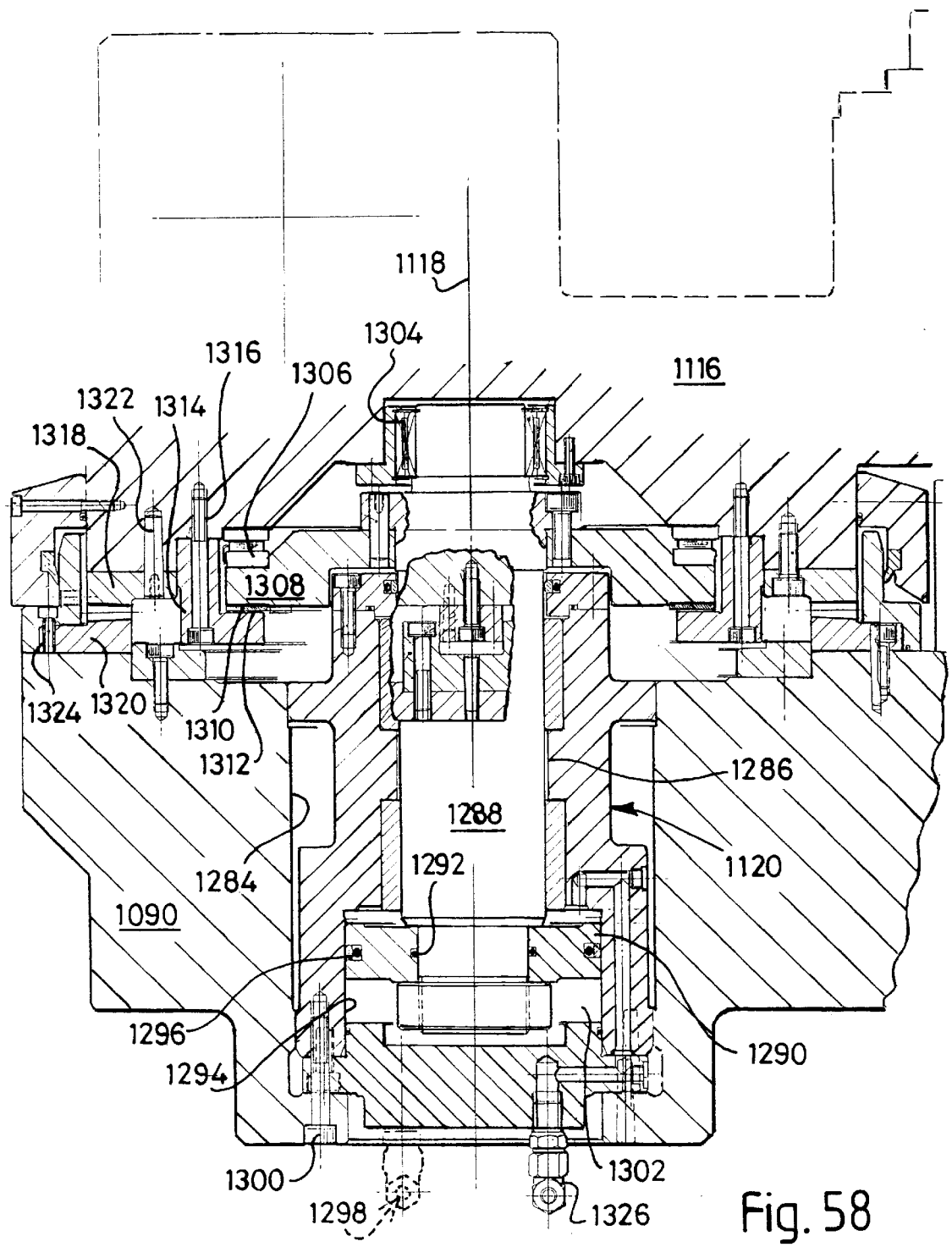
Figure 65:
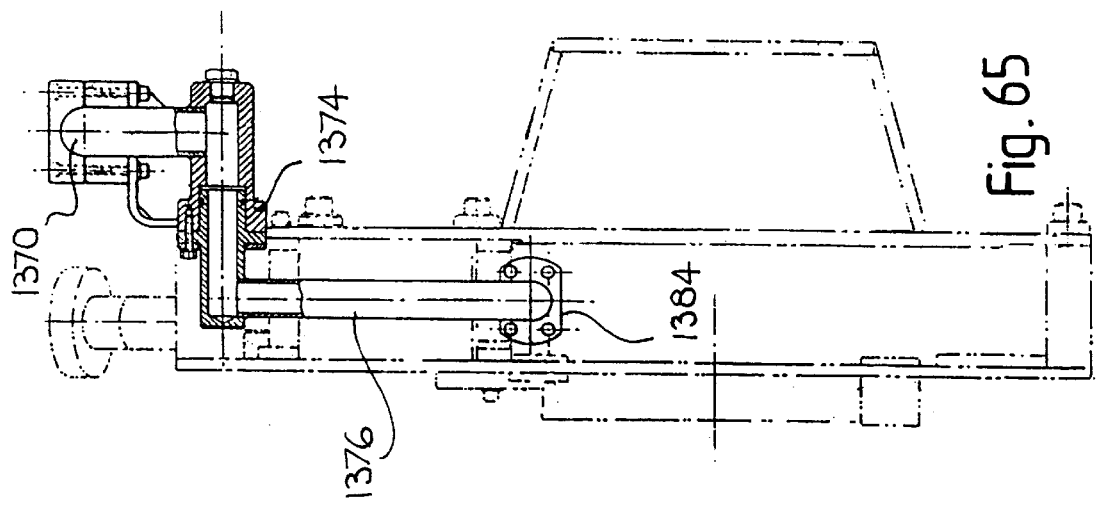
Figure 64:
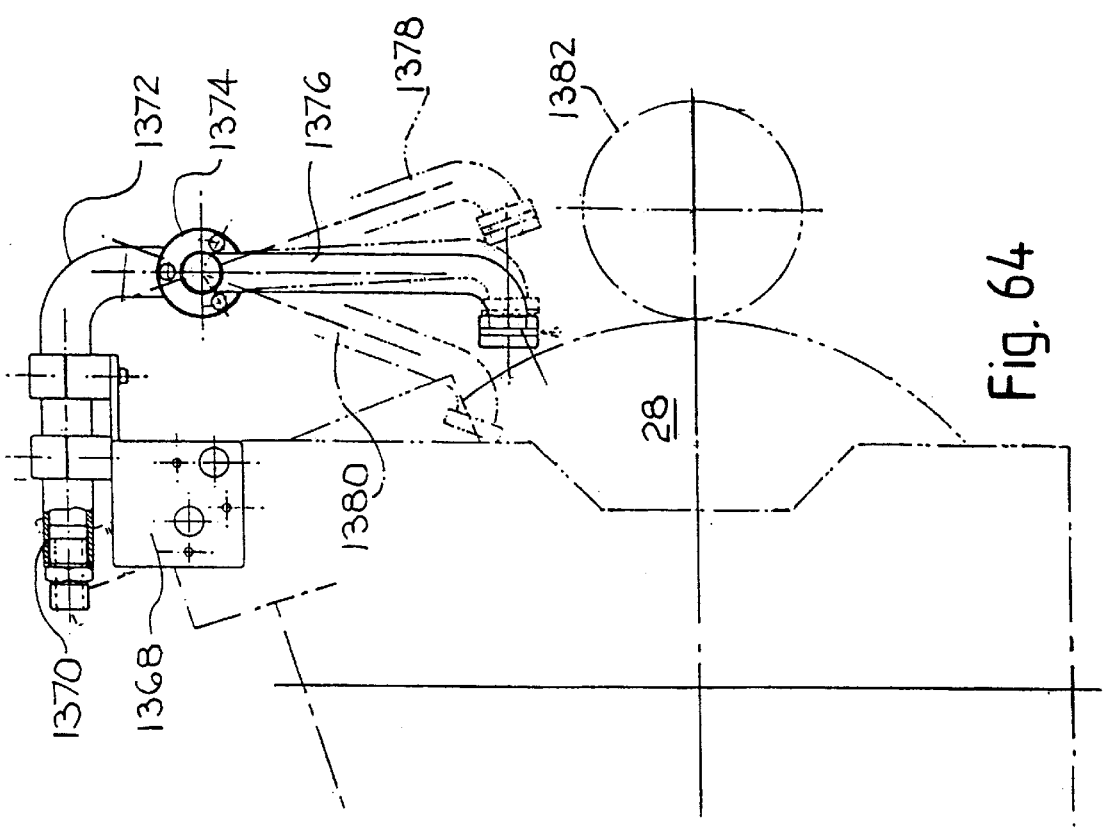
Figure 66:
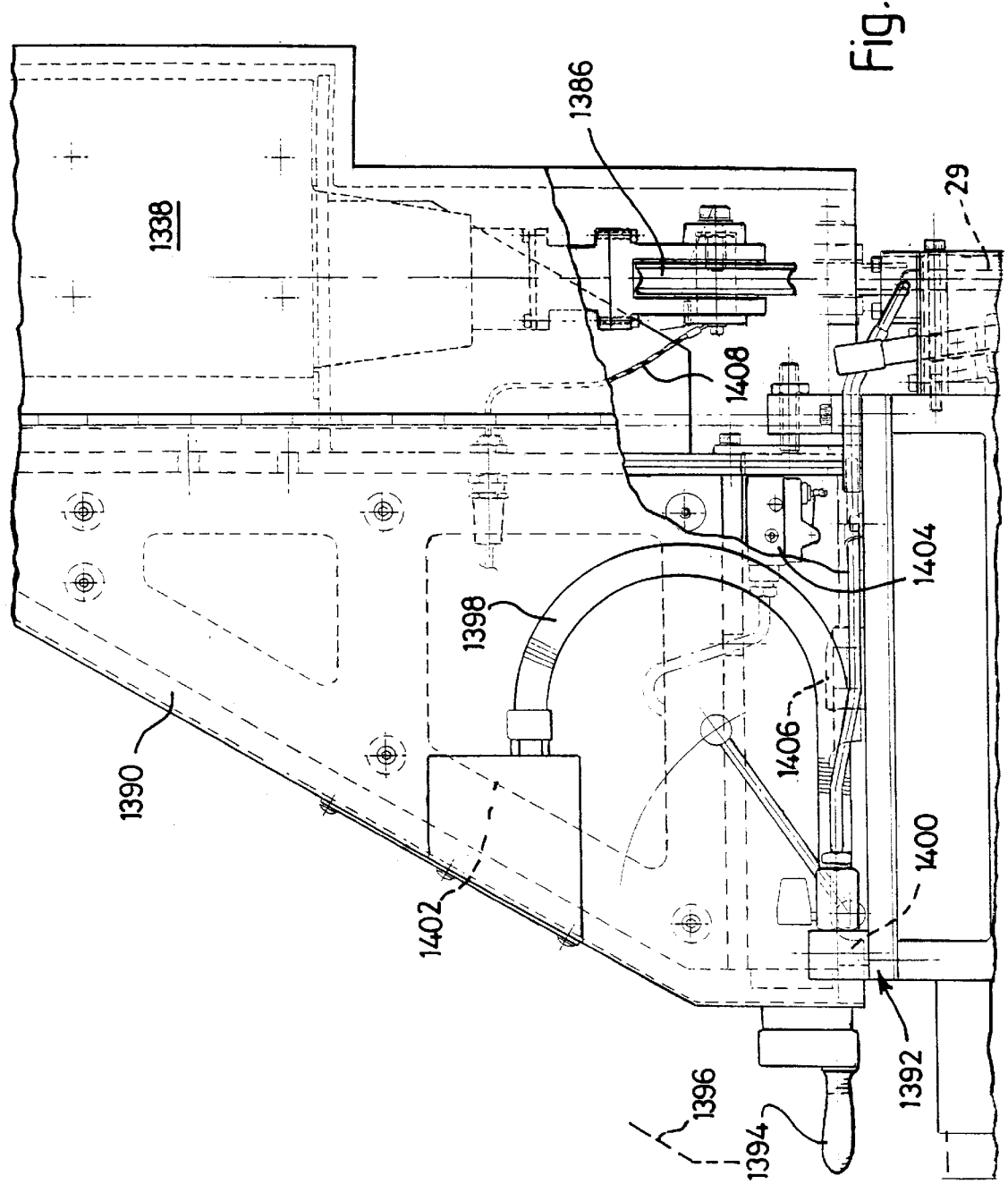
Figure 67:
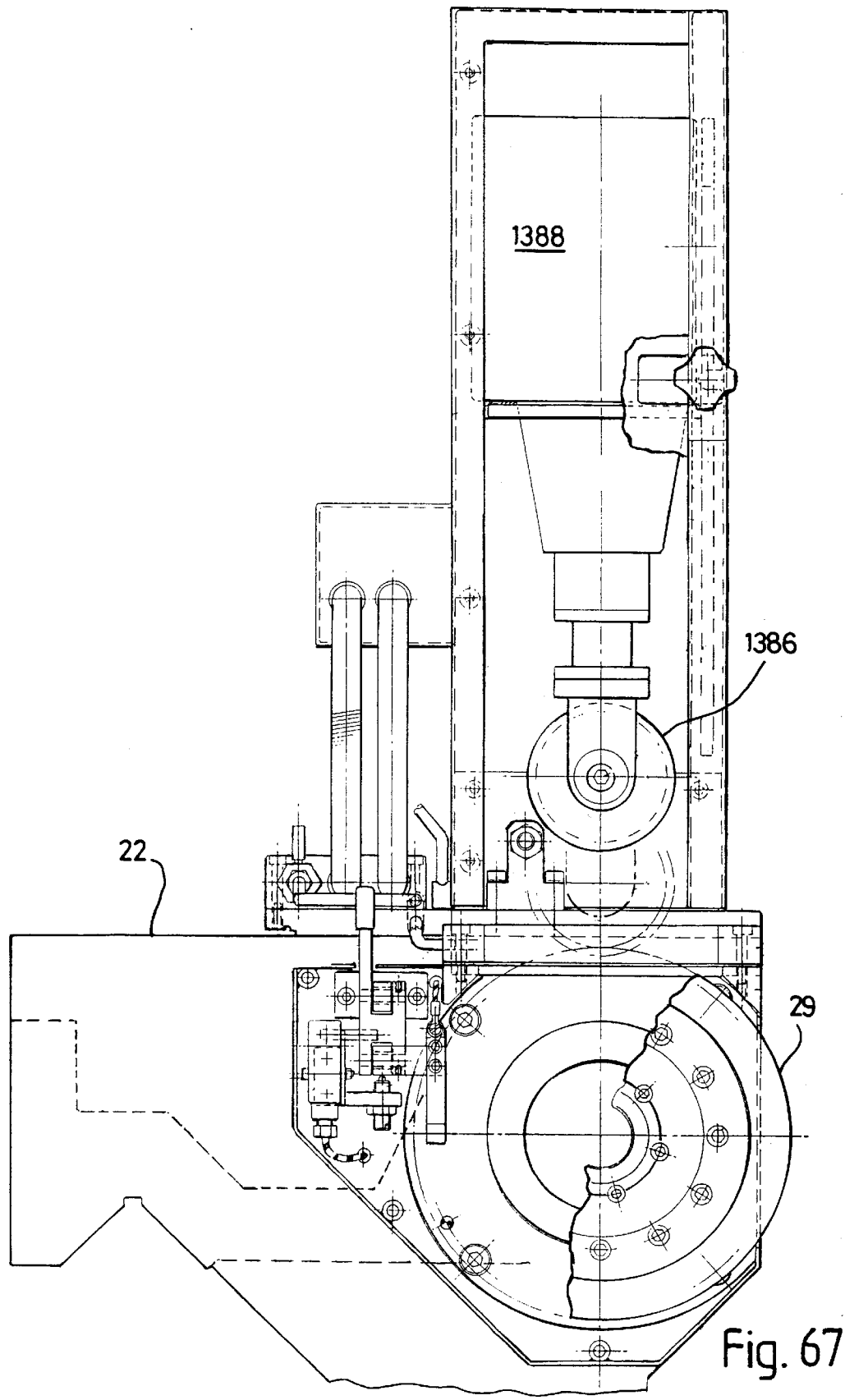
Figure 68:
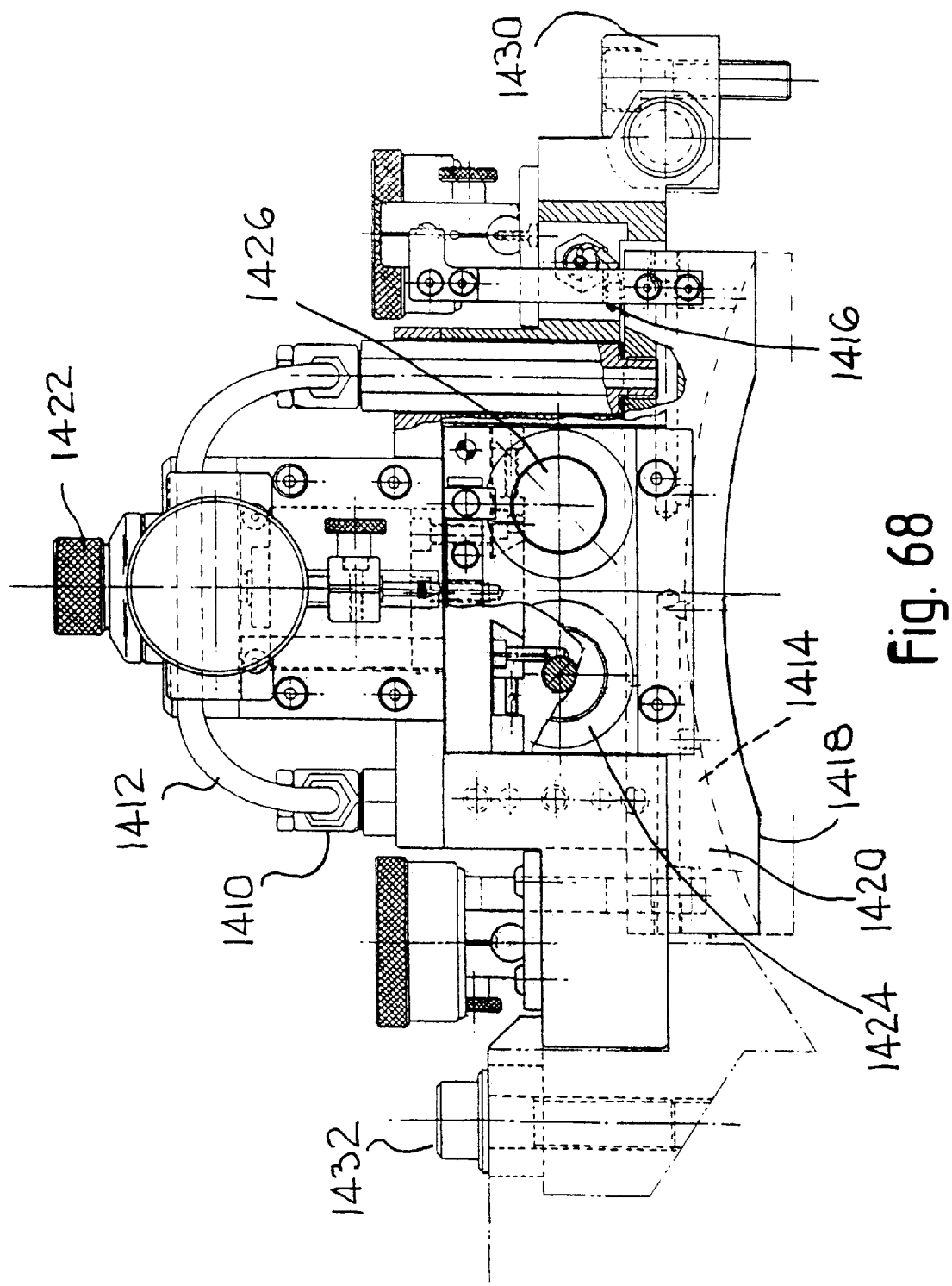
Figure 69:
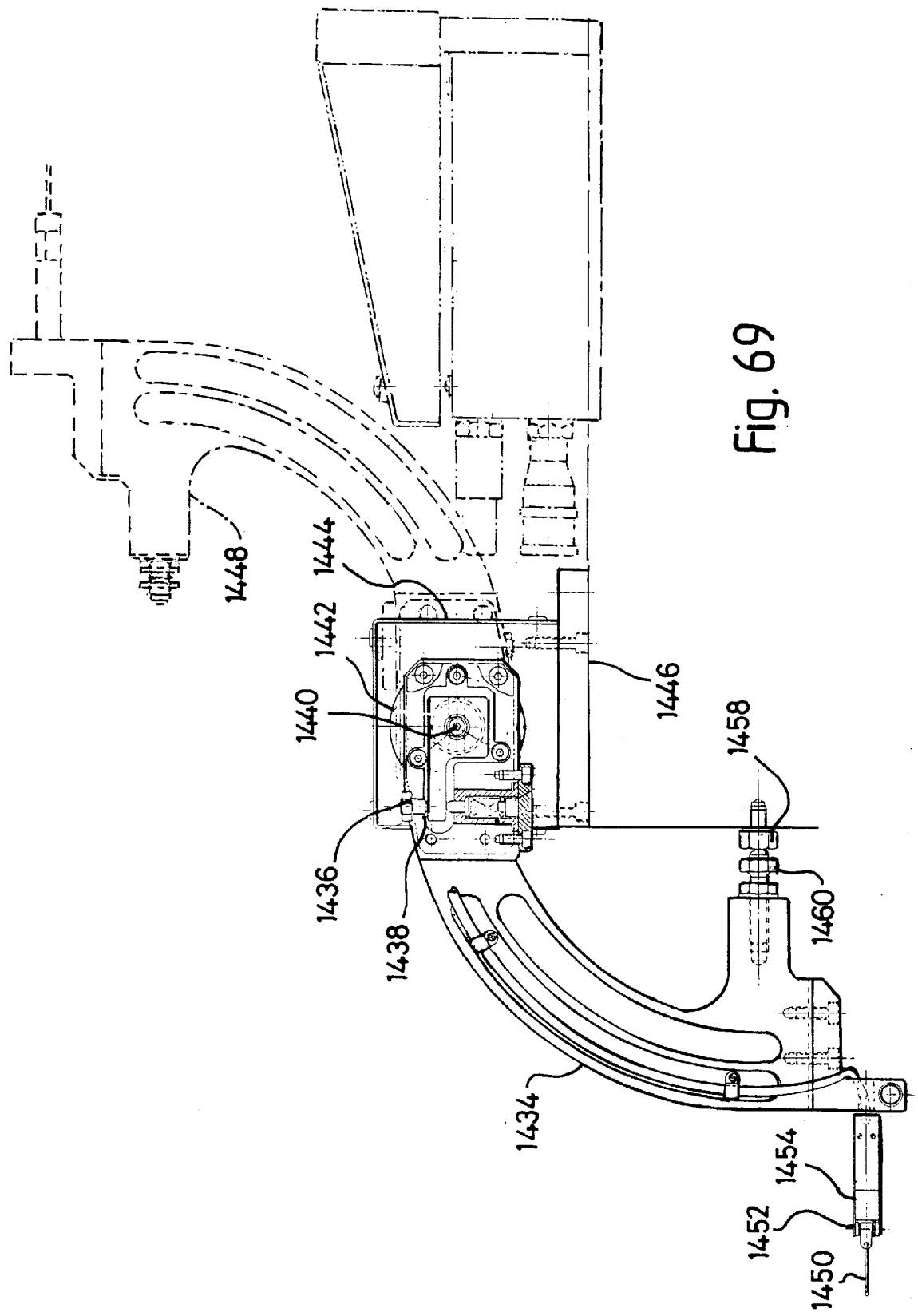
Figure 70:
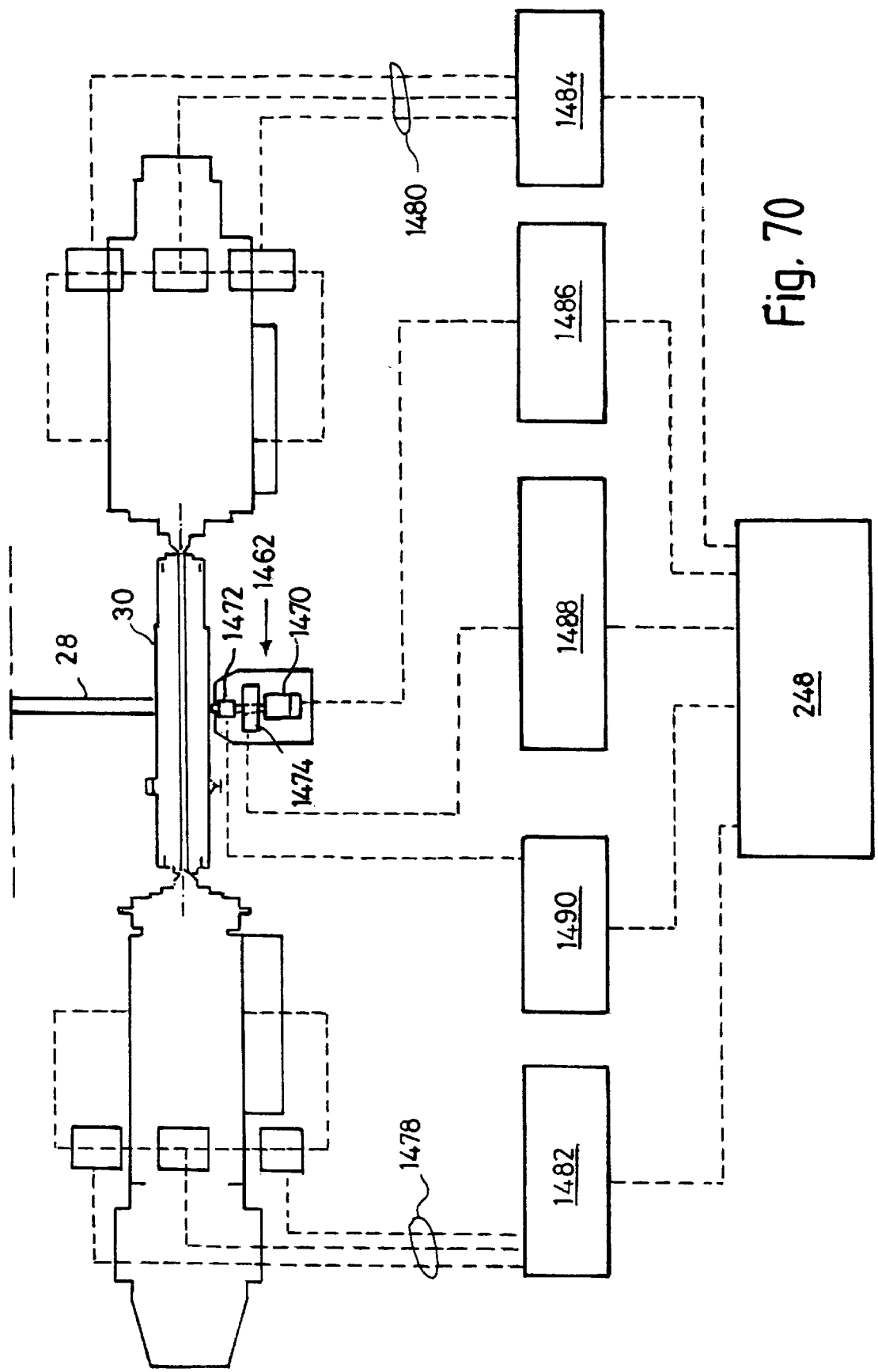
Figure 71:
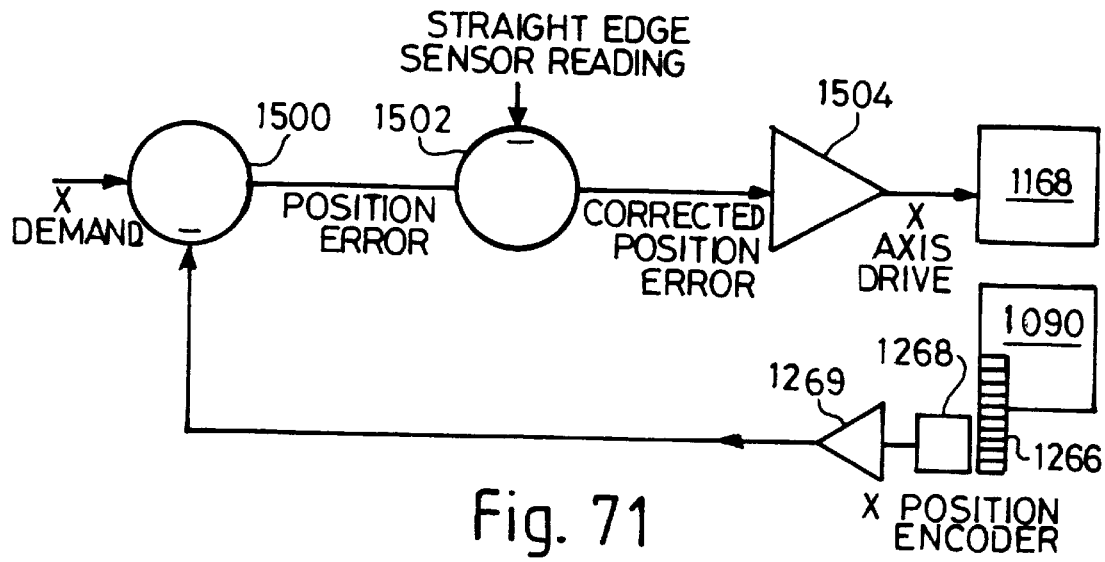
Figure 72:
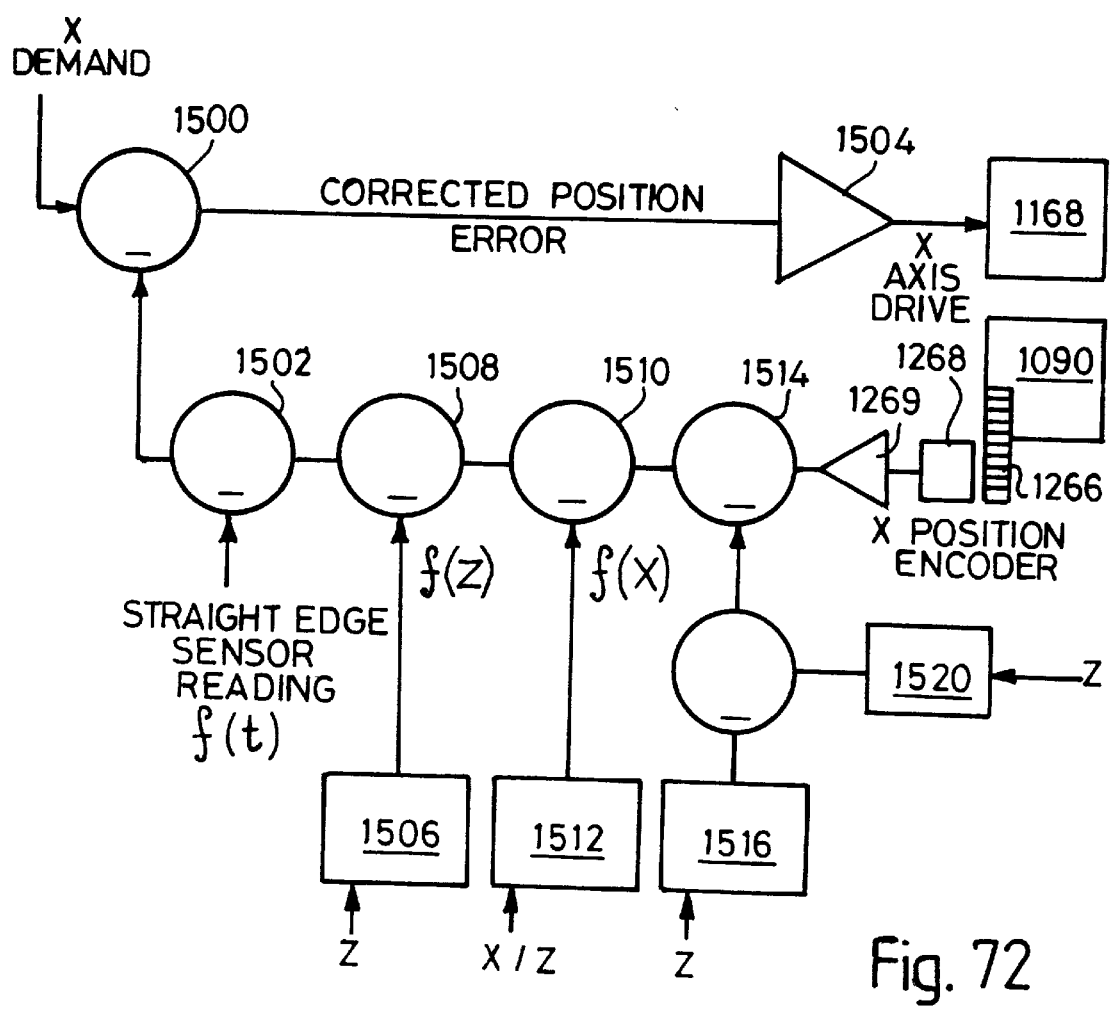

FIG. 32 is an elevation partly in section of the right hand end of the machine, and shows the right hand end of the worktable and right hand bulkhead to which the other set of telescoping covers which protect the right hand end of the worktable slideway are attached, and also the drive to the bulkheads and covers;

FIG. 33 is a cross-section through the worktable (on the line AA in FIG. 34), which extends between the right hand end of FIG. 29 and the left hand end of FIG. 32;

FIG. 34 is an elevation through the worktable with the central section removed, showing detail of the inboard termination of the left hand end of the bulkhead drive;

FIG. 35 is a section on line EE of FIG. 32, giving details of the telescoping cover at the right hand end of the machine;

FIG. 36 is an elevation view, (partly cut away to reduce the overall length), of the potentiometer device for tracking the position of the bulkhead attached to the right hand covers, as seen in the direction of arrow B in FIG. 35;

FIG. 37 is a section showing how the right hand end of a rigid tube which joins the two bulkheads together is secured to the right hand bulkhead;

FIG. 38 is an elevation in cross-section of the right hand end of the workhead assembly;

FIG. 39 is an elevation, in a plane at right angles to the cross-section plane of FIG. 38, of the left hand end of the workhead assembly;

FIG. 40 is a cross-section through the housing at the right hand end of FIG. 39 on the line RR; in FIG. 41;

FIG. 41 is an external elevation of the right hand end of the wheelhead assembly not visible in FIG. 39;

FIGS. 42A and B are a section through the tailstock assembly;

FIG. 43A is an underside view of the tailstock and 43B is a partial right hand end view;

FIG. 44 is a cross-section through a hydrostatic bearing in FIG. 42;

FIG. 45 is a general assembly, partly cross-sectioned, of a wheel head assembly for use in the machine of FIGS. 1 to 4;

FIG. 46 is a plan view of the wheelhead assembly of FIG. 45;

FIG. 47 is a section on the line AA of FIG. 46;

FIG. 48 is a cross-section through a side elevation of part of a hydrostatic head screw drive for advancing and retracting the grinding wheelhead assembly mounted on the platform of the drive shown in FIGS. 45 to 47;

FIG. 49 is a similar view of the remainder of the head screw drive of FIG. 48;

FIG. 50 is an end elevation, partly cut away, of the drive of FIGS. 48, 49;

FIG. 51 is a cross-section on the line XX of FIG. 48;

FIG. 52 is a cross-section through part of a wheelhead drive unit for the grinding wheel of the machine of FIGS. 1 to 4;

FIG. 53 is a continuation of the section of FIG. 52;

FIG. 54 is a cross-section on the line AA of FIG. 53;

FIG. 55 is a side elevation of the x-axis measuring device for the wheelhead assembly of the machine of FIGS. 1 to 4;

FIG. 56 is an end elevation of the device shown in FIG. 55;

FIG. 57 is a plan view of the device shown in FIG. 55;

FIG. 58 is a cross-section through the central vertical spindle incorporating a lifting/indexing facility for the wheelhead assembly of FIGS. 45 to 47;

FIG. 59 is a plan view of the wheelhead swivel drive unit, as shown in the wheelhead assembly of FIG. 46;

FIG. 60 is an elevation of the drive unit of FIG. 59;

FIG. 61 is a cross-section through one of two diameter measuring guages (such as Movomatic guages), mounted on the worktable slideway to assist in size control and in obtaining parallel grinding;

FIG. 62 is a side elevation of a wheel guard assembly for fitting to the machine of FIGS. 1 to 4;

FIG. 63 is a front elevation of the assembly of FIG. 62;

FIG. 64 is a schematic arrangement showing how a coolant nozzle can be accommodated onto the assembly of FIGS. 62–63;

FIG. 65 is a front elevation similar to that of FIG. 63 with the nozzle shown in position;

FIG. 66 is a side elevation of a support assembly and a wheel forming unit, mounted on the headstock housing;

FIG. 67 is an end elevation of the assembly of FIG. 66;

FIG. 68 is a side view of an electrolytic wheel dressing device adapted to be mounted on the top face of the wheelguard of FIG. 62;

FIG. 69 is a side elevation of a shoulder touch probe for use with the machine of FIGS. 1 to 4;

FIG. 70 is a block schematic diagram showing how the grinding wheel forces acting on the workpiece can be resisted by an active worksteady controlled by signals form the headstock and tailstock, and FIG. 71 is a schematic diagram showing how an error signal from the capacitance guage can be used to influence the X-axis wheelhead position; and FIG. 72 is a similar schematic diagram showing an alternative way of influencing the X-axis wheelhead position not only from the capacitance guage but from other error signal inputs.

DETAILED DESCRIPTION OF THE DRAWINGS

I General overview

The complex machine shown in the drawings will be described in detail with reference to the different sections of the machine which make up the whole. However by way of introduction a general overview of the machine will be gained by referring to FIGS. 1 to 4.

The machine shown in the drawings comprises a cylindrical grinding machine capable of grinding to a very high accuracy typically of the order of a few nanometers. In order to achieve such accuracies, control of the workpiece, the wheelhead and the grinding wheel must be very precise and vibration which can arise during operation of the machine and which can be transmitted to the machine by outside influences must be reduced to a very low level. Failure to isolate the workpiece and grinding wheel from vibration whether internally or externally originating, will prevent the machine from performing to the high level of accuracy desired.

Figure 1:
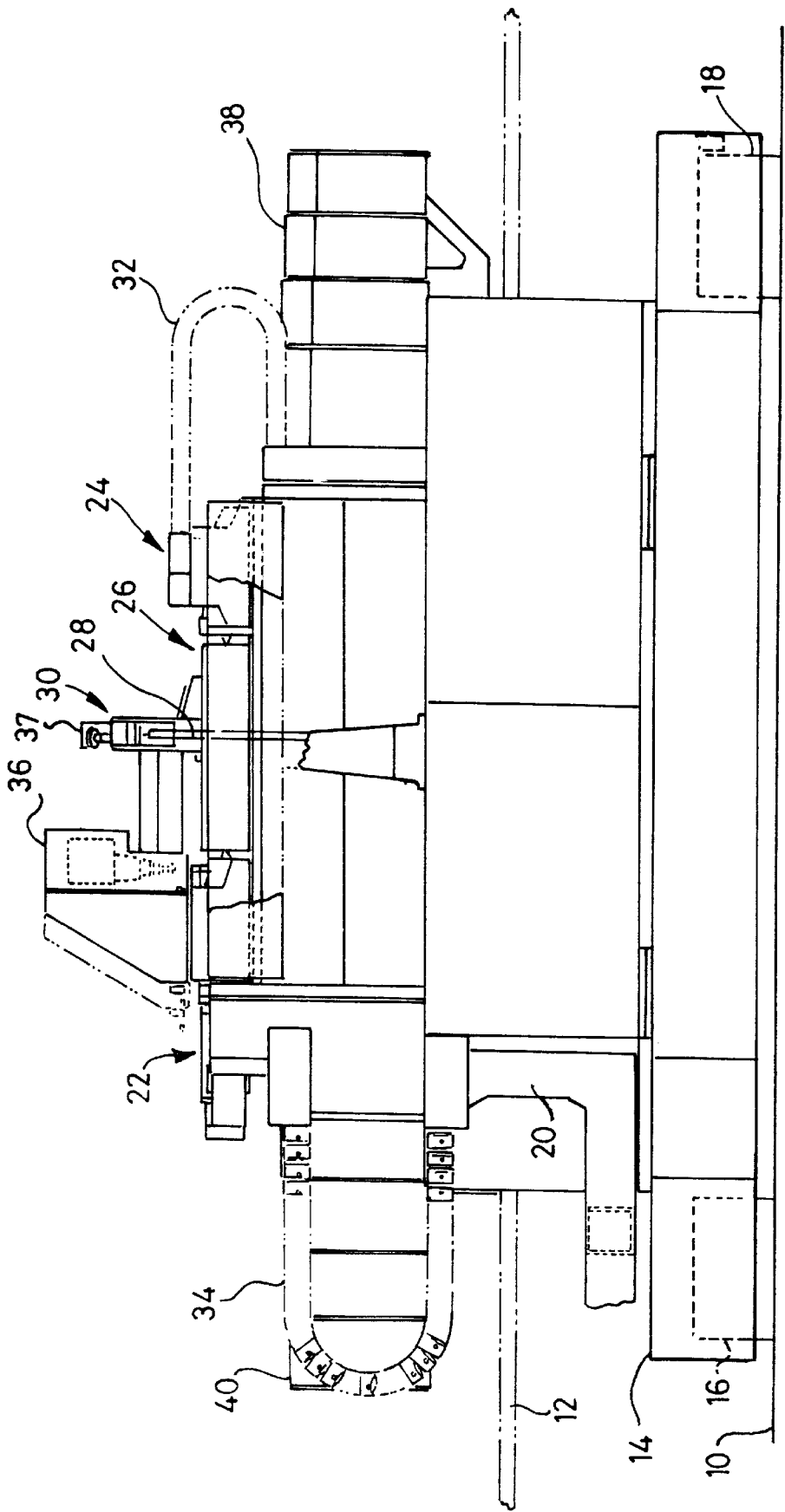
FIG. 1 is a front elevation of a grinding machine embodying the invention.

FIG. 1 is a side elevation of the machine viewed from the side on which an operator would stand. The machine base is of such size that the wheelhead and workpiece region of the machine would be out of reach to a human operator if the latter were to stand on the same floor as the base rests. To this end the machine base is shown sitting on a foundation floor 10 and the floor on which an operator stands is denoted by 12. The latter is apertured to permit the base structure to extend freely through the floor 12.

An intermediate support frame 14 of generally triangular outline when viewed in plan, is carried by vibration isolators, two of which are visible in FIG. 1 at 16 and 18. Vibration isolation brakepoint frequencies are selected as 2.5 Hz for vertical components of vibration and 5.0 Hz for horizontal components of vibration.

The foundation floor 10 is typically constructed from concrete. The machine frame generally designated 20 is typically formed from Polymer concrete typically ACO Polymer concrete, and supports at the left hand end a workhead assembly 22, at the right hand end a tailstock assembly 24 for supporting therebetween a workpiece generally designated 26 for grinding by a grinding wheel designated 28 carried in a wheelhead assembly generally designated 30. The frame 20 (commonly called the machine bed) is mounted in the frame 14 three feet assemblies.

II Services for workhead and tailstock

Hydraulic, pneumatic and electrical power, cooling fluid and the like are conveyed via umbilical tubes 32 between the bed and the tailstock and 34 (between the bed and the guard assembly).

Housing 36 contains a forming wheel advance/retract mechanism which will be described in more detail later.

Housing 37 contains an electrolytic wheel dressing device by which the grinding wheel 28 can be referred periodically, as required.

Also visible in FIG. 1 are telescoping shrouds 38 and 40 the purpose of which is to protect the slideways on the worktable, a for the headstock and tailstock, see section XI below.

Figure 2:
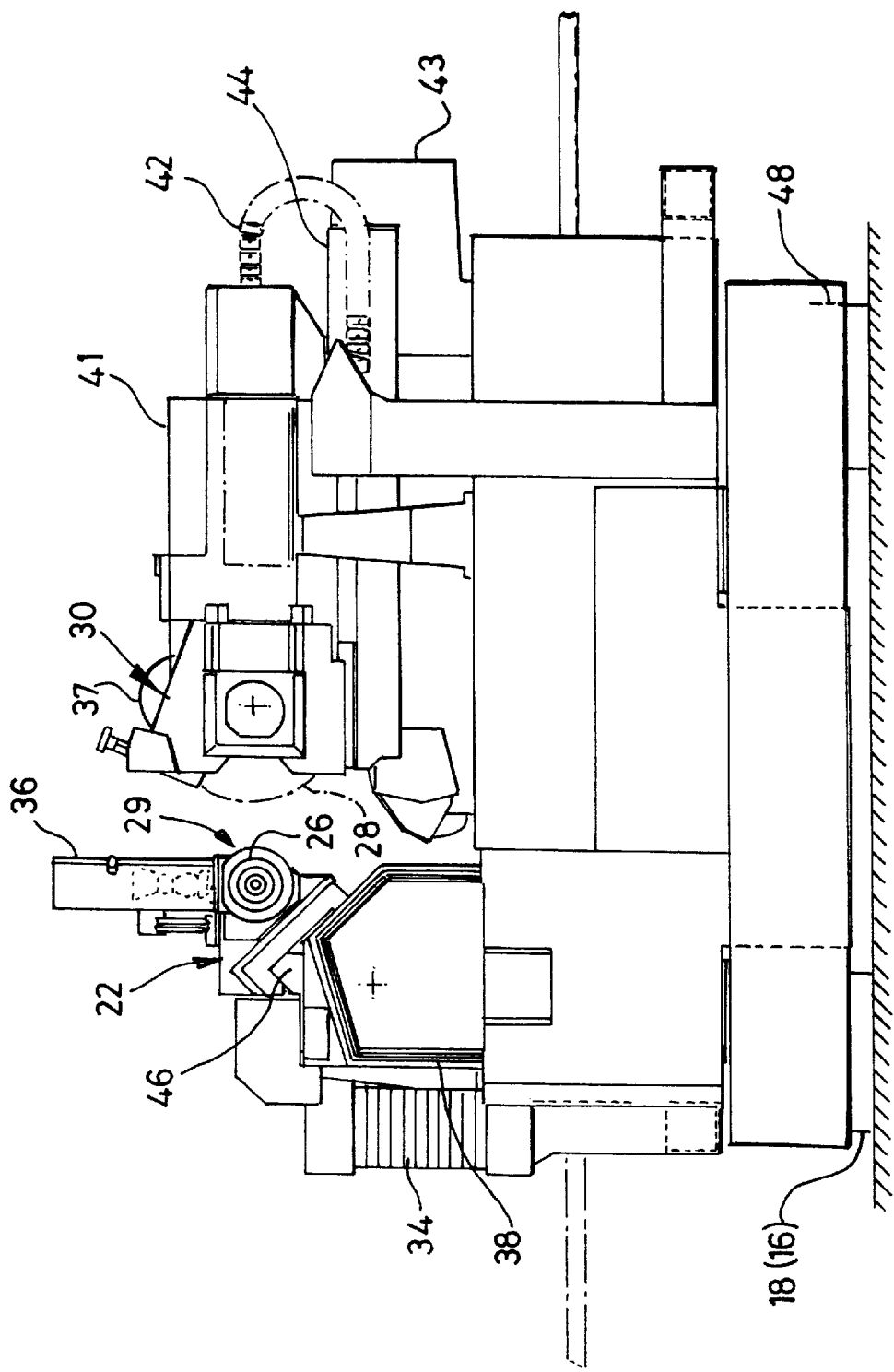
FIG. 2 is an end view of the machine of FIG. 1.

In FIG. 2 a third umbilical 42 conveys services from the machine housing to the wheelhead assembly 30 which is movable towards and away from the workpiece 26 and slideway 44. Also visible is the section through the worktable 46 on which the workhead and tailstock assemblies slide. In FIG. 2 the tailstock assembly is missing thereby revealing the workpiece 26 and workhead assembly 22 and wheel dressing housing 36. The telescoping shrouds 38 can be seen below the worktable 46 as can the segmented umbilical 34 providing services to the headstock assembly.

A third of the four isolating and levelling feet on which the frame 14 is mounted can be seen at 48, the fourth one being hidden from view.

Figure 3:
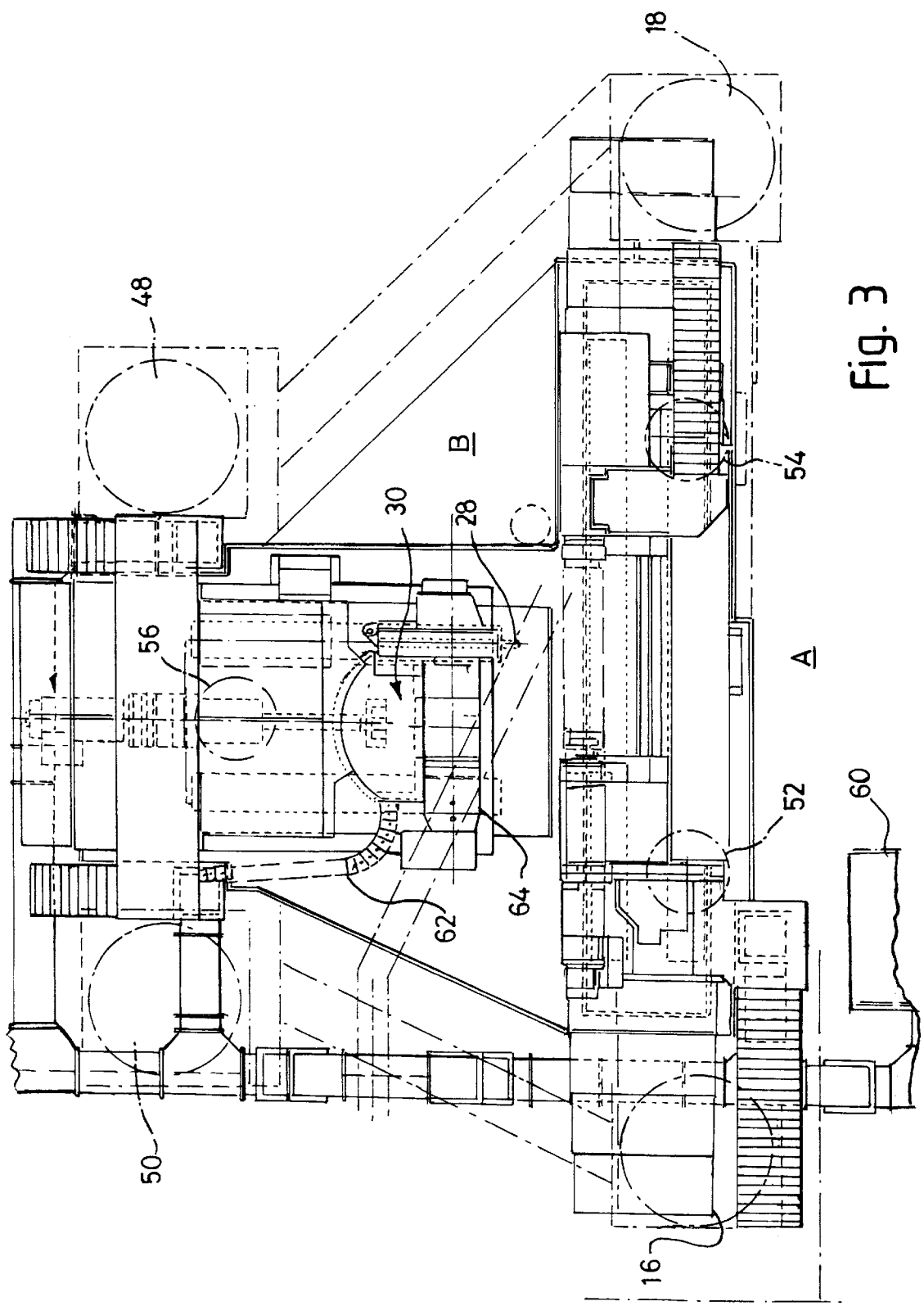
FIG. 3 is a plan view of the machine of FIG. 1 with some parts removed for clarity.

FIG. 3 is a plan view of the overall machine which shows in hidden detail four isolating and levelling feet 16, 18, 48 and 50 and also by way of hidden detail the three mounting points between the machine frame 20 and the intermediate frame 14 shown at 52, 54 and 56.

III Main services for the machine

These are provided via ducting 58 and feedback and control cabling and piping communicates via the same ducting and a control console 60 positioned to the left of the main operator workstation designated by A. A second operator position is shown at B.

A further umbilical 62 serves to convey services directly to the wheelhead assembly 30 from a rearwardly mounted section of the wheelhead assembly. Grinding disc is shown in dotted outline and is designated 28 as before and the drive motor for the disc is shown at 64.

Figure 4:
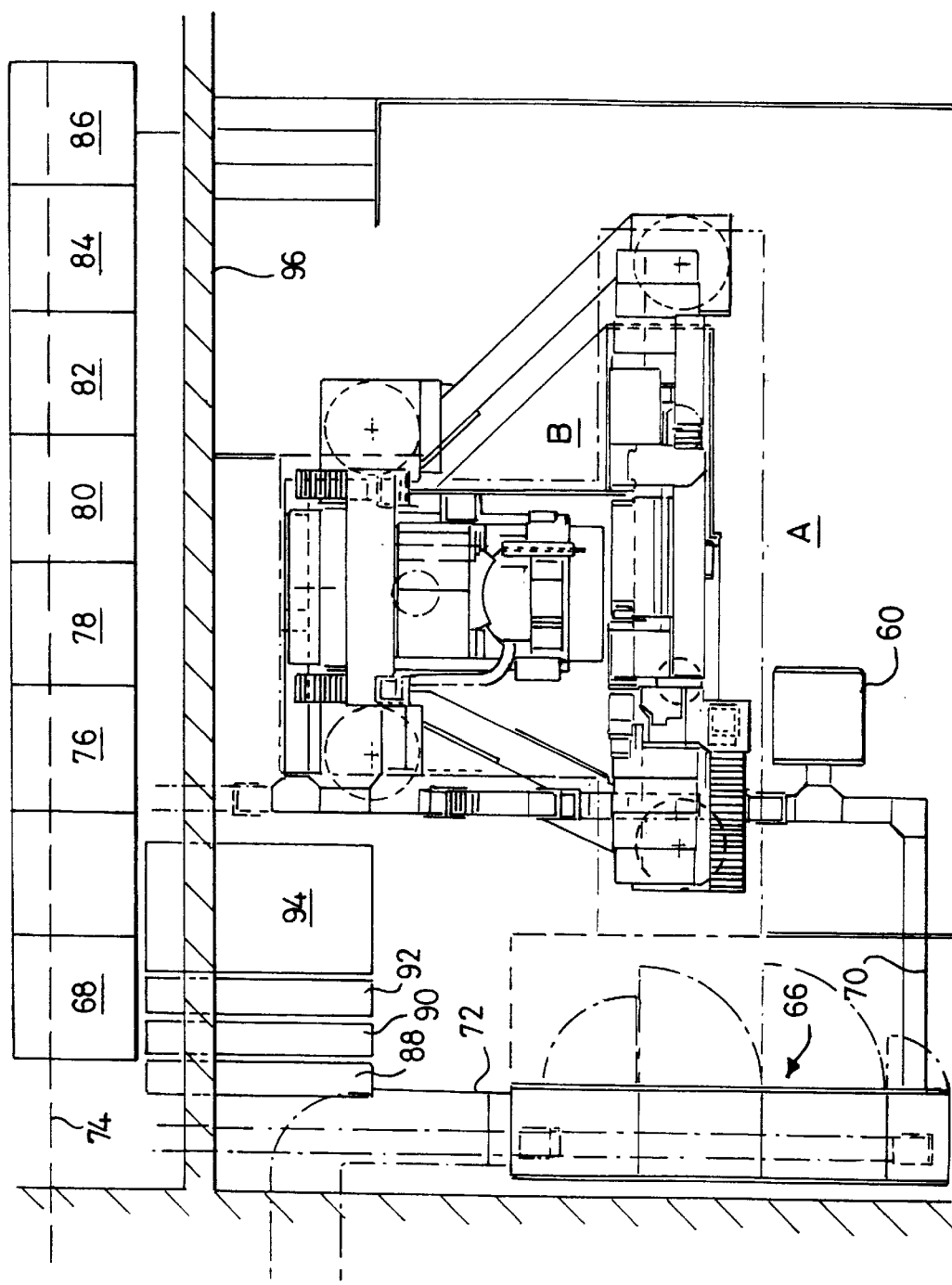
FIG. 4 is a plan view of the machine with its surrounding controls and power supplies.

FIG. 4 shows the machine in relation to the power supply cabinets, control system cabinets, machine coolant pumps and hydrostatic tanks. The same reference numerals are used as have been employed in earlier figures to denote similar parts.

Electrical power supply and control system cabinets are shown at 66 and 68 and additional ducting at 70 conveys cabling between the controller 60 and the cabinets 66 and 68.

Overhead extraction of fumes and removal of air for cooling is effected by means of overhead ducting 72 and 74. Extractor fans or the like are provided (not shown).

In addition to the electrical cabinet 68, electrostatic cleaning for the fluid from the linear bearings is provided in cabinet 76 together with the closed hydraulic system transformer. Electrostatic cleaning of fluid from the rotating bearings is contained in cabinet 78 together with double refrigeration unit and hydrostatic control of the fluid to and from the linear bearings and rotating bearings is provided in cabinet 80.

Filters for the various hydraulic and where appropriate pneumatic circuits are included in cabinet 82.

Coolant for supply to the workpiece and a double refrigeration unit are included in cabinet 84 and coolant pumps are contained within cabinet 86.

Tanks 88 and 90 contain hydrostatic oil, 92 contains machine coolant and 94 workpiece coolant. Pipework between the tanks and the respective cabinets 76, 78, 80, 82, 84 and 86 is provided together with pipework from the cabinets to the machine and from the machine to the tanks.

The cabinets 68 to 86 are conveniently located behind a wall designated 96 and where appropriate ducts are provided through the wall for the interconnection of services.

IV Cooling

Cooling of the various parts of the machine which generate heat in use is effected by pumping fluid (typically chilled water) through cooling labyrinths in the spindle housing, headstock, wheelfeed and tailstock. The rate at which heat can be removed is controlled by maintaining a constant reduced inlet temperature and individually varying the flow rate to each controlled area on the machine using closed loop temperature controllers. An inlet temperature of 18.5° C. will allow up to 3.5 Kw of heat to be removed using a flow rate of 32 litres per minute of water from each part of the machine if the exit temperature is to be 20° C.

Figure 5:
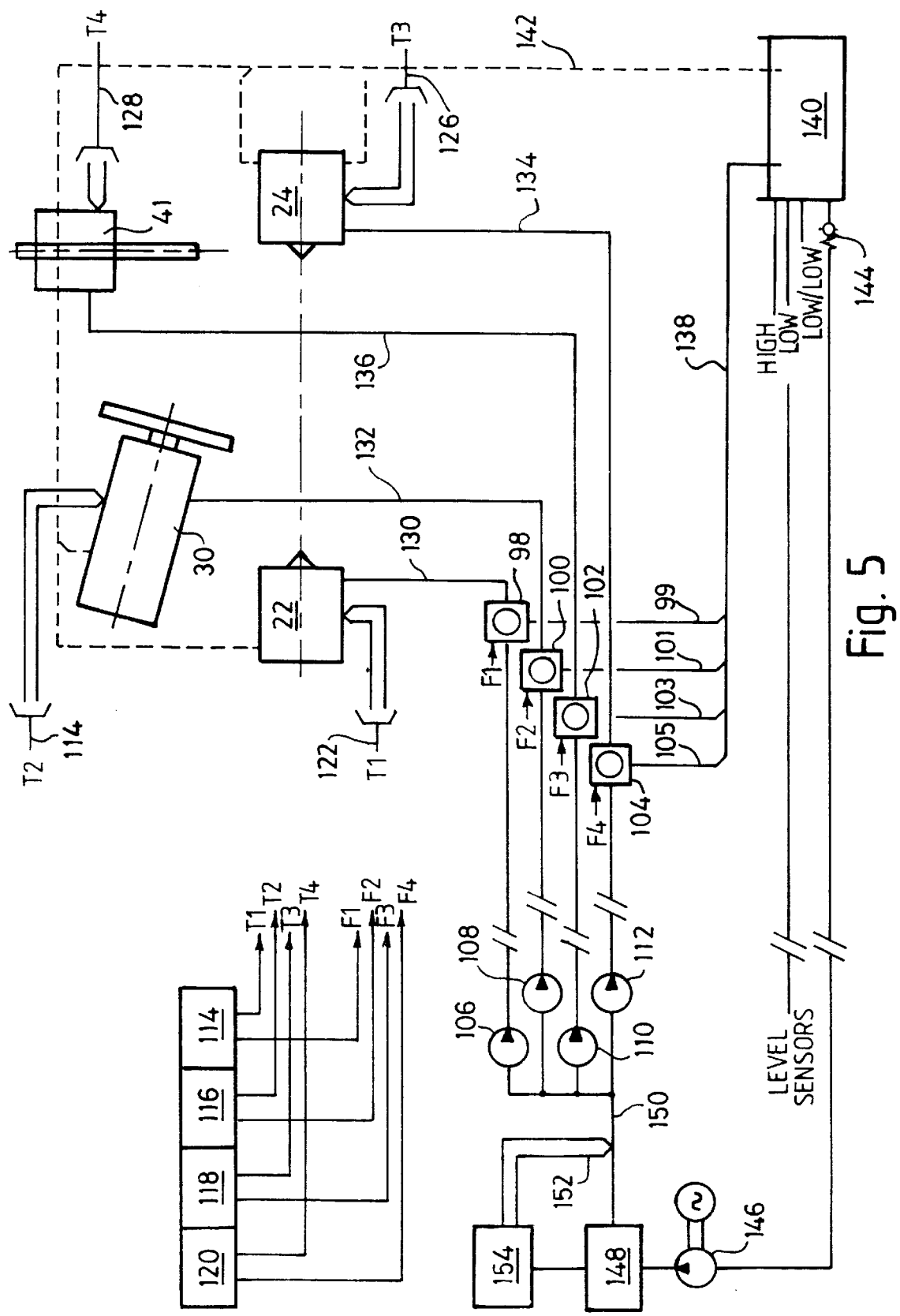
FIG. 5 is a flow diagram of the cooling system of the machine.

The cooling of the machine will be described in greater detail with reference to FIG. 5. This shows the four active sites, namely the workhead 22, the wheelhead 30, the wheelfeed 41 and the tailstock assembly 24.

Fluid is supplied to each of the four active sites via flow control valves 98 to 104 and pressure is maintained by line pumps 106 to 112. Each of the flow control valves is independently controlled by a signal F1, F2 etc from each of four temperature controllers 114 to 120, and temperature signals for the controllers are developed by platinum resistance probes 122, 114, 126 and 128 respectively associated with the workhead, wheelhead, tailstock and wheelfeed respectively. Each of the temperature probes senses the temperature of the fluid leaving each of the respective devices. The flow control valves 98 to 104 serve to control the rate of flow of coolant fluid along feeds 130, 132, 134 and 136 to the workhead, wheelhead, tailstock and wheelfeed respectively and unwanted coolant fluid is returned via dump lines 99, 101, 103 and 105 to a common return line 138 feeding unwanted coolant fluid to the collection tank 140.

After passing through each of the workhead, wheelhead, tailstock and wheelfeed respectively, the coolant fluid is returned via a common return path 142 to the collection tank 140.

A one-way valve 144 prevents suck-back into the tank and a master pump 146 serves to deliver fluid from the tank 140 to the refrigeration unit 148. The latter delivers cooled fluid to the line 150 feeding the line pumps 106 to 112 and the temperature of the fluid in line 150 is sensed by a platinum resistance temperature probe 152. The signal developed by the latter controls a temperature controlling device 154 which in turn controls the operation of the refrigeration unit to maintain the temperature in line 150 constant.

Typically the latter is controlled to 18.5° C. and each of the pumps is capable of delivering 32 litres per minute to each of the workhead, wheelhead, tailstock and wheelfeed respectively. The actual quantity of fluid supplied to each is controlled by the flow control valves as previously described so as to maintain the outlet temperature of the coolant fluid from each of the workhead, wheelhead, tailstock and wheelfeed respectively constant. Typically the exit temperature is controlled to 20° C. so that only 1½° C. rise occures as the coolant passes through each of the components.

It will be seen that within the capabilities of the pumps 146 and 106 to 112, each of the workhead, wheelhead, tailstock and wheelfeed can be controlled in temperature irrespective of the head developed during operation within each of said units.

Since the system is essentially closed loop, and since the volume of the return paths 99 to 105 and 138 is relatively small as compared with the coolant system volume associated with the feeds and returns and active sites, increased demand for cooling will result in less fluid being returned via path 138 and more fluid being tied up in the cooling passages associated with the active sites. The level in the tank will drop and this can be used to trigger an alarm and machine shut-down in the event that the level drops below a given threshold.

Monitoring the individual temperatures can also be used to instigate machine shut-down in the event of temperature overrun.

The level sensing loop additionally safeguards coolant fluid loss due to leakage or otherwise.

V Block schematic of overall machine

Figure 6:
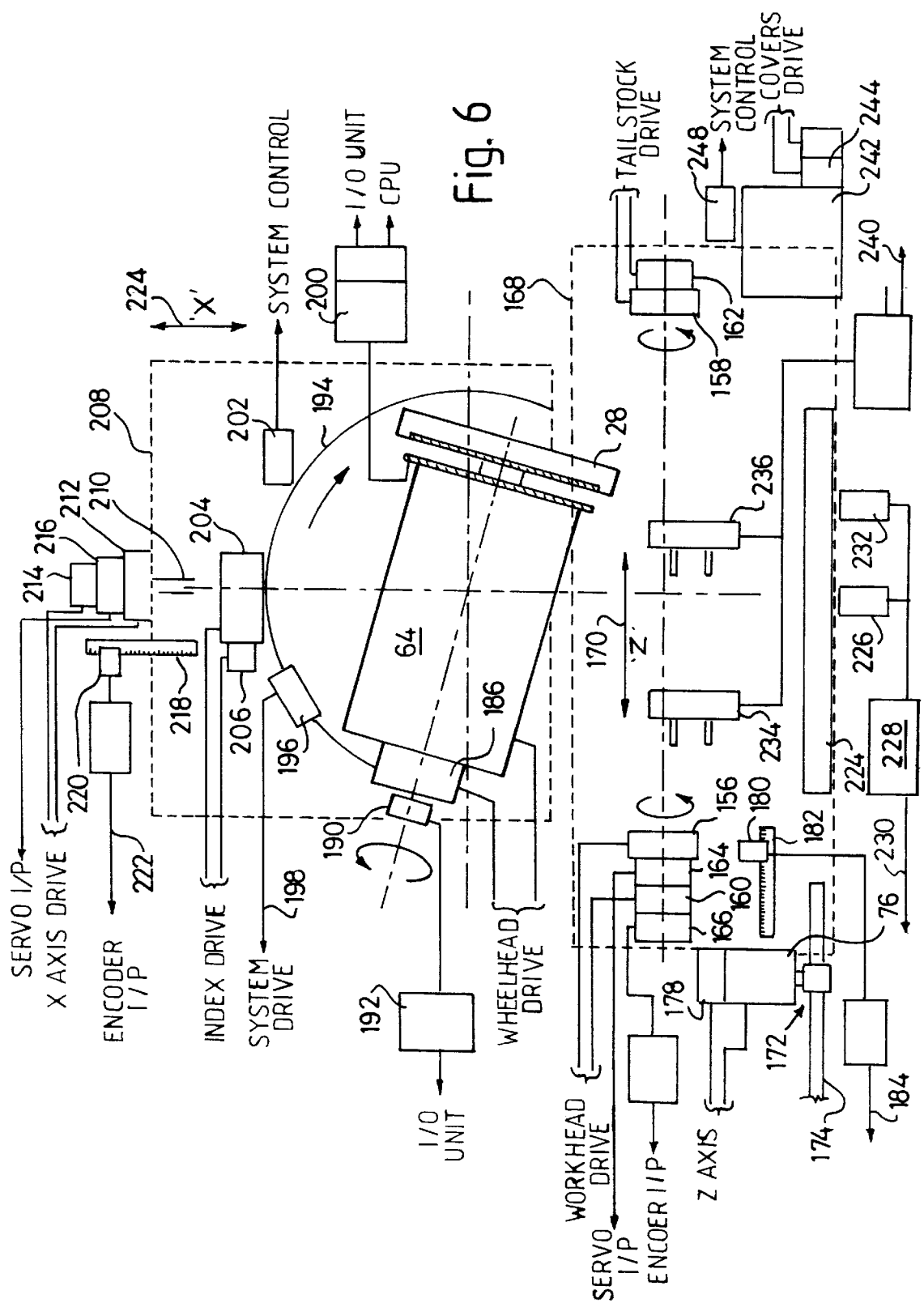
FIG. 6 is a schematic diagram of the essential operating parts of the machine.

FIG. 6 is a schematic block diagram which indicates the essential parts of the grinding machine some of which have already been referred to.

Essentially the workpiece (not shown in FIG. 6) is located between the workhead and tailstock and both are driven in the same sense and at the same speed and in phase so that no torque is developed across the workpiece due to frictional drag at a stationary tailstock. To this end both workhead and tailstock include a drive motor 156 and 158 and a resolver 160 and 162 respectively. Speed and radial position of the workhead drive are developed by a tacho 164 and an encoder 166. The tailstock motor is slaved to the workhead motor.

The workhead and tailstock are maintained in fixed relationship on a worktable 168 which itself is slidable linearly in the direction of the Z-axis shown at 170. Z-axis drive is achieved by means of a friction drive unit indicated diagrammatically at 172 as cooperating with a smooth rail 174. The drive is rotated by means of a motor 176 the speed of which is indicated by means of a tacho 178.

Linear position of the worktable is obtained by signals from an optical reading head 180 operating in conjunction with a linear scale in the form of a grating 182. Positional information is available via signal path 184. Although shown distant from the point at which the wheel engages the workpiece, the optical reading head cooperates with the grating is preferably arranged so as to be as near as possible in line with the wheel. Ideally the grating scale 182 should be read at a position in line with the wheel. However, the X-axis correction capacitance measuring device (to be described) will suffer from much more serious errors if it is not in line with the wheel and where the worktable is relatively long and the scale 182 is therefore also relatively long it has been found that provided the Z-axis reading head 180 is in line with the wheel it can be located below the plane containing the workpiece and wheel axes without machine errors arising.

The wheelhead and grinding wheel mounted thereon is driven by a DC brushless motor 64 commutated by a brushless resolver integral within the spindle assembly at 186. A gap sensor 190 and associated gap control device 192 are provided.

The motor and wheelhead assembly 64, 28 is mounted on a turntable to permit rotation of the wheel axis about a vertical axis orthogonal to the motor axis. Part of the turntable is shown at 194 and a rectilinear potentiometer 196 provides rotational positional information along 198 to the system control (to be described).

Wheel balancing is effected through a wheel balance control system 200.

VI Wheelhead indexing

The turntable is rotatable relative to a support and both have cooperating rings of gear teeth which engaged to hold the turntable in any selected position, but can be disengaged by lifting the turntable relative to its support, to allow indexing to occur.

A rectilinear potentiometer 202 provides an output signal to the system control (to be described) indicating when the turntable has been lifted by a lifting mechanism (not shown) clear of the indexing teeth (to be described).

Indexing of the turntable 194 is achieved by a drive motor 204 and rotating resolver 206 after the turntable has been lifted. The arrangement of the teeth associated with the turntable and its support permit N equally circularly spaced positions to be accurately defined. The lifting and indexing mechanisms will be described in more detail with reference to FIG. 6.

Normal cylindrical grinding will be achieved using the wheel with its axis parallel to the Z-axis. However where a different angle of attack is required, indexing the turntable to the desired angular position will cause the grinding wheel to present to the workpiece at the correct angle.

VII Wheelfeed

The turntable itself is mounted on a table or wheelslide 208 (item 44 in FIG. 2) which itself slides on the slideway 43 shown in FIG. 2. Wheelfeed, that is movement of the wheelhead towards and away from the workpiece, is achieved by means of a lead screw type drive 210 driven by a motor 212 with a commutating resolver 214 and associated tacho 216. The output from the latter provides the input signal to a velocity controlled servo-system. Although final positioning is achieved using a linear grating (see Section VIII) initially, until the wheelhead approaches the desired position, it is the wheelfeed is velocity which is controlled and the motor 210 is rotated at a speed for a given length of time which can be computed to move the wheelhead through a given distance either towards or away from the workpiece.

VIII X axis position measurement

A linear grating (scale) 218 is carried by the wheelslide 208 and an optical reading head 220 is fixed to a stationary part of the machine to provide an electrical signal along line 222 from which the position of the wheelslide can be determined. The direction of movement of the wheelslide is commonly referred to as the X axis of the machine as specified by reference numeral 223. The positional information from the encoder 220 thus corresponds to the position along the X axis. The linear scale 218 is mounted at grinding wheel centre height and as near in line as possible to minimise offset and therefore minimise errors.

A rigid cover fitted to the wheelslide 208 (not shown) to protect the settings of the optical reading head.

IX X axis correction

Since it is an objective of the machine design to permit workpieces to be ground to an accuracy of a few nanometers, it is important that the precise position of the workpiece axis is also known to a level of accuracy greater than that of the grinding process. The axis can be defined accurately using precise end bearings in the workhead and tailstock but since the work table 168 has to be capable of sliding along the Z-axis 170, a working clearance must be provided to enable the sliding to take place and in order to compensate for yaw and roll errors, a reference straight edge 224 is provided mounted on the work table 168. The straight edge is preferably formed from ceramic.

The position of the reference straight edge relative to an electrode fixed to the machine forming a capacitance guage 226, is determined, and an electrical signal is developed by a guage conditioning unit 228 for supply to the overall system control along line 230. As with the grating 182, the guage 226 is preferably located close to the point of wheel/workpiece engagement. The face of the straight edge which cooperates with the electrode is metallised as by a hard chrome coating.

The wheel, work and capacitance guage are at the same height so as to provide accurate compensation, and the capacitance guage is "in line" with the wheel when the latter is square to he workpiece.

Any movement of the work table 168 (and therefore the reference straight edge) perpendicular to the Z axis, relative to the machine will register as a change in capacitance seen by the guage conditioning unit 228, and an appropriate correction signal can be generated to indicate the lateral shift of the worktable 168.

Since the reference straight edge itself may not be perfectly straight and flat and may not be mounted absolutely parallel to the Z axis slide, the invention provides for an initial calibration step in which the straighness (or lack of straightness) is determined and stored in a memory as a look up table relative to position along the length using one end as a datum, and a second level of calibration in which the worktable 168 is moved from one end of its travel to the other and any capacitance variation as measured by the guage 226 is recorded and stored as a second look up table against Z-axis position. The look-up table calibration signals and available to correct the capacitance guage 226 reading for each Z axis position of the reference straight edge during subsequent machining operations. In this way the measured value from the capacitance guage 226 supplied to the overall system control along line 230 is corrected for any non-flatness and non parallelism of the reference straight edge.

The calibration process described above may of course be replicated for different temperatures within the normal restricted temperature range over which the machine is expected to work and further look-up tables provided so that not only Z-axis position but also machine temperature is taken into account in determining the calibration value to be used at any point in time during subsequent machining.

In addition the calibration process may be repeated a number of times and a mean value for each Z position determined for storage in the look-up table.

Since the capacitance changes will be very small the sensitivity of the capacitance guage can be substantially increased by using a capacitance bridge technique and in this case a second capacitance guage must be provided having a fixed capacitance substantially equal to that of the capacitance of the first guage 226. The second capacitance guage is shown at 232 and typically is mounted in close proximity to the capacitance guage 226 on the same part of the overall structure so that environmental influences such as humidity and temperature which could affect the absolute capacitance of the guage 226 will also affect the guage 232 and will be cancelled out. Although not shown a capacitance bridge circuit is created using the two capacitance guages 226 and 232 so that the conditioning unit 228 looks at the difference between the two capacitances rather than trying to measure the absolute change of capacitance in one or the other.

Although not shown in FIG. 6, a metal cover of rigid and substantial proportions is mounted on the worktable so as to enclose the capacitance guages. The purpose of the cover is partly to electrically shield the guages again stray capacity (hand capacity of an operation is sufficient to alter the capacitance value readings but also to prevent an operator from touching and moving the capacitance guages and upsetting their calibration.

X Workpiece diameter sizing

Sizing of a workpiece during grinding is effected by means of diameter measuring guages 234 and 236. Typically Movomatic guages are employed and electrical signals therefrom are supplied to a guage conditioning unit 238 for supply to the overall machine control system via line 240.

XI Slideways and protective shrouds

The worktable slideway on which the headstock and tailstock are carried, is preferably formed from ceramic and needs to be protected. In particular it is important to keep grinding wheel cooling fluid from mixing with oil used to lubricate the slideway. Covers 38 and 40 are provided as described with reference to FIG. 1. The covers are multi-section telescoping arrangements so that movement of the worktable along the Z-axis can be followed by the cover assembly. However since the sliding and telescoping of the various sections making up the covers 38 and 40 can introduce vibration and unwanted errors in the Z-axis, the covers 38 and 40 are mounted independently of the workhead and tailstock assemblies so that although they cover the worktable slideway for the latter, they are physically separated from the worktable. In order to provide for movement, the right hand cover assembly 242 is provided with a motor 244 (see FIG. 6). A commutating resolver 246 is associated with the motor. A rectilinear potentiometer associated with the assembly 242 is denoted by reference numeral 248. This provides positional information to the system control. The left hand cover assembly is joined to the right hand cover assembly so that movement of the latter is followed by the former and as the worktable moves left or right the covers follow to cover the slideway.

XII Control system

Figure 7:
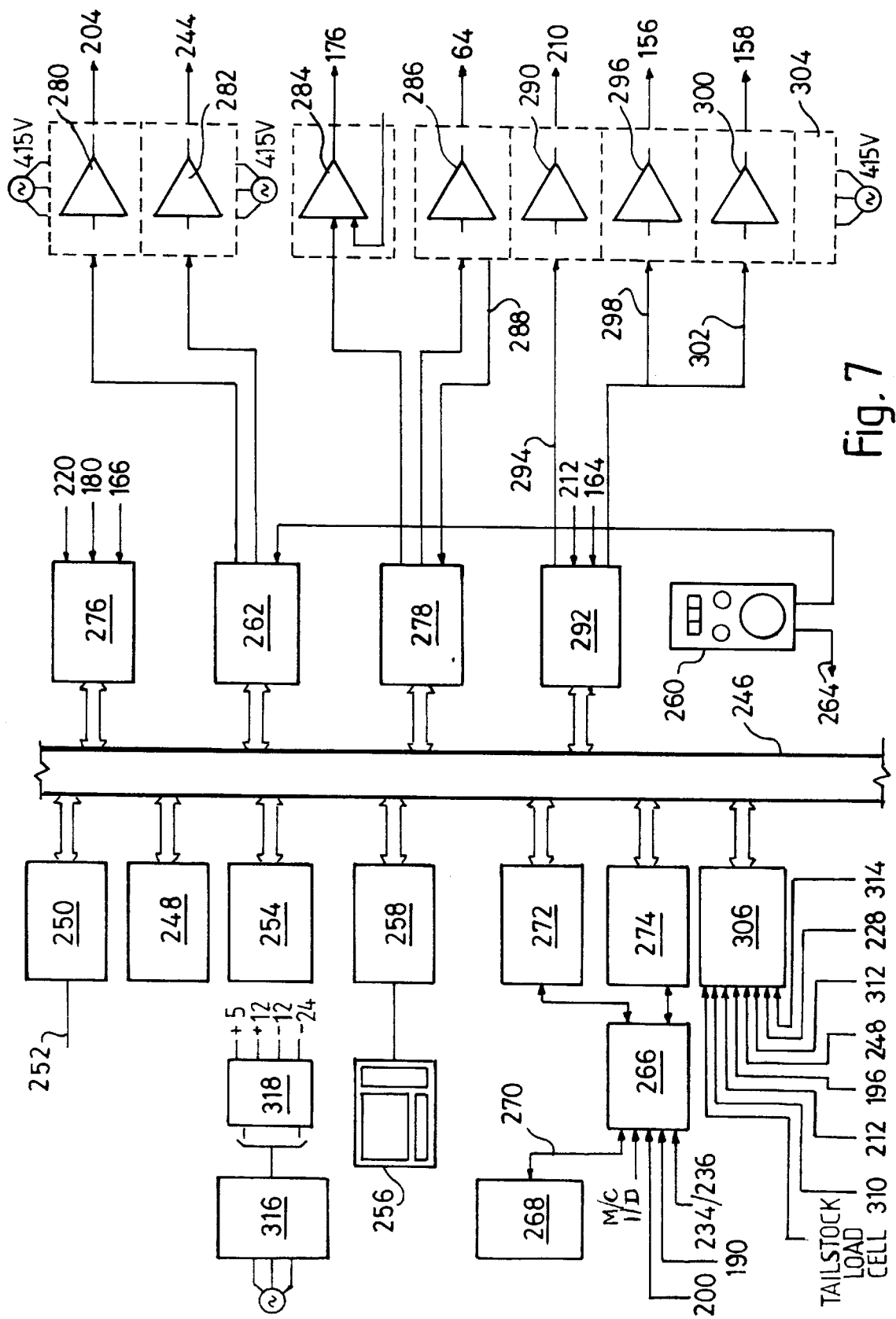
FIG. 7 is a block schematic diagram of the electrical monitoring and control system of the machine.

FIG. 7 is a block schematic diagram of the control system including the operators console of the grinding machine shown in FIGS. 1 to 6.

Some of the parts of the control system generate data which is then required by or used to control other parts of the control system and machine and to this end a common VME bus 246 is provided as a main data highway to which all of the intercommunicating separate parts of the control system are connected. The control system integers will be listed below.

A first central processing unit 248 provides the main processing power for retrieving and processing information.

The second central processing unit 250 provides control signals via a serial link 252 to the wheel balancing control device associated with the grinding wheel, (control unit 200 in FIG. 6).

A random access memory board 254 provides memory for calibration and other routines together with additional memory for use by the central processing units 248 and 250 as required. In particular RAM 254 will include the calibration signals derived in relation to the reference straight edge 224.

The control console 60 shown in FIG. 4 comprises the operator station 256 together with terminal and display 258. Typically the terminal and display are incorporated into the console 60.

Programmes for running the machine are entered via the terminal and the machining process and general operation of the machine can be displayed using both the computer terminal of 258 and other displays associated with the operator station 256.

A portable control unit 260 is also shown in FIG. 7. The output from the portable control is fed to the databus via an encoder servo interface 262 and/or via line 264 to an input/output unit 266.

The latter also receives data from the wheel balancer 200, the gap sensor 190 and the circumference measuring guages 234 and 236 all shown on FIG. 6.

The machine services are designated by a signal unit on FIG. 7 at 268. These are described in more detail elsewhere but essentially comprise the controls for the cooling fluids and the lubricating oils. Data to and from the machine service control is achieved via link 270 via the interface unit 266. Since a large amount of data may have to be transferred to and from the input/output unit 266 and the databus 246, a pair of parallel input/output batches 272 and 274 are provided enabling data to be transmitted in both directions.

The X-axis encoder 220, Z-axis encoder 180 and the workhead encoder 166 provide data to an encoder interface unit 276 and data is supplied from and to the databus 246 via tne encoder interface unit 276.

Two encoder servo interfaces are provided one denoted by reference 262 and the other by reference numeral 278. The former receives data from the hand-held unit 260 but also delivers signals to the index drive 204 via a digitax drive control unit 280 and to the covers drive 244 via a second digitax drive control unit 282.

X-axis drive signals are supplied to the motor 176 from an amplifier 284 which receives control signals from the second encoder servo interface 278.

The wheelhead drive motor 64 is controlled by a power amplifier 286 which receives control signals via encoder servo interface 278 and provides a tacho output from the wheelhead via line 288.

The X-axis drive motor 210 is controlled by a power amplifier 290 which receives control signals from a master/slave servo interface 292 along line 294. The Xaxis tacho 212 provides input signals to the master/slave servo interface 292 as does also the workhead tacho 164.

Control signals for the workhead drive motor 156 are provided via power amplifier 296 which is controlled by signals from master/slave servo interface 292 along line 298 and the tailstock drive motor 158 is controlled by signals from the power amplifier 300 which itself is controlled by signals from the master/slave servo interface 292 via line 302. A power supply unit for the amplifier is shown at 304.

Master system control unit 306 receives data from and supplies data to the bus 246 and receives as input signals outputs from the tailstock load cell 308 the EDW depth guage 310, swivel lift rectilinear potentiometer 202, the index drive rectilinear potentiometer 196, the covers drive potentiometer 248, the shoulder location probe 312, the straight edge capacitance guage 228 and the E. loop 314.

A three phase supply and distribution board 316 supplies power to a power supply unit 318 for generating control voltages for the solid state devices on the various printed circuit boards making up the amplifiers and control systems interfaces, memories and computing devices shown elsewhere in FIG. 7.

Although the drives are electrically powered and much of the sensing is performed electrically and electronically, some of the functions on the machine are performed hydraulically.

XIII Hydraulic circuit

Figure 8:
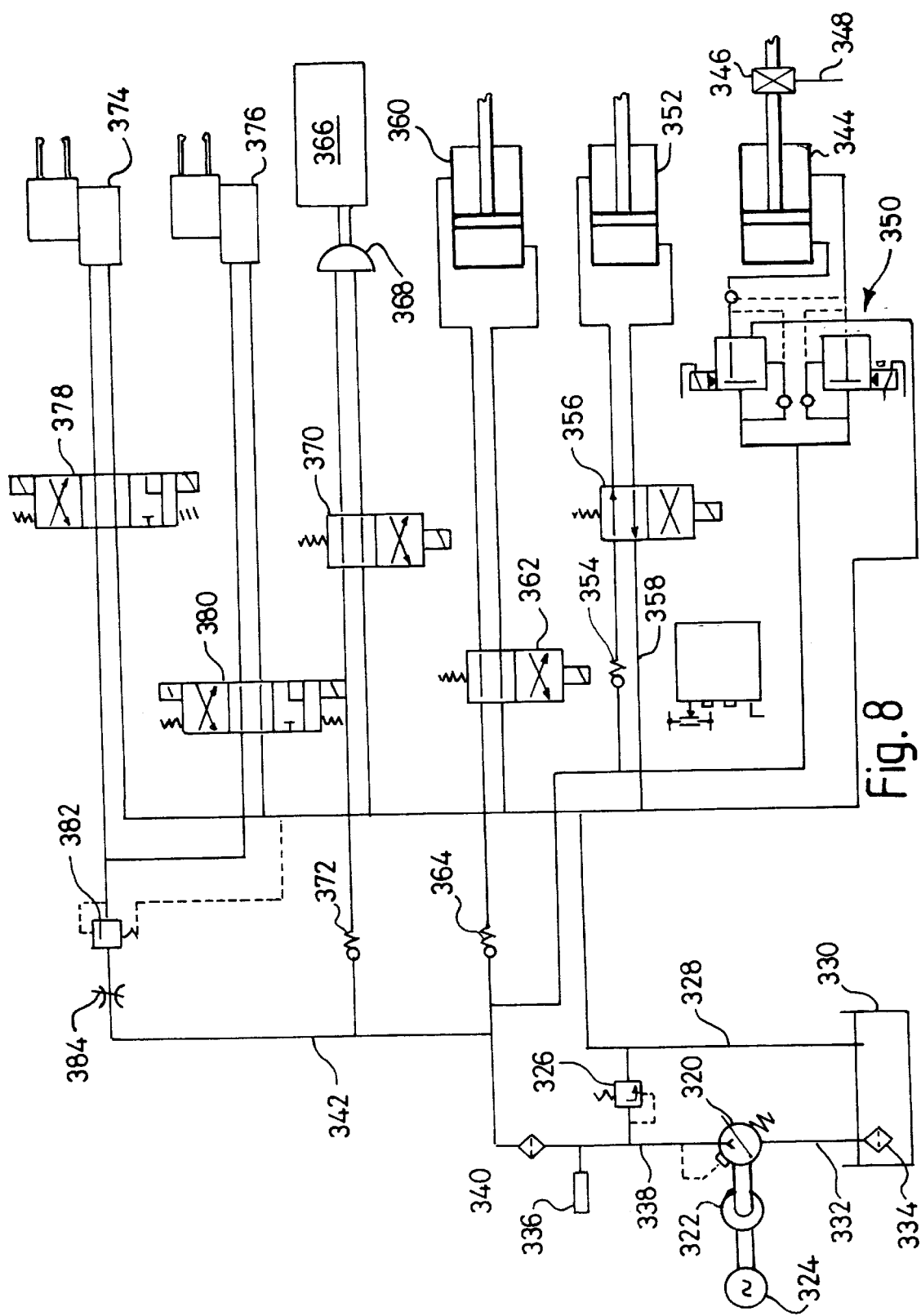
FIG. 8 is a schematic diagram of the closed hydraulic circuits of the machine.

The closed hydraulic circuit is shown in FIG. 8. This comprises a pump 320 powered by an AC motor 322 powered from a source 324. A pressure relief valve 326 diverts surplus oil to a return feed 328 to the hydraulic tank 330 from which oil is drawn by the pump 320 via line 332. A filter 334 protects the pump against the ingress of dirt.

A pressure switch 336 indicates when the line 338 is pressurised and a 10 micron filter 340 protects the remainder of the hydraulic circuit from particle and foreign matter which might otherwise damage seals etc.

The high pressure flow line is denoted in solid black at 342 and supplies the various hydraulic facilities to be described.

A first hydraulic drive 344 provides drive to the tailstock to advance and retract the latter. A load cell 346 senses the thrust exerted on the tailstock by the drive 344 and a load cell signal is supplied to the CNC display along line 348. Flow and control valve means for controlling the tailstock advance drive 344 is designated by reference numeral 350.

The load generated by the tailstock hydraulic cylinder 346 is relayed by the load cell 348 to the CNC display. The operator may then adjust the load by means of a potentiometer/amplifier/control and a 3-way proportional pressure control valve, Type 3, DREP 6 (of Rexroth manufacture). This could be made into a closed loop system. The maximum load may be limited by a disc spring in series with the cylinder/load cell.

The tailstock is clamped in position by a second hydraulic ram 352 to which hydraulic oil is supplied under pressure via a non-return valve 358 and flow control valve 356. In order to unclamp the valve 356 is altered to permit through flow to the return path 328 along line 358.

XIV Hydraulic wheelhead turntable lifting

As described in relation to FIG. 6, the grinding wheel head assembly is mounted on a turntable 194 and the turntable is secured into any one of a large number of different circular orientations each determined by the inter-engagement of cooperating gear teeth, one set on the turntable and the other fixed in relation to the machine. As previously described before the turntable can be indexed, it must therefore be lifted so that the teeth no longer engage.

A hydraulic drive 360 is provided for this purpose and a similar control to 356 is provided at 362 for supplying oil under pressure from the high pressure manifold 342 via a non-return valve 364, to one side of the piston in 360 when the table is to be lifted for indexing, and to the other side of the piston in 360 when the table is to be lowered.

XV Hydraulic actuation of workpiece shoulder measurement

For some types of grinding, a probe is required to determine the position of shoulders on the workpiece which are to be ground. A hydraulic rotary actuator for moving the probe arm 366 is supplied with hydraulic fluid via control 368 and a master control valve 370. Operation of 370 lowers the probe arm and reversing control 370 causes the probe arm to lift. As with other such control valves a non-return valve is provided in the feed line at 372.

XVI Hydraulic drives for Movomatic quages

The movamatic guages 234 and 236 of FIG. 6 must be advanced and retracted and to this end two hydraulic drives are provided for this purpose denoted by reference numerals 374 and 376 respectively.

Hydraulic control valves 378 and 380 respectively control the flow and return of hydraulic oil to the retract and advance drives 374 and 376 and a pressure relief valve 382 is provided on the supply line to both the valves and is preceeded by a variable flow valve 384 so that the flow of oil to the retract and advance drives 374 and 376 is controllable and thereby the speed of the guage slides can be adjusted.

XVII Oil feed to hydrostatic drives

Figure 9:
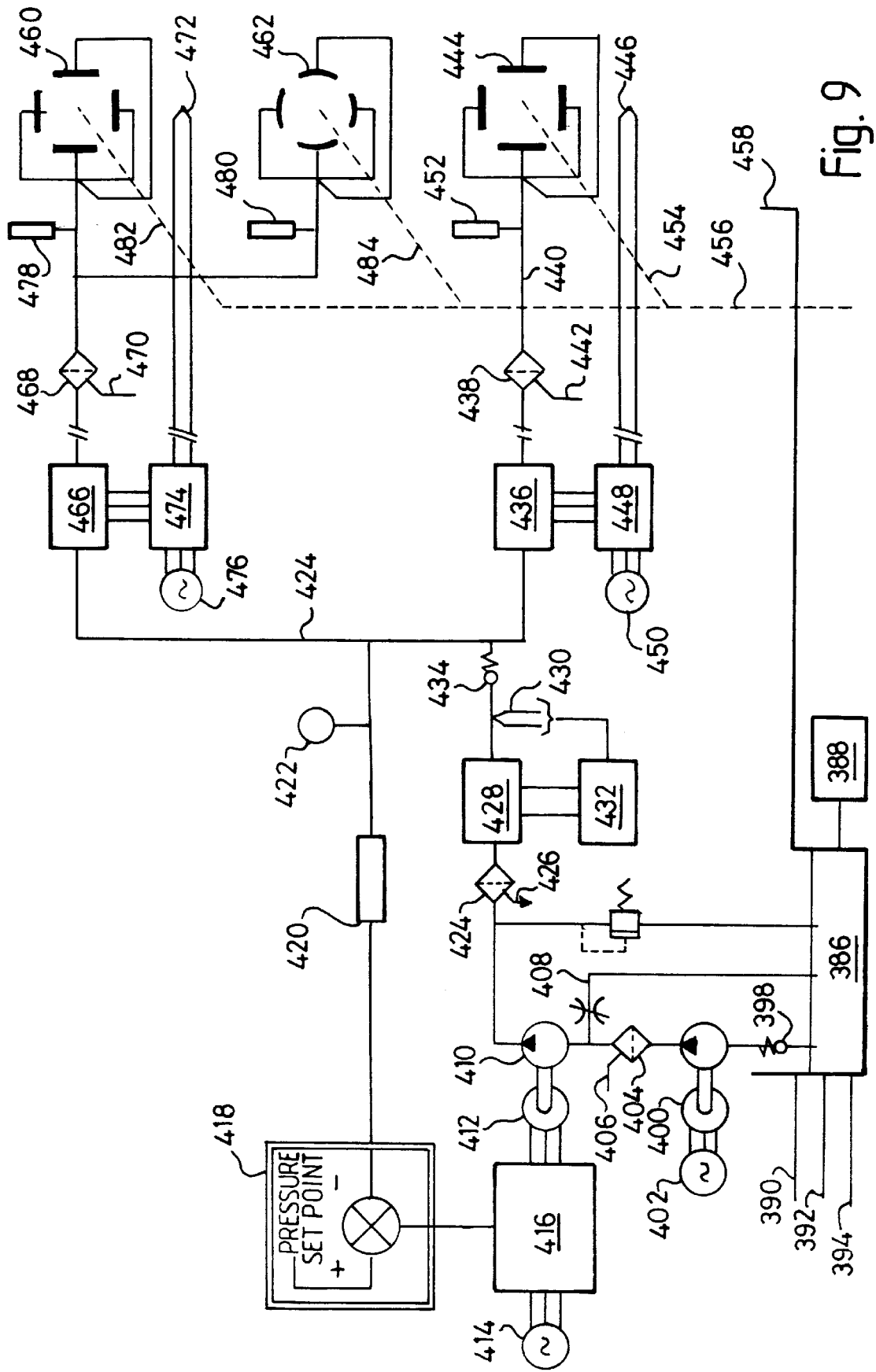
FIG. 9 is a schematic flow diagram of the controls and supply of fluid to the linear bearings and leadscrew bearings in the machine.

The wheelfeed, lead screw and workslide hydrostatic drives require the controlled supply of oil under pressure and FIG. 9 gives details of the system supplying the lubricating oil. A holding tank is denoted by reference numeral 386 and an electrostatic cleaning device 388 is associated therewith. Level sensors 390, 392 and 394 provide oil level signals to the control system previously described.

A scavenge pump 396 derives oil from the tank 386 via a non-return valve 398 and is driven by a motor 400 derived from a three phase power supply 402. A 10 micron filter 404 protects downstream components and a filter blot signal is generated and delivered along line 406 as a warning signal.

A bleed 408 provides a return path for excess oil to the tank 386 but otherwise the output from the filter serves as the input to a gear pump 410 itself driven by a motor 412. A three phase supply 414 provides power to the motor 412 via an inverter drive unit 416. A Eurotherm controller 418 enables the pressure to be set and a pressure guage 420 indicates the pressure determined by the Eurotherm controller. The latter controls the inverter drive 416 and thereby the motor 412.

A reserve accummulator is provided at 422 and the operation of the controller and pump is to maintain a constant preselected pressure in the main supply line 424.

The supply line is fed by the output of the gear pump 410 via a second filter 424 from which a filter blot signal can be derived along line 426 when appropriate. The temperature of the oil is controlled by a refrigeration unit 428 and the oil temperature downstream of the unit 428 is sensed by a platinum resistance probe 430 which in turn controls a temperature controller 432 which dictates whether or not the refrigeration unit 428 is to function and if so to what extent. A non-return valve 434 feeds the main line 424.

XVIII Workslide bearings

The workslide bearings are fed via a heater 436 and further filter 438 via line 440. The filter blot signal is derived along line 442. Workslide bearings are denoted by reference numeral 444 and the temperature of the oil leaving the bearing is sensed by a resistance probe 446 the output of which controls a temperature controller 448 which in turn controls the degree of heating imparted by the heater 436 to the oil flowing therethrough. The temperature controller and heater derive power from a three phase supply 450. A pressure sensitive switch 452 indicates under or over pressure in line 440 and a return line or drain 454 returns used oil to a return manifold 456 to a gravity collection tray 458 which feeds and returns oil to the holding tank 386.

XIX Wheelfeed and leadscrew bearings

The wheelfeed bearings 460 and the leadscrew bearing 462 are each supplied with oil via a feedline 464 from a second heater 466 and filter 468 from which a further filter blot signal can be derived along line 470. The temperature of the wheelfeed bearing is sensed by a resistance probe 472 which in turn controls via temperature controller 474 the extent of heating imparted by the heater 466. As before power for the heater and controller is derived by a three phase supply 476.

As before pressure sensitive switches generating under or over pressure signals are provided at 478 and 480 respectively. Drains are provided at 482 and 484 for communicating with the return manifold 456.

XX Oil supply to rotational bearings

Figure 10:
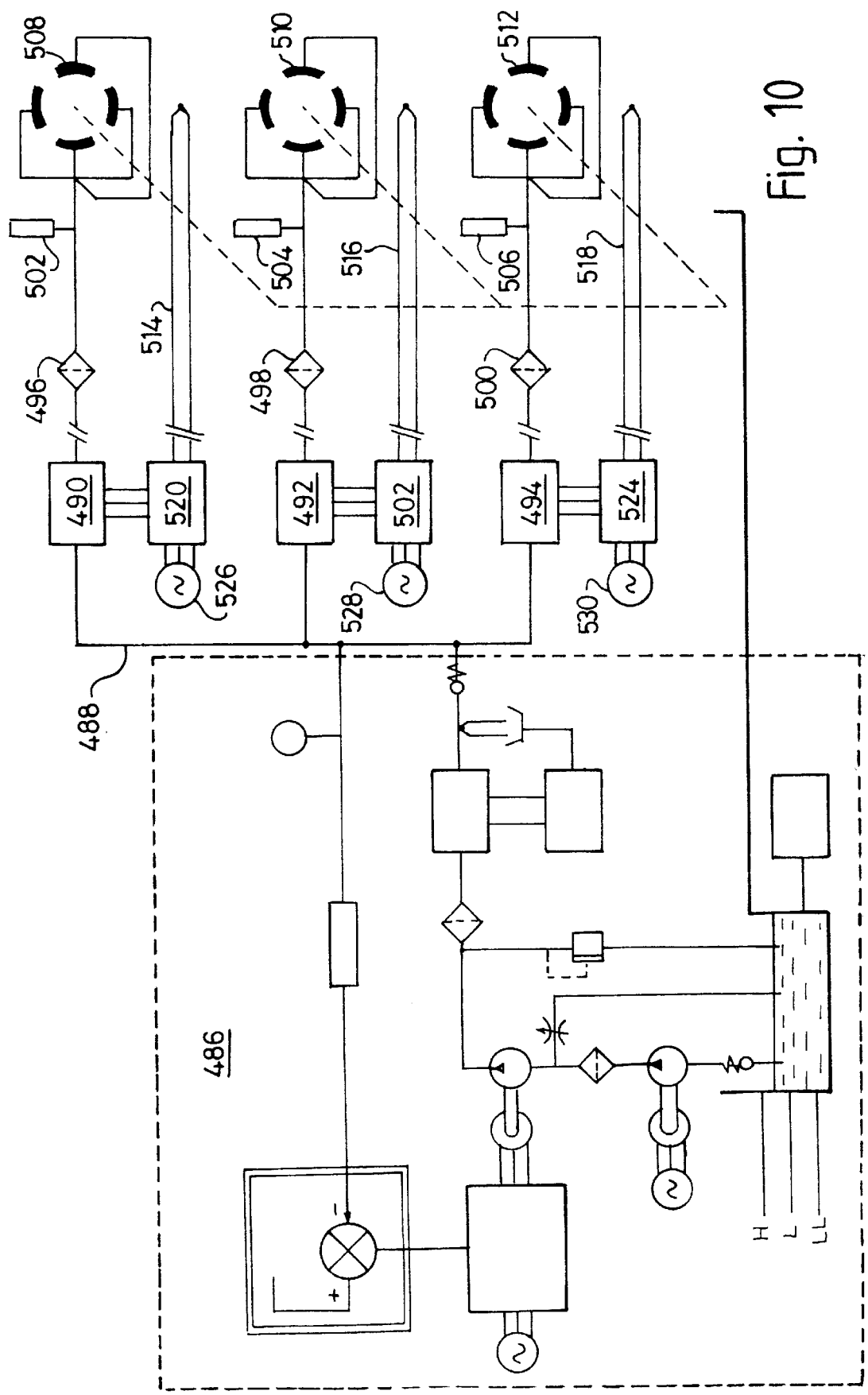
FIG. 10 is a similar diagram for the rotating bearings of the machine.

The rotating bearing associated with the wheelhead, workhead and tailstock also require a supply of oil under controlled temperature and pressure and this is shown in FIG. 10. In this Figure the oil supply system contained within the dotted outline 486 may be the same oil supply system as employed for the linear bearings or may be a separate identical supply system dedicated to supplying oil at appropriate pressure for the rotational bearings. In either event the system operates generally in the same way as that described in relation to FIG. 9.

The supply system provides oil under controlled pressure to the main feed line 488 (which corresponds to the feedline 424 in FIG. 9) and the oil is distributed to the wheelhead, workhead and tailstock bearing assemblies via three heaters 490, 492 and 494 respectively. In each feedline a filter 496, 498 and 500 is provided as a further protection for each of the bearings and the pressure of the oil supply to the bearing is sensed by a pressure sensing switch 502, 504 and 506 respectively. The wheelhead bearing is shown at 508, the workhead bearing at 510 and the tailstock bearing at 512.

XXI Temperature control of oil for bearings

The temperature of the oil supplied to each of the bearings is controlled by the heaters and the temperature of each of the bearings is sensed by platinum resistance probes 514, 516 and 518 respectively which in turn control the heaters via temperature controllers 520, 522 and 524. Three phase power supply for each of the heaters is provided at 526, 528 and 530.

XXII Workpiece cooling

Figure 11:
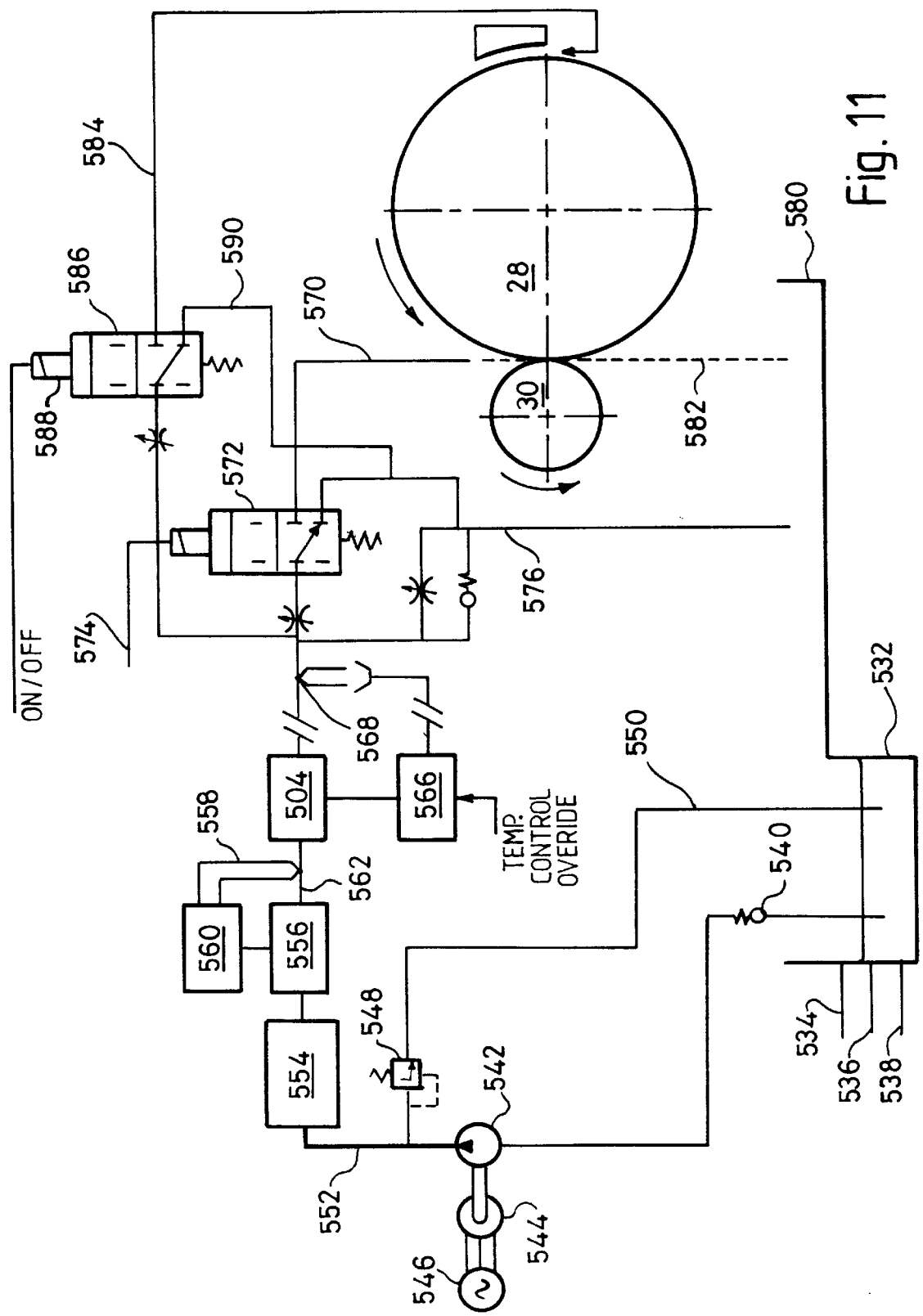
FIG. 11 is a block schematic diagram of the workpiece coolant system of the machine.

The workpiece is cooled in known manner by supplying cutting oil or an emulsion of oil and water under pressure thereto. The temperature of the cutting oil is controlled and the supply and control elements are shown in FIG. 11. To this end a holding tank is denoted by reference numeral 532 with level sensors 534, 536 and 538 respectively for sending level signals to the control system previously mentioned. Cutting oil is drawn from the tank 532 via non-return valve 540 by a pump 542 driven by a motor 544 itself powered by a three phase 546. A pressure relief valve 548 returns unwanted oil to the holding tank 532 via line 550 thereby maintaining the pressure in the supply line 552 at the pressure set by the relief valve 548.

Multi-element profile vessel filters are provided at 554 and the oil is then supplied first to a refrigeration unit 556 the output temperature of which is sensed by a temperature resistance probe 558 feeding a temperature controlling device 560 for controlling the degree of refrigeration and maintaining the temperature of the oil in the line 562 constant. The now cooled oil is then heated by heater 564 itself controlled by a temperature controller 566 which in turn receives a feedback signal from a temperature probe which may be remote from the heater 564 and is sensing the temperature of the oil shortly before it is applied to the workpiece. The wheel 28 and workpiece 30 are shown in the grinding position and a coolant supply feed 570 directs cooling oil onto the workpiece-wheel engaging region and is supplied with oil via a control valve 572. A transducer associated therewith provides a return signal to the control system indicating whether coolant is on or off along line 574.

Cooling oil not required is returned via path 576 to a gravity collection tray 580 for returning oil to the holding tank 532.

In the same way coolant which has been applied to the workpiece/wheel interface drain as shown by the dotted line 582 also into the gravity collection tray.

Coolant oil for the electrostatic dressing of the wheel is supplied along line 584 from a second control valve 586 which also includes a transducer 588 for indicating when the control is on or off. As before unwanted oil is returned via path 590 to the gravity collection tank via path 576.

XXIII Different grinding processes

FIGS. 12 to 16 inclusive illustrate how the wheel must be formed and angled so as to perform specific types of grinding.

Figure 12:
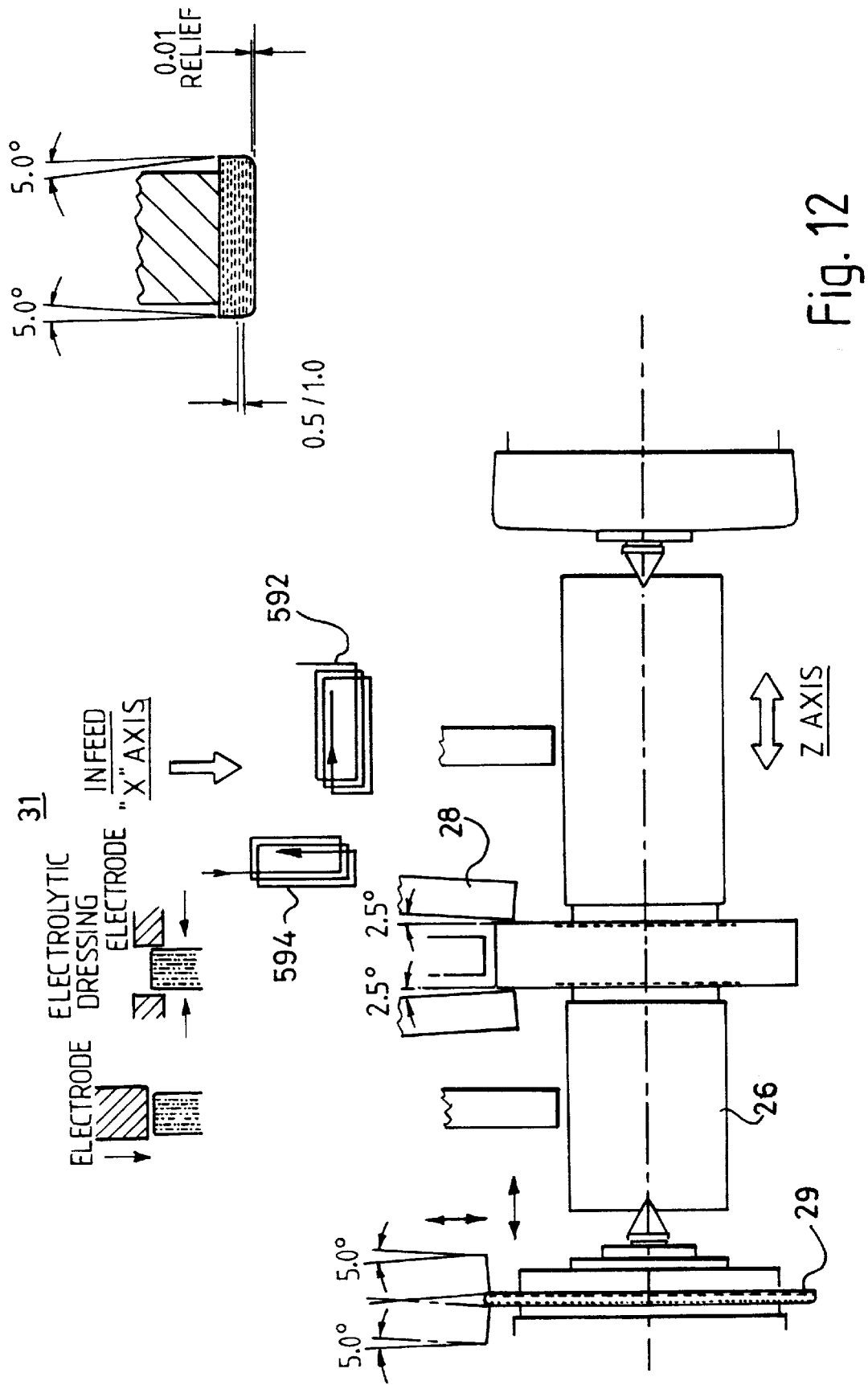

In FIG. 12 wheel forming by 29 provides a 5° relief angle on opposite circumferential edges of the wheel 28 and the wheelhead table is indexed so as to present the wheel on either side of a central flange which is to be ground with a 2½° clearance angle.

Infeed movement is denoted at 592 to perform cylindrical grinding and at 594 to perform radial grinding of the shoulders of the flange.

The control of rotation of each of the headstock and tailstock is such that the tailstock is driven by the same demand as the headstock in order to provide equal torques in both units.

The wheel may be conditioned periodically by an electrolytic wheel dressing system at 31.

The workhead and tailstock, worktable and wheelhead drives may be linked and synchronised to permit complex grinding to be performed using electronic control and feedback such as described in UK Patent 1331601.

Figure 13:
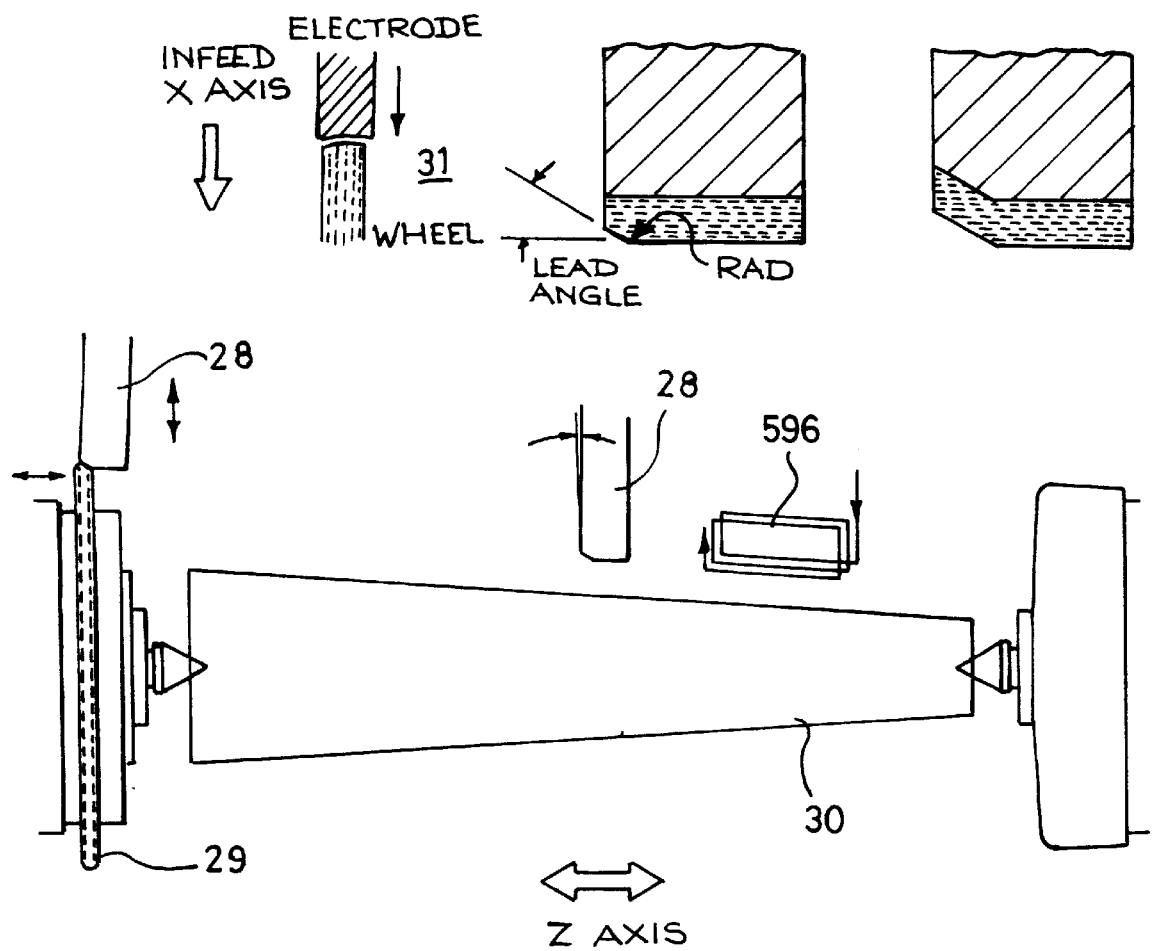

FIG. 13 indicates how a tapered component can be shaped by electrolytic conditioning at 31 to escape the abrasive grit and forming at 29 the outside surface of the wheel 28 with a gradient and a chamfer around one circumferential edge thereof. Operating wheelfeed in the manner shown at 596 and retracting the wheel as it moves along the Z-axis from the right hand end to the left hand end of the workpiece produces a tapering diameter.

Figure 14:
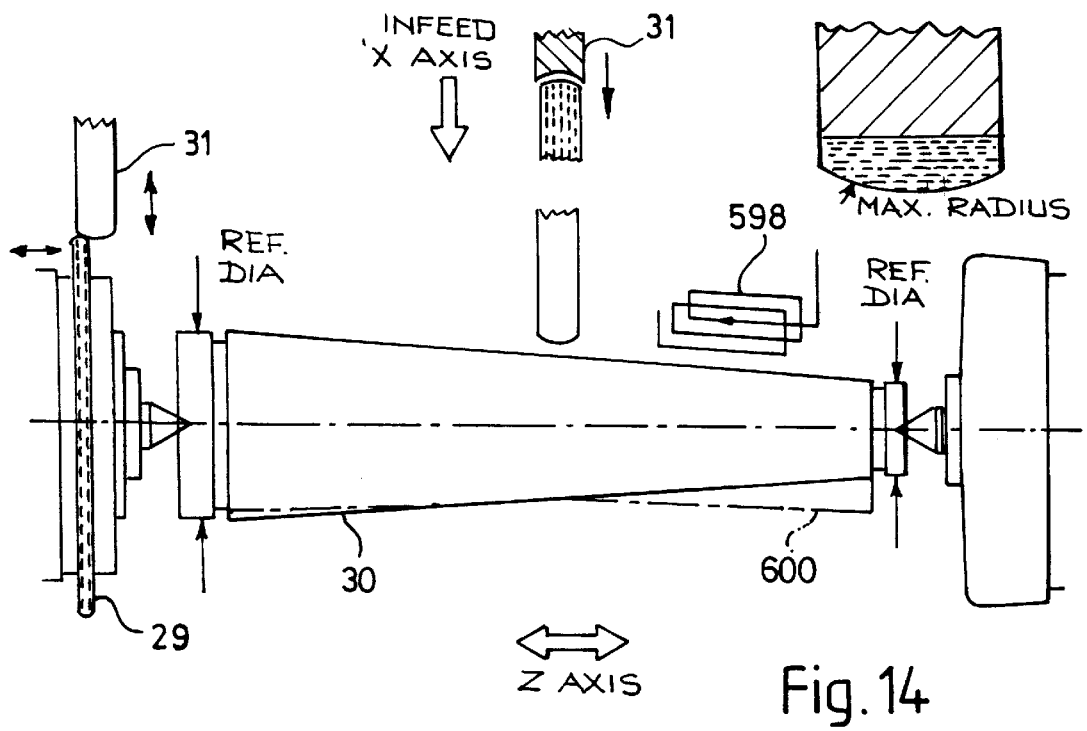

FIG. 14 indicates how the edge of the wheel can be electrolytically conditioned at 31 and formed by dressing wheel 29 to produce a smooth curve across the thickness of the wheel 28, using a specially shaped electrode 31. X-axis infeed movement is shown at 598. An alternative finished form is shown in chain dotted outline at 600. Any shape can be formed along the length of the workpiece 30 by appropriate control of the infeed during the Z axis traverse.

Figure 15:
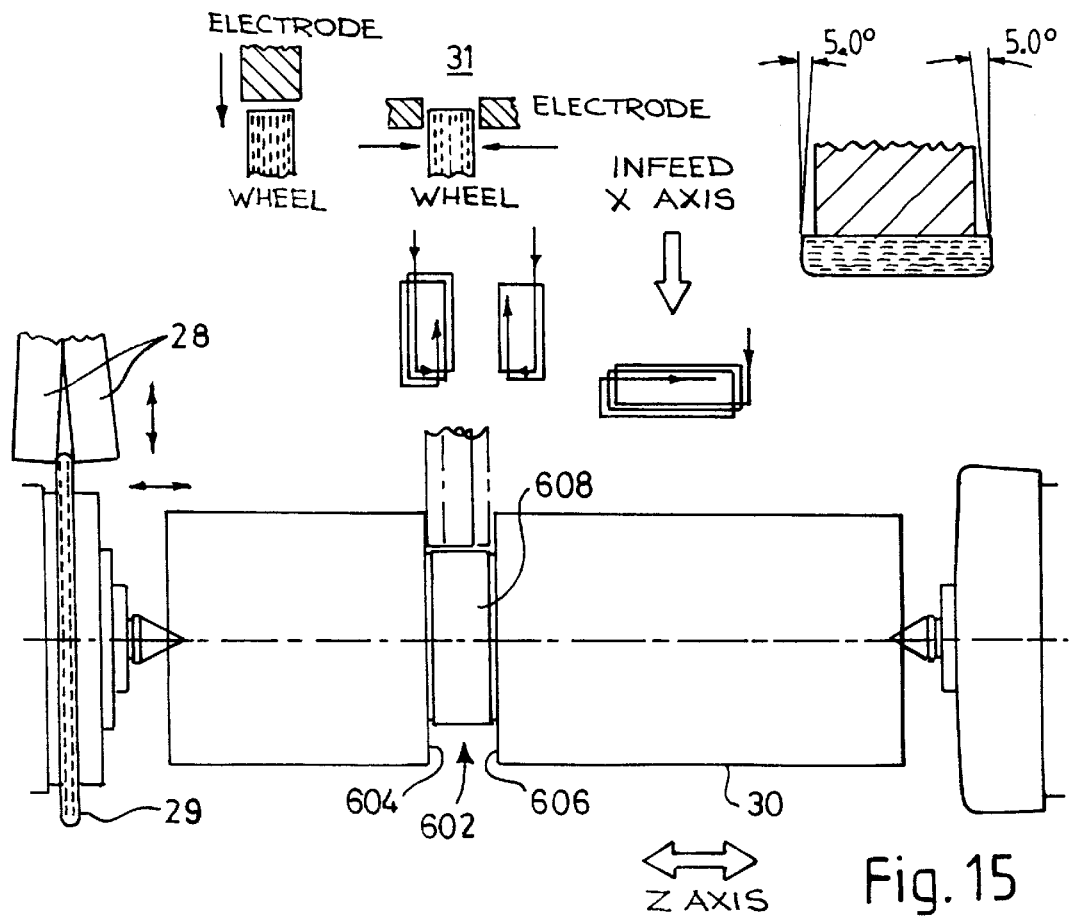

In FIG. 15 the wheel is electrolytically dressed at 31 and formed by wheel 29 so as to have tapers (ie small radius corners) before it is advanced into the narrow gap designated 602 and traversed from one shoulder 604 to the other 606 to finish grind the reduced diameter cylindrical section 608.

A workpiece comprising a shaft with steep tapers is shown at 33 in FIG. 16. The wheel is electrolytically dressed at 31 and formed by 29 so as to have a lead angle and radius as shown at FIG. 16a and movement of the wheelfeed to achieve the different sections of the workpiece are denoted at 610, 612 and 614 respectively, those at 610 and 612 being effected either by tilting the wheel or by appropriate relative movement of the worktable and wheelfeed to obtain the effective traverses shown at 610, 612.

XXIV X and Z axis measurement

As already mentioned, errors due to distortion, misalignment and parallax are avoided by mounting all the measuring systems in the same plane as far as possible and in linear alignment with the main distorting mechanism, ie the grinding wheel.

To this end the wheelslide X-axis encoder scale is mounted at the height of the wheel axis and in line with the face of the wheel so that its associated reading head, which is located in close proximity to the surface of the scale, will itself be located at the same height and in the same vertical plane as the wheel.

X-axis correction is achieved by checking for changes in capacitance of a capacitance guage formed by a conductive straight edge (mounted on the worktable in the opposite side of the latter from the grinding wheel) and a fixed conductive probe mounted for rigidity to the machine bed. The conductive strip on the face of the straight edge is itself arranged to be in the same horizontal plane as the wheel axis, so that the probe is at the same height, and the probe is laterally fixed in position in the vertical plane containing the grinding wheel so as to be coplanar with the plane containing the X-axis encoder behind the wheel as well as at the same height as the linear scale of the X-axis encoder.

By mounting the workpiece about an axis for rotation which is parallel to the wheel axis and the Z-axis (the linear direction of worktable movement) and at the same height as the wheel axis, the point of engagement between wheel and workpiece should be at the same height so that it, the wheel axis, the X-axis encoder scale, the conductive elements forming the X-axis connection capacitance probe and the workpiece axis are all in the same horizontal plane.

The only measuring device not in the same horizontal plane is the Z-axis reading head 180, but as mentioned previously, by mounting this in the same vertical plane as that containing the wheel, albeit below the horizontal plane containing the wheel axis, any errors arising from this displacement appear not to affect the accuracy of the machinery capabilities of the machine, and acuracies in the nanometric range have been achieved during preliminary trials of the machine.

Constructional detail of overall machine

FIG. 17 shows the machine in the fully enclosed state with all covers in place. Windows at 616 and 618 permit operation of the grinding process to be observed. Fine adjustment to the operation of the machine can be effected by adjusting the controls on the control console 620. Workpieces waiting to be ground can be stored within the cabinets surrounding the machine, typically within that marked 622, for which purpose a door (not shown) may be provided at the end of the housing. In this way workpieces awaiting machining can be acclimatised to the operating temperature of the machine so as to reduce thermal shock and/or thermal distortion.

With the covers removed, as in FIG. 18, the various component parts of the machine can be seen. Thus the polymer concrete frame 20 can be seen supported by the intermediate base 14 and the latter by means of vibration isolating and levelling feet two of which are visible at 18,48. The grinding wheel is just visible at 28 as is the forming wheel at 29, at the lower end of the housing 624 containing the forming wheel advance/retract mechanism.

Coolant is sprayed onto the grinding wheel via a nozzle 626 and the wheel guard is adjustable at 628 and includes an electrolytic wheel dressing device 630 for periodically dressing the grinding surface of the wheel 28.

A fixed worktable cover at 632 obscures the straight edge capacitance probes and 2 axis grating. Telescopy shrouds at 634 and 636 protect the slideways on which the worktable, headstock and tailstock run. The worktable is just visible at 638.

Worktable

Figure 19:
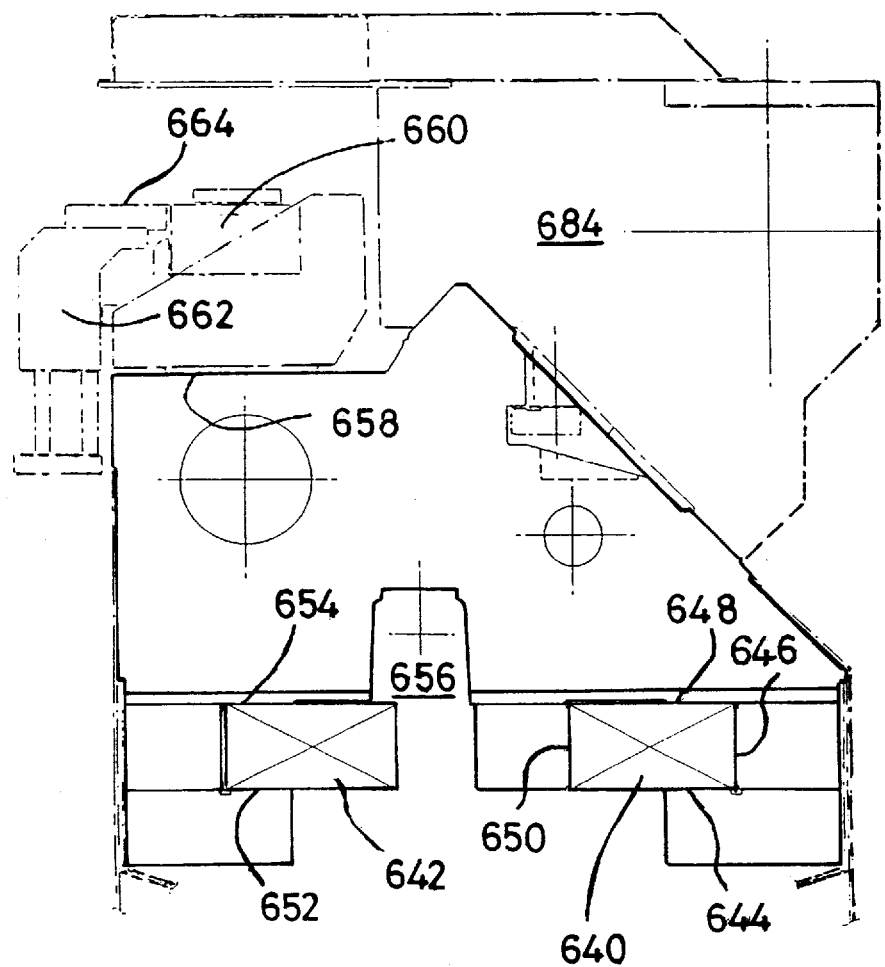
FIG. 19 is a partially diagrammatic cross-section through the worktable region of the machine shown in FIG. 18, in the direction of arrow A.
Figure 20:
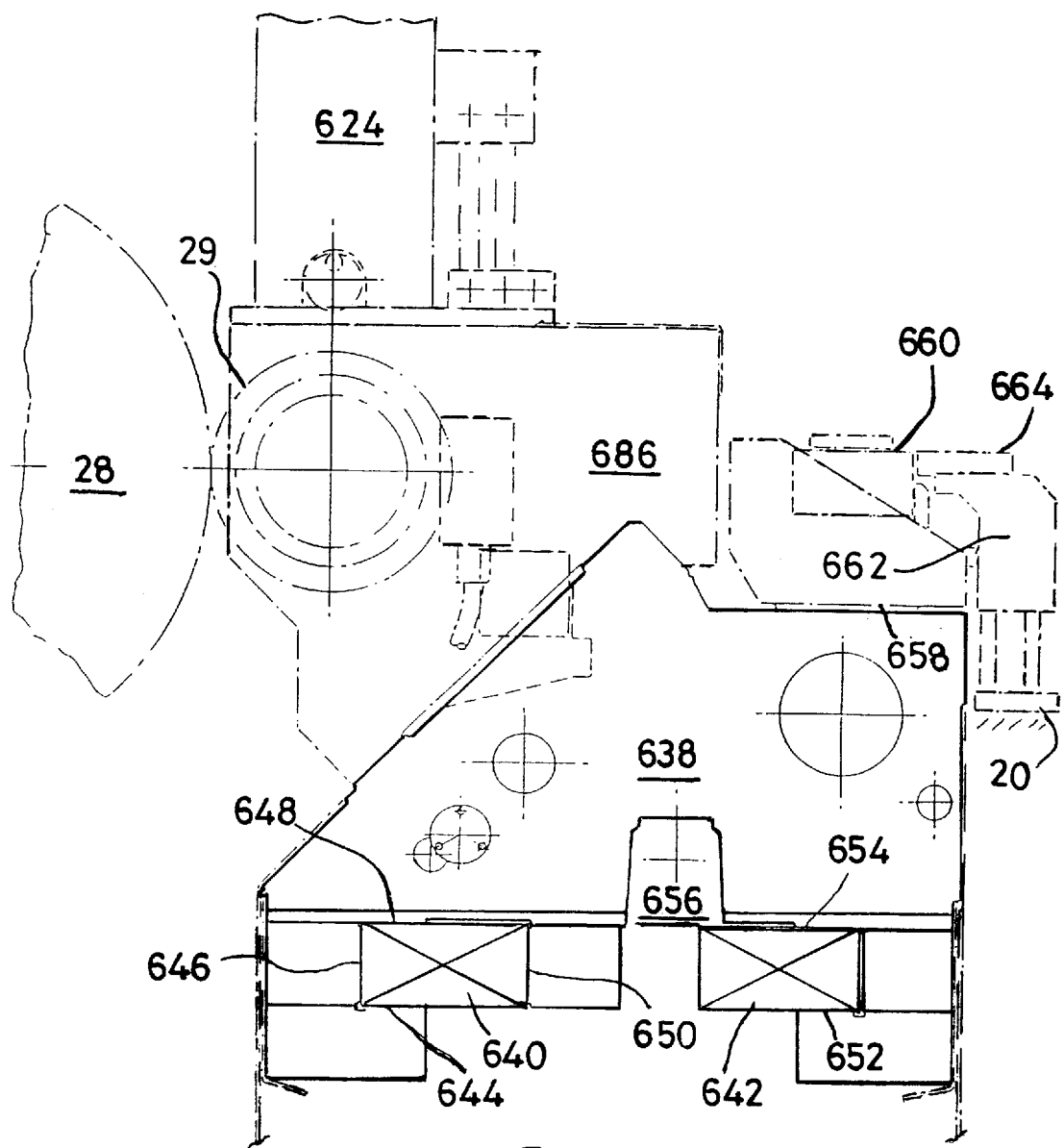
FIG. 20 is a similar cross-section through the machine of FIG. 18 in the direction of arrow B.
Figure 21:
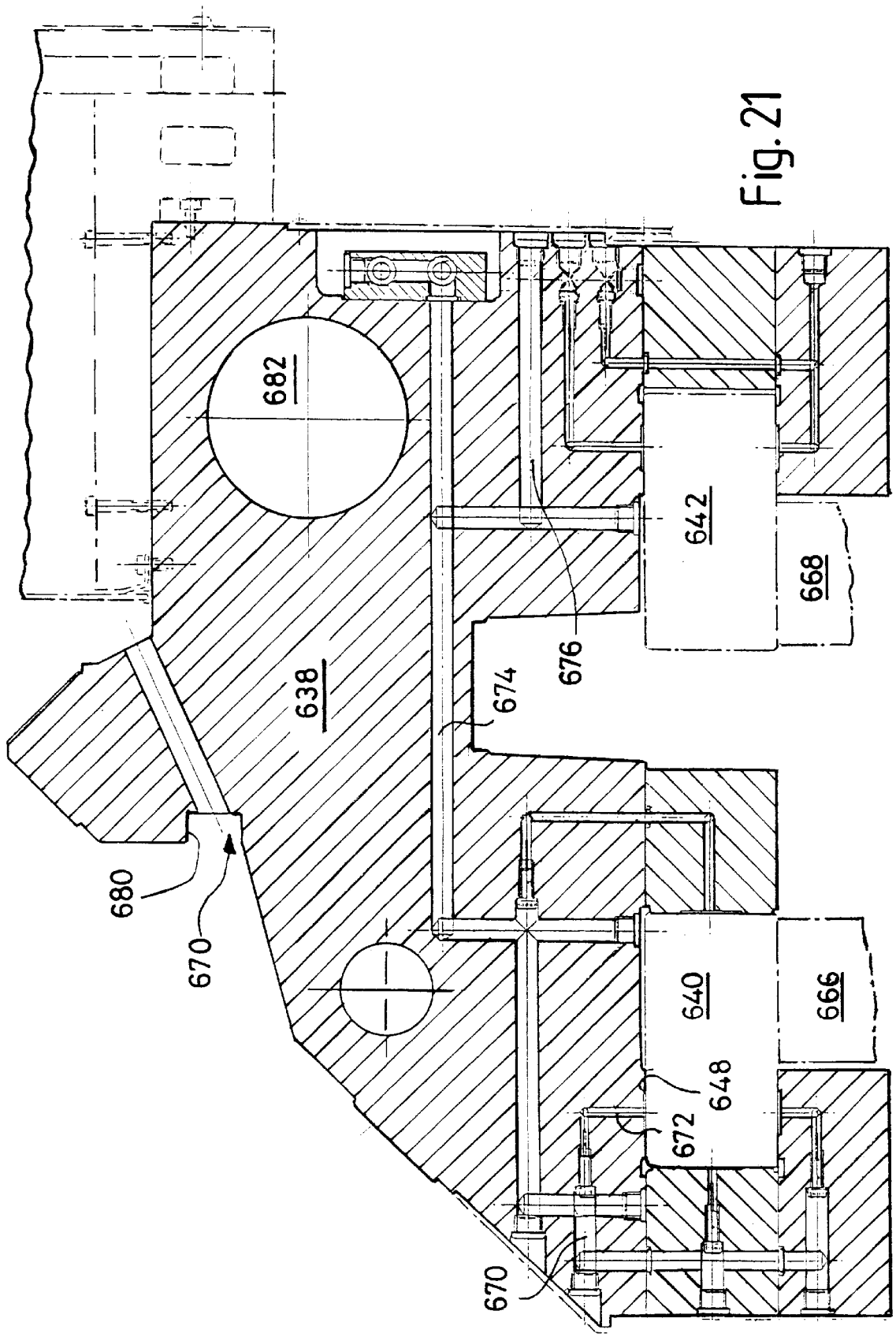
FIG. 21 is a true cross-section through the worktable showing how the latter is carried by hydrostatic bearings on two ceramic rails forming a slideway.

Turning now to the more detailed drawings, FIGS. 19, 20 and 21 reveal detail of the construction and support of the worktable. This comprises a metal casting 638 having a flat underside machined to run on two ceramic slideways 640, 642 each mounted on the fixed machine frame 20. Sliding faces are formed in the casting at 644, 646, 648 and 650 to engage slideway 640 which sliding faces are formed in the casting only on two faces around 642 namely at 652 and 654.

The underside of the casting is cutaway generally centrally over its entire length at 656 to accommodate one of the drives to be described.

A machined flat upper surface of the casting at 658 supports an elongate ceramic block 660 forming a straight edge and a reading head 662 including a capacitance probe 664, is mounted firmly to the machine frame bed 20.

The slideways 640, 642 are shown in FIG. 21 as being mounted at the top of upright legs 666, 668 respectively, also firmly attached to the machine frame/bed 20.

A running clearance of the order of 0.035 mm is provided between all bearing surfaces such as between 648 and 640.

Linear hydrostatic bearings are formed at the bearing surfaces by providing drillings such as 670, 672 for supplying fluid, typically a lubricating oil, under pressure, so as to form a pressurised oil flow between each of the pairs of sliding surfaces. Similar drillings supply oil to all the other bearing surfaces, so that when operating, the metal surfaces such as 648 are separated from the faces of the ceramic slideways by a very thin film of oil. Galleries and manifolds such as 674, 676 serve to supply oil under pressure to all the bearing surfaces.

The face of the worktable on which the headstock and tailstock are to be mounted is inclined at approximately 45° and is cut away at regions along its length as at 678 to provide an overhanging shoulder 680 below which a protruding part of the device to be mounted on the slideway formed by the inclined surface can be fitted and clamped, to secure the device in position as required.

A large diameter hole 682 extends through the entire length of the casting 638 to allow services to traverse from one end of the other unimpeded and to permit a rigid elongate link to be established between devices mounted at opposite ends of the worktable (to be described).

The tailstock is shown in outline in FIG. 19 at 684 and the headstock in FIG. 20 at 686. Associated with the latter is the wheel forming mechanism housing 624 (see FIG. 18). The grinding wheel 28 and forming wheel 29 are both shown in FIG. 20.

FIG. 22 shows detail of the measuring unit mounted on the flat surface 658 (see FIG. 20). This comprises a base 688 providing a flat support surface 690 for a bearing plate 692 one edge of which is upturned through 90° to provide one lateral support 694 for an accurately machined rectilinear block of ceramic material 696 which is carried on rolling bearing 698, 700 and is clamped at intervals along its length by T pieces, one of which is shown at 700. Leaf springs as at 702, 704 force the block 696 in a downward sense.

Vertically mounted rollers, one of which is denoted by 706 are carried by an upturned section 707 of the base 688 at similar intervals along the length of the blocks 696, and leaf springs at 708 in the upstanding edge 694 of the plate 692.

In front of the worktable 638 is mounted the reading head housing 662 which inter alia carries the probe 664 carrying at its end nearest the block 660 an electrode 710. The face 696 of the block 660 is metallised using a hard chrome or the like, in the region which is traversed by the probe electrode 710, to form a spaced apart elongate electrode 714, which together with the probe electrode 710 comprises a capacitance the value of which will vary if the spacing between the electrode 714 on the block 660 and the electrode 710, alters due to distortion of the machine.

Since the electrode 710 is fixed to the machine frame 20, it can be assumed to be stationary and as previously described, an error signal for calibrating the grinding wheel feed can be stored for all positions of the table 638.

Also on the base 688 is mounted an elongate grating 712 and the housing 662 includes an optical sensor 720 for detecting the grating divisions and generating electrical pulses in known manner, so that the Z axis position of the table 638 can be determined by counting the pulses (in known manner) as the table moves from left to right and vice versa.

The ceramic block 660 which constitutes the straight edge and the grating 712 can also be seen in FIGS. 23A, B and 24A, B.

The elongate strip of metallising 714 on the face 696 of the block 660 is earthed by earthing strip 716.

The housing 622 is shown in FIG. 23A as comprising two uprights and a cross piece 718 on which the probe 664 is mounted. Below can be seen the optical reading head 720 which cooperates with the grating 712 to give the Z axis measurement.

A T-piece support and associated lateral supports such as shown at 700, 694 and 707 are in fact provided at two points one on each side of the housing 662. The second assembly is denoted by reference numeral 722.

The ceramic block 660 is located at the left hand end by a button 724 and at its right hand end by two leaf springs 726, 728. The button is threadedly engaged in its suport 730 and can be screwed in to preload the block 660.

The grating is screwed to the base 688 at intervals along its length as at 732, 734.

As previously described a second electrode is provided on the housing 662 to form a capacitance bridge. This can be seen at 736 mounted at right angles to the first electrode 710. An electrode 738 formed on the face of a block 739 as by metallising, and spaced from 736 by the same mean distance that electrode 710 is spaced from the strip 714, provides the second electrode of the second capacitor.

Limit switches are shown at 740, 742 and adjustable stops extend to the left and right of a platform 744 at 746, 748, to engage end stops 750, 752 respectively (see FIGS. 23A, B).

The position for the housing 662 is selected so as to be generally opposite the grinding wheel 78.

The ceramic block 660 can be adjusted to align it with the worktable trajectory by a sprung arm 754 (see FIG. 24B). This is anchored at 756 and includes a containing region at 758 to allow the remainder of the arm to distort relative to the fixed end at 758. The roller 760 is let into a groove 762 in the side face of the arm 754 and the free end of the arm is held captive by means of a bolt 764 having a compression spring 766 trapped between the enlarged head of the bolt 764 and the seating 768. Arm stop is provided by a screw 770 which is rotatable to adjust the pointed end so as to force the arm more or less towards the block 660.

The roller 760 is sandwiched between the arm and the block 660, so that screwing in the screw 770 will tend to push the block 660 against the spring 708 and compress the latter.

FIG. 25 shows the detail of the adjusting screw 770.

Worktable drive

The worktable is moveable from left to right and vice versa by a friction drive created by a pair of grooved rollers 778, 780 mounted near the lower end of a drive unit housing 783 (see FIGS. 26, 27). The unit 783 is bolted to the left hand end of the worktable 638.

The rollers 778, 780 nip a circular section rod 782 which extends between the right hand end 784 of the machine frame 20 and a bracket 786 mounted on the frame towards the opposite end thereof.

The rod is tensioned and preloaded by a spring 788 (which may be made up of bevelled washers) and a bolt 790 which is threadedly engaged in the end of the rod 782 and whose enlarged head acts on the spring 788 via a thrust washer 792.

At the left hand end the rod is held in place by a pair of metal strip hinges 794, 796 pinned to the rod at 798 and to a bracket 800 at 802.

Supports 804 for the rod to reduce bending and droop are located at regular intervals along the length of the rod 782. Each includes a spring loaded plunger 806.

The measuring unit is protected by a cover shown in FIG. 28. Seals are provided at 808, 810, 812 to reduce the ingress of dirt via the gaps left to accommodate the legs 814, 816 (see FIG. 22) which support the platform 744 (see FIG. 23A).

Slideway covers

FIGS. 29 to 37 contain detail of the telescoping covers mounted at opposite ends of the worktable and which are designated 634 and 636 in FIG. 18.

FIG. 29 shows the left hand end of the machine and the set of telescoping shrouds 636. The extreme left hand shroud is bolted to an end of the machine frame generally designated 818 and the right hand end of the telescoping set terminates in a bulkhead plate 820. Each of the shrouds includes a grooved wheel such as 822 which runs on a rod 824 which runs parallel to the bar 782 which provides the rail for the friction drive for the worktable made up of the two rollers one of which is shown at 780 in FIG. 29.

The second rail for the cover wheels can be seen in FIG. 30 at 826. Shown in dotted outline is the opposite wheel for the right hand shroud denoted by reference numeral 828.

The drive unit for the friction drive made up of the wheels 778, 780 is denoted by reference numeral 783 and the telescoping shroud is formed with an extension housing 830 to accommodate the additional height of the friction drive 783.

Also visible in FIGS. 29 and 30 is the large diameter rigid tube 832 which serves to connect the left hand bulkhead plate 820 to the corresponding right hand bulkhead plate 834 (see FIG. 32). Detail of the method by which the ends of the tube 832 are secured is shown in FIG. 37 in which the tube 832 is shown as having an end of reduced diameter with a flange which can be bolted to the bulkhead plate 834 by means of nuts such as 836.

Drive for the covers is provided at the right hand end of the machine and detail of this is contained in FIG. 32.

Drive is transmitted via a threaded rod 838 which is engaged in a nut held captive in an assembly generally designated 840. The nut is preloaded by means of a spring 842.

Rotation of the threaded rod 838 is achieved by an electric motor 844 the outward end of which is connected to the rod 838 via a coupling 846. The unthreaded end of the rod 838 runs in a bearing 848 and the coupling and bearing are contained within a housing generally designated 850 to which the motor 844 is attached.

As will be seen from FIG. 34, the rod 838 extends below the worktable and because of the alignment of the rod, the worktable is cut away as previously described in connection with FIGS. 19 and 20 in the region defined by reference numeral 656 to accommodate not only the rod but also an end bracket 852, which is secured to the frame of the machine 20. The rod 838 extends through the bracket and is secured in place by means of a nut 853.

The rod 782 for the worktable friction drive and the rod 838 extend through the machine substantially coaxially but since the rod 838 is engaged by a plate located at the right hand end of worktable and the friction drive for the worktable is mounted at the left hand end thereof, the rod 782 for the worktable friction drive does not need to extend any further across the worktable than is sufficient to enable a full traverse of the worktable to the right hand position of its traverse and likewise the rod 838 does not need to extend any more under the worktable than is sufficient to permit the right hand end of the worktable to move to its extreme right hand position. Both rods 838 and 782 therefore can extend below the worktable and terminate without interfering the one with the other.

FIG. 33 also illustrates the covers which are attached to the front and back of the worktable 638, namely cover 854 which is bolted to the vertical face 856 of the worktable 638 and the rear cover 858 bolted to the inclined face of the worktable 638. These two covers 854 and 858 extend over the length of the worktable and serve to protect the two slideways 640 and 642.

FIG. 31 shows in more detail the mounting of the wheels such as 822 and 828 and also shows the hollow box trunking 860 which protrudes to the side of the shroud 862 and provides a housing for services such as pipes and cables, one of which is designated by reference numeral 864. Mounting brackets for securing to such services are shown at 866 and 868. A drag chain is secured to the open end of the trunking 860 as denoted by reference numeral 636 and the opposite end of the drag chain is attached to the base of the machine as previously referred to with reference to FIG. 18.

The services are contained within the drag chain and are of flexible nature so that as the drag chain varies in shape the services follow suit.

The position of the covers drive in relation to the right hand end of the machine is best seen with reference to FIG. 35. The motor 844 includes a mounting flange 870 by which it can be bolted to the housing 850 (see FIG. 32).

The precise position of the covers is determined by means of a linear potentiometer 872 (see FIG. 36) one end of which is anchored in a bracket 874 attached to the bulkhead place 834 via bracket 875 and the other end of which is attached via a stud 876 to the right hand end of the worktable 638.

A clearance hole 878 in the right hand bulkhead plate 834 allows the stud 876 to pass through to the worktable 638.

The potentiometer is therefore able to measure the gap between the worktable 638 and the bulhead place 874 so the latter (and the guard attched to it) can be slaved to the worktable.

As with the left hand end, the extreme right hand end guard shroud includes a solid end 880 which is similarly bolted to an upstanding flange 882 forming part of the extreme right hand end of the machine frame.

In order to provide for peripheral sealing to the shrounds, an endplate is bolted to each end of the worktable 638. The plate at the left hand end is shown in FIG. 29 at 884 whilst the plate bolted to the right hand end is visible in FIG. 36 and is denoted by reference numeral 886. It is also visible in FIG. 32.

As best seen in FIG. 29, the plate 884 is formed with a gutter 888 which cooperates with a downturned peripheral lip 890 secured around the peripheral edge of the plate 820.

A similar arrangement is provided at the other end of the worktable so that the two peripheral regions of the plates 886 and 834 are similarly sealed.

The engagement of the downturned lip 890 with the trough of the gutter 888 acts as a good seal against moisture ingress and as shown in FIG. 34, a further sealing can be effected using a strip of rubber or rubber and plastics composite material 892 secured to the plate 834 so as to surround the engagement between the inturned lip and the gutter. A similar ring of material may be used at the opposite end of the worktable which is not shown in so much detail in FIG. 29.

Headstock

FIGS. 38 and 39 should be read together. FIG. 38 shows the inboard end of the headstock whilst FIG. 39 shows the rear extension to the headstock housing for the motor resolver and other components parts for tating the headstock.

In conventional manner, a workpiece is mounted between two stocks, one on the headstock and one on the tailstock. The headstock mounting is denoted by reference numeral 894 and this is keyed into an end of a shaft 896. The latter includes an annular shoulder 898 and extends with progressively reduced diameter to form a motor shaft for a direct drive electric motor having a stationary winding 900 and a rotor 902 which is attached to the shaft 896.

The shaft is supported in hydrostatic bearings generally designated 904 and 906 and the large diameter annular region 898 provides two shoulders for creating thrust bearings at 908 and 910 respectively. Oil for feeding the bearings is supplied via ports and drillings (not shown in FIG. 38) so as to occupy the space between the shaft and the internal surfaces of the bounding sleeve 912 in the case of bearing 904 and 914 in the case of bearing 906. Oil which escapes axially during use, returns via ports and drilling such as 916, 918 and 920 to return to the sump.

In this connection the temperature of the returning oil is detected by a temperature probe 922, electrical signals from which are conveyed via an appropriate cable in a conduit 924.

Heat is also generated by the motor and to this end a coarse helix duct 926 is formed around the outside of the stator and is created into a helical path by means of an outer cylindrical sheath 928. Cooling fluid such as water is pumped around the stator through the helical conduit so formed.

The shaft 896 terminates at the left hand end of the motor and is secured to the rotatable internal part of a tacco generator 930 contained within an external tacco generator housing 932. Rotation of the member 930 generates electrical pulses in a winding 934 and these are let out as an output signal via cable 936.

Attached to and driven by the tacco generator is a resolve 938 which serves to commutate the motor and also provides rotational position information if required. The resolver is mounted on a shaft 940 which extends from the tacco generator through the resolver and provides a mounting for an encoder 942. This is mounted within a housing extension 944 and at the extreme left hand end the shaft is earthed via earthing brushes 946 and 948.

Rotation of the motor thus produces rotation of the stock 894.

In turn a hub assembly generally designated 950 is secured to the end of the shaft 896 around the stock 894 and a diamond dressing wheel 952 is secured on the hub assembly and clamped in position by means of a faceplate 954 in known manner. Rotation of the shaft 896 therefore not only rotates the stock 894 but also the diamond dressing wheel 952 which is thereby available for dressing the grinding wheel 28 (not shown). Wheel dressing is performed by simply shifting the worktable to the right until the dressing wheel 952 aligns with the grinding wheel 28 at which stage advancing the grinding wheel using the wheelhead feed will bring the external surface of the grinding wheel into contact with che diamond dressing wheel 952. This process can be performed as frequently as is required to keep the wheel true.

By utilising movement along both X and Y axes, so complex profiles can be dressed onto the grinding wheel.

FIG. 40 shows in cross-section the hydrostatic bearing 904 of FIG. 38. The shaft 896 is a running fit within the six flattened ridges one of which is denoted by reference numeral 956 and oil is supplied to the six equal equidistant arcuate regions between the ridges 956, 958 etc such as the region 960, by means of ports and drillings which is designated by 962. Oil under pressure is supplied to a manifold drilling 964 via an inlet 966 and journal restrictors such as 968 within the drilling are provided to control the final pressure of the oil supplied to the annular regions such as 960.

Each annular region also communicates via a second drilling (970 in the case of annular region 960) with a port shown in dotted outline at 972 in the case of drilling 970. Normally these ports such as 972 are blanked off but if, as is desirable, the individual pressures within the different regions such as 960 is to be monitored, the blanking may be removed and pipe connectors such as 973 may be inserted and pipes such as 974 used to join the connectors to pressure transducers such as 976.

Each transducer 976 may be responsive solely to the pressure from the oil in one pipe such as 974 in which case an absolute output signal will be obtained therefrom along line 978 indicative of the actual pressure of the oil within the space communicating with that port. In the case of 973, this is the annular space 980.

The pressure transducer 976 may alternatively comprise a differential device (as shown) and in that event oil pressure from the opposite annular region (denoted by reference numeral 982 in the case of region 980) is supplied via drillings such as 984, 986, pipe connector 988 and pipe 990 to the opposite side of the differential transducer as shown. The output signal from such a transducer, along line 978, will now represent any difference between the pressure in the region 980 and the region 982 and the "sign" of the signal, (which indicates whether the pressure in 980 is greater than that in 982 or vice versa), can be used to denote which side of the bearing is being subjected to the greater pressure at any instant. The amplitude of the differential pressure signal indicates the level of the force which may not be merely an out of balance force but also grinding and other external forces.

A feedback signal from a series of such transducers can be generated in the manner already described herein so as to provide part of the control signal for a worksteady control system (as will be described with reference to FIG. 70), to compensate for any out of balance forces in the bearing which could result in a circular surface being ground which is less than true. The other control signals are obtained from transducers associated with the tailstock to be described.

FIG. 41 is an external view of the right hand end of the headstock shown in FIG. 38 showing the various ports (but without the pipe connectors such as 972 in place). A dressing wheel is shown at 952 and the headstock at 894.

Tailstock

FIGS. 42 to 44 give detail of the tailstock assembly. As with the headstock, a workpiece is supported by the stock 992 which is secured into the left hand end of the main shaft 994 of the tailstock assembly. In this connection FIGS. 42 and 44 must be read together since 44 contains the right hand end detail of the tailstock assembly.

As with the headstock shaft, shaft 994 is of progressively reducing diameter from the stock end to the motor end. Midway the shaft includes a radially enlarged annular region 996 and thrust bearings are formed on either side of the annular region 996.

Two hydrostatic bearings are formed along the length of the housing containing the section of the shaft 994 to the left of the annular ring 996 one denoted by reference numeral 998 and the other by reference numeral 1000.

Similar hydrostatic bearings are formed on either side of the radial faces of the annular flange 996 as denoted by reference numerals 1002 and 1004. Oil is supplied to the bearing faces in manner know per se by means of drillings and ports such as are shown in FIG. 44 but not shown in FIGS. 42 and 43. Oil which leaves the bearing regions collects in the annular reservoirs such as 1006, 1008, 1010 and 1012. Drillings such as 1014, 1016m, 1018 and 1020 convey the oil back to a main reservoir.

The temperature of returning oil is determined by a temperature probe 1022 electrical signals from which are supplied to the control system previously described.

The shaft extension beyond the annular flange 996 carries a rotor 1024. The stator windings 1026 are cooled by passing a cooling fluid around a helical path formed by a helical thread profile 1028 around the stator and closed by an annular sleeve 1030 in the same way as the motor in the headstock assembly is cooled.

The brushless motor needs a commutator and this is provided by a resolver 1032 mounted on a shaft extension 1034 the end of which is earthed via earthing brushes, one of which is shown at 1036.

In order to enable mounting and demounting of a workpiece between the headstock and tailstock, it is normal practice to arrange for the tailstock to be retractable and to this end the tailstock assembly shown in FIGS. 42 and 44 is retractable by 32 mm from the position shown through the distance denoted by reference numeral 1038 in FIG. 42. To this end the housing section 1040 containing the motor is movable axially relative to the housing section 1042 containing the hydrostatic bearings 998 and 1000. The housing 1040 is secured to a flanged bracket generally designated 1044 with the flange being secured to the left hand end of the motor housing between the latter and the housing sections containing and defining the thrust bearing arrangement around the annular flange 996. To the left hand end of this a cylindrical sleeve extends at 1046 to provide a cylinder within which the inner cylindrical bearing member 1048 can slide in the manner of a piston and a seal 1050 is provided between the bearing member 1048 and the cylindrical extension 1046 so that oil in the annular reservoir 1010 returning to the main reservoir will not leak. By the same token dirt and moisture is prevented from entering.

The oil return path 1016 needs to communicate with the thrust bearing and to this end a sleeved joint is provided formed from the cylindrical sleeve 1052 sealed within the drilling 1016 by means of the seal 1054 and secured at its right hand end to the cylindrical housing generally designated 1056 within which the thrust bearing assembly is located. Drillings such as 1058 within the housing 1056 allow oil from the thrust bearing region to return via the hollow sleeve 1052 to the drilling 1016 irrespective of the position of the sleeve 1052 relative to the seal 1054.

Figure 43B:
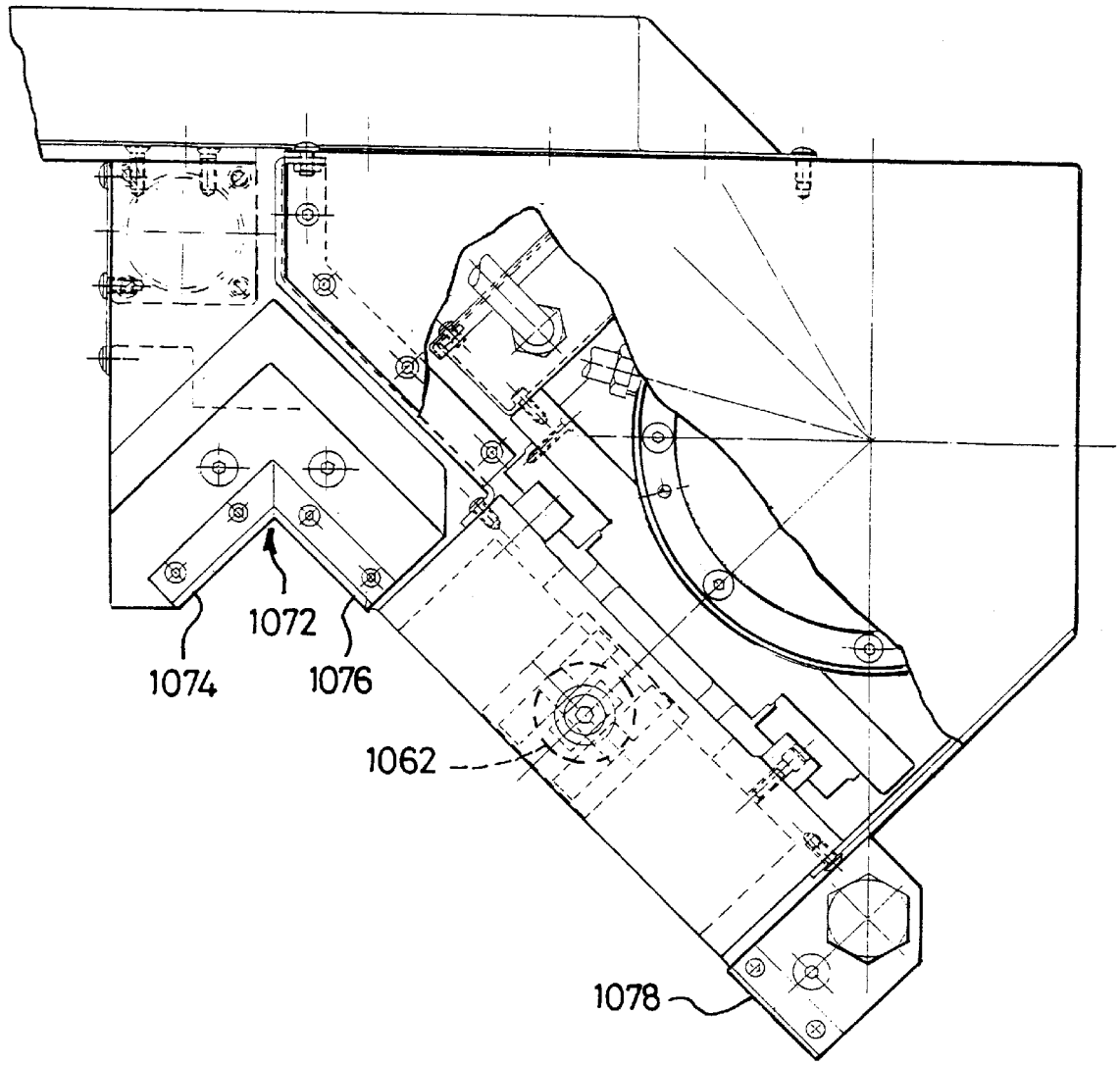

Relative movement of the tailstock assembly is achieved by means of a hydraulic or pneumatic cylinder which is conveniently mounted on the underside of the tailstock casting as shown in FIGS. 43A and 43B.

The pneumatic or hydraulic cylinder is denoted by reference numeral 1062 and this is secured at one end via a pin 1064 and link 1066 to a cross member 1068 of the tailstock casting generally designated 1070 and the other end of the cylinder is attached to the downwardly extending section 1060 of the flange part of the flange bracket 1044 of FIG. 42.

The cylinder is shown in dotted outline in FIG. 43B at 1062 and shows how this and the flange extension 1060 are accommodated within a cut-out region in the casting which is adapted at 1072 to fit over the upper end of the worktable platform. To this end wearing surfaces are mounted at 1074 and 1076 and also at 1078 which engages the lower sliding surface of the slideway of the worktable.

As shown in FIG. 42, the cylinder is in its extended mode so that the tailstock 992 is in its advance workpiece engaging mode.

Retracting the cylinder 1062 retracts the shaft 994 and therefore the tailstock 992 releasing the latter from engagement with the workpiece and allowing the latter to be demounted and replaced by a fresh workpiece for grinding.

Although not shown, the cylinder 1062 may be mounted on the axis of the shaft 994 for greater accuracy. Axial mounting will reduce any tendency for tilting which may arise with the cylinder mounted on the underside of the assembly and acting off centre as shown.

FIG. 44 shows the drillings and ports which supply oil under pressure to the six hydrostatic bearing regions around the shaft 994. One such drilling is denoted by reference numeral 1080 and a second drilling shown in dotted outline at 1082 communicates with the hydrostatic pad for sensing the pressure of oil in the pad.

A similar pair of drillings communicates with each of the pads around the shaft 994 as shown in FIG. 44. Pressure transducers such as 1082 commuted to the ports (in the same way as is described in relation to the headstock hydrostatic bearings) provide signals relating to the disolute pressures in the different pads or the differential pressure s between diametrically opposed pads such as 1083, 1085 in FIG. 44. In this way any out of balance forces in the tailstock hydrostatic bearing can be detected and signals relating thereto (eg from line 1087) can be combined with signals derived from the hydrostatic bearings in the headstock (eg from line 978) to generate a correcting force to be applied to the workpiece via a moveable (ie active) workrest (not shown).

Wheelhead

FIGS. 45 to 47 reveal detail of the platform on which the grinding wheel and drive is to be mounted and which allows the wheel to be advanced and retracted towards and away from the workpiece held between the headstock and tailstock of the worktable previously described.

Grinding wheel 28 is shown in chain dotted outline at the upper end of FIG. 45 which is a cross-section through the table as viewed from the workpiece.

Sliding is effected by mounting the table on two ceramic rails 1082 and 1084 which themselves are carried at the upper ends of elongate struts 1086, 1088 firmly attached at their lower ends to the machine frame 20.

The platform shown in cross-section is generally designated by reference numeral 1090 and is machined on its underside so as to provide hydrostatic pads at 1092 and 1094 in the case of rail 1082 and 1096, 1098, 1100 and 1102 in the case of rail 1084. Drillings such as 1004, 1006 provide oil to the hydrostatic pads 1094 and 1092 while similar drillings 1008, 1110, 1112 and 1114 provide oil to the pads 1096, 1098, 1100, 1102 respectively.

A wheelhead spindle assembly generally designated 1116 is mounted for rotation about a vertical axis 1118 and a wheelhead lift and turn assembly generally designated 1120 is mounted within an aperture in the centre of the casting 1090.

The purpose and operation of the latter will be described with reference to later drawings.

Movement of the table 1090 along the rails 1082, 1084 is effected by rotation of a threaded rod 1122 (see FIG. 46) which runs in a nut assembly on the underside of the table so that rotation of the threaded rod 1122 reflects longitudinal movement of the table 1090. The threaded rod and cooperating nut are formed as a hydrostatic screw.

Also mounted on the table is a measuring system including a grating (to be described) generally designated 1124. The measuring device provides electrical signals indicative of the position of the table relative to a home position so as to allow controlled advance and retraction of the grinding wheel 28.

Services for the wheelhead spindle drive, and other drives on the table are provided via a drag chain 1126 one end of which is attached to the spindle housing and the other end of which is secured to the wheelhead tble 1090. The second drag chain (42 in FIG. 2) carries services from the wheelhead table 1090 to the bed 20.

The spindle drive motor housing 1128 extends on one side of a housing generally designated 1130 on the other end of which protrudes a shaft on which the grinding wheel 28 is mounted.

The housing 1130 is mounted on a generally circular support which is rotatable about the central axis 1118 (see FIG. 45), to allow the angle at which the wheel 28 is presented to the workpiece, to be altered. The circular base is denoted by reference numeral 1132 and an actuator 1134 pivotally mounted in a bracket at 1136 acts through a rod 1138 onto a bracket 1140 so that extension of the actuator produces rotation in a clockwise sense and retraction of the actuator rotation in an opposite sense about the central axis 1118.

An actuator drive typically in the form an electric motor is denoted by reference numeral 1142.

Oil feed to the hydrostatic screw is effected through union 1144.

A cross-section on the line AA of FIG. 46 is shown in FIG. 47. The spindle drive motor is typically electrically powered but with hydrostatic bearings and hot oil from the latter must be collected to a central sump. Since the wheelhead spindle motor 1128 is mounted on a rotatable platform, a mechanism must be provided by which hot oil can return to the sump. This is shown by a pivoting oil duct 1146 which terminates in a top hat rotating seal assembly 1148 which is shown in cross-section in FIG. 47. Hot oil returning along 1146 flows down the central tube 1150 and is directed to the central sump by a drain tube 1152.

The entry port for oil to the hydrostatic bearing shown diagrammatically at 1152 is denoted by reference numeral 1154.

Wheelhead feed

FIGS. 48 to 51 illustrate the hydrostatic drive for advancing and retracting the wheelhead table 1090 of FIG. 45. FIGS. 48 and 49 should be read together since 49 is a continuation to the right hand side of the assembly shown in FIG. 48. Intermediate the extreme ends is a platform generally designated 1156 on which the table 1090 is fitted. The table 1156 is shown in dotted outline in FIG. 45.

The right hand end of the lead screw is held captive in a hydrostatic bearing assembly generally designated 1158 itself mounted on the machine frame 20. Oil for the hydrostatic bearing is supplied via pipes to and from a union generally designated 1160.

The threaded section of the lead screw is denoted by reference numeral 1162 and over its exposed length the lead screw is protected by a telescoping cover generally designated 1164 on the right hand side of the platform 1156 and by a similar telescoping cover 1166 on the left hand side of the platform 1156.

The lead screw runs in a hydrostatic nut below the platform 1156.

The drive for the lead screw is a brushless electric motor generally designated 1168 the rotor 1170 of which is axially clamped to the shaft 1175 and the stator windings and stator of which is generally designated 1172 are cooled using a helical passage for cooling water or oil 1174 as previously described in relation to the other electrically powered hydrostatic drives.

The shaft 1175 is supported in a hydrostatic journal bearing at 1176 and includes an enlarged diameter annular section 1178 which together with cooperating hydrostatic pads forms a hydrostatic thrust bearing. Oil for the hydrostatic pads of the journal bearing is provided via drillings 1180 and 1182 while that for the pads of the thrust bearing via drillings 1184 and 1186.

An air purge labyrinth seal is provided at 1188.

Seals are provided at 1190 and 1192 to ensure that there is no possibility of oil leaking into the section containing the motor windings.

Beyond the motor is a lockout 1194 to axialy secure the motor and a tacho generator unit is driven by drive pins a shaft extension 11967 secured by clamp screws 1196 to the end of the shaft 1175. Beyond the tacho generator is mounted a balancing ring 1198 in which grub screws or the like can be fitted so as to balance the assembly and beyond it is a resolver unit 1200 which commutates the brushless motor. The shaft extension is of considerably reduced diameter in the region of the resolver and extends to the left where it is contacted by earthing brushes 1202 and 1204.

FIG. 51 is a cross-section on the line XX of FIG. 48 and shows the drillings which provide oil under pressure to the four hydrostatic pads 1206, 1208, 1210 and 1212. A second drilling communicating with such pad as shown in FIG. 48 permits the oil pressure in each pad to be monitored.

Wheeldrive

FIGS. 52 to 54 illustrate the hydrostatic drive for the grinding wheel.

The wheel is shown at 28 and detail of the mounting of the wheel can be obtained from FIG. 53. The wheel is mounted on a hub 1214 which is secured to the main driving hub 1216 by means of bolts one of which is shown at 1218.

The wheel is secured to an outer flange of the hub 1214 by means of bolts 1220 which are preferably formed from nylon or a similar plastics material.

Additionally the radial and axial surfaces of the hub 1214 at 1222 and 1224 are lined with a ceramic film so as to electrically isolate the wheel 28 from the conductive material of the hub 1214 and the mating radial face of the driving hub 1216 is also lined with a ceramic film at 1226 to electrically isolate the wheel 28 from that component also.

The driving hub is keyed to a tapered end to the main drive shaft 1228. A key is shown at 1230 and a central securing bolt is shown at 1232 which retains the main driving hub in position.

Tapped drillings at 1234 and 1236 enable grub screws to be inserted for balancing.

A labyrinth type seal is formed on the inside surface of the hub 1216 so that the ingress of dirt and moisture to the main shaft 1228 is largely prevented.

A first hydrostatic bearing is arranged in the region designated by reference numeral 1238 and a second hydrostatic bearing is arranged in the region of the reference numeral 1240. Drillings for supplying oil to the various pads around the shaft 1228 are provided in the casting and are shown in hidden detail in respect of the bearing 1238.

Beyond the second hyrostatic bearing 1240, seals are arranged at 1242 and 1244 (see FIG. 52) to prevent oil seeping into the electric motor section.

The electric motor comprises the rotor 1246 clamped to the shaft 1248 and a stator and stator winding generally designated 1248 cooled by a helical coolant fluid path 1250.

Beyond the motor the shaft is continued with reduced diameter through and drives a resolver which commutates the brushless motor. The resolver is generally designated by reference numeral 1252. Earthing brushes at 1254 and 1256 ensure that the shaft is earthed.

A balancing ring containing tapped drillings to receive grubscrews is provided at 1258.

A sensor is located at the extreme left hand end of the shaft 1228 which is generally designated 1260. The sensor is adapted to sense the first touch between the grinding wheel and a workpiece and to generate an electrical signal indicating that the workpiece has been engaged. A suitable sensor is one manufactured by Dittel and which involves the use of a piezo-electric stack.

In order to reduce electromagnetic interference with the resolver, a mu-metal screen 1262 is provided between the motor and the resolver.

In FIG. 54 which is a cross-section on the line AA in FIG. 53, the drillings for supplying oil to the six different hydrostatic pads around the shaft 1228, are shown. Oil is supplied to the various drillings to galleries and manifolds in and surrounding the housing 1264.

X-axis measurement

The position of the wheelhead table and therefore the wheel in relation to the rest of the machine (the X-axis) is determined by means of a grating and optical reading head details of which are found in FIGS. 55 to 57. Mounted on the wheelhead table is a scale 1266 whilst attached to the machine frame 20 is a reading head 1268. As the table moves backwards and forwards so the scale 1266 moves relative to the reading head 1268 and the latter produces electrical pulses corresponding to the gratings seen by the head. The signals may be decoded and used to determine the precise position of the table relative to the frame 20.

As best seen in FIG. 57, a proximity switch 1270 is mounted on a frame best seen in FIG. 55, and identified by reference numeral 1272. The switch is tripped as a metal bracket 1274 moves past the switch as the table approaches its rearmost position. The latter is determined when the microswitch 1276 is operated by a cam 1278. Forward movement of the table eventually brings a second cam 1280 into contact with a second microswitch 1282 denoting the maximum forward movement of the table.

Lifting and indexing of wheelhead (i) Lifting

FIG. 58 shows details of the wheelhead lift and indexing mechanism item 1120 of FIG. 45. The mechanism is intended to elevate the wheelhead assembly 1116 to a sufficient amount to disengage teeth of two gear tooth rings so as to enable the actuator 1134 of FIG. 46 to rotate the wheelhead assembly 1116 about the axis 1118 in FIG. 45. After the desired rotation has been achieved, the mechanism 1120 of FIG. 58 allows the wheelhead assembly 1116 to drop so that the teeth once again engage to hold and lock the wheelhead assembly 1116 in position.

Referring to FIG. 58, the unit 1120 is located within a cylindrical aperture 1284 situated centrally within the table 1090. The unit comprises a generally cylindrical housing having a composite vertical cylindrical bore 1286 within which is located and is slidable a cylindrical member 1288. The lower end of the member 1288 carries a piston 1290 which is sealingly engaged on both its inner and outer diameters with the member 1288 at 1292 and with the cylindrical wall 1294 by a seal 1296. The piston is displaceable vertically from the position shown by introducing oil through a connection 1298 and internal drillings 1300 into the compartment 1302 below the piston. The elevation of the piston causes the member 1288 to rise and to lift with it the platform 1116 carried at its upper end.

In order to provide for rotation of 1116 relative to the member 1288, a roller bearing assembly 1304 is situated between the upper end of the cylindrical member 1288 and the internal cylindrical aperture in the platform at the lower end of the wheelhead assembly 1116.

The weight of the wheelhead assembly is taken by means of a thrust bearing 1306 located between the underside of the platform at the lower end of the wheelhead assembly 1116 and an annular ring 1308 located around the upper end of the cylindrical member 1288. The flat underside of the annlar member 1308 is provided with an annular flat bearing surface 1310 which is a clearance fit from a machined surface on a ring member 1314 itself secured to the underside of the platform at the base of the head assembly 1116 by means of threaded studs 1316.

The underside of the platform 1116 is formed with a ring of gear teeth which engage complimentary teeth formed in a corresponding ring on the top side of the metal casting of item 1090. The teeth are formed on two annular ring members 1318 and 1320 respectively, the former being attached by means of pins 1322 to the underside of the wheelhead assembly 1116 and the latter (ring 1320) being attached by means of pins 1324 to the upper surface of casting 1090.

The pitch of the teeth is selected so as to be sufficiently fine to enable indexing of the unit 1116 relative to 1090 by sufficiently small steps.

In use oil is pumped through 1298 into the chamber 1302 to elevate the piston 1290 and the cylindrical member 1288 so as to lift 1116 so that the teeth on ring 1318 are clear of the teeth on the ring 1320. In this condition the actuator 1134 (FIG. 46) can be used to rotate wheelhead assembly 1116 through the desired arc and thereafter oil is released from the chamber 1302 via pipe connection 1326 enabling the piston 1290 to drop and thereby allowing the unit 1116 likewise to drop causing the teeth on ring 1318 to once again engage the teeth on 1320 thereby preventing continued rotation of the unit 1116.

(ii) Indexing mechanism

FIGS. 59 and 60 provide detail of the actuator for rotating the wheelhead assembly 1116.

The actuator selected is a rotary screw and nut device previously described with reference to FIG. 46 and is identified by reference numeral 1134. An electric motor drive 1142 rotates the device so as to extend or retract rod 1138 which is attached to a driving block 1328 mounted for rotation about a cylindrical pin 1330 which is rotatable and slidable up and down a cylindrical hole 1332 which is formed in the mounting plate 1334 on which the wheelhead assembly is mounted.

Lifting of the assembly 1116 results in plate 1334 being raised which allows the rod 1330 to drop under the action of a spring 1331 located at the upper end of the rod 1330. This causes a tapered section of the rod 1336 to engage a tapered wall section of the aperture through which the rod 1330 passes in the block 1328. By providing the tapered shaft and aperture and providing for disengagement except when drive is to be transmitted to the table, effective decoupling between the drive and the table is effected except when the drive is to move the table.

Diameter measurement

FIG. 61 shows in side elevation one of two diameter controlling guages which are adapted to be mounted on the worktable in between the headstock and tailstock. To this end each guage includes a base 1340 with clamping means generally designated 1342 by which the base can be clamped to the slideway of the worktable 638. Secured to the upper end of the base is a Movomatic guage generally designated 1344 having upper and lower finger assemblies 1346 and 1348 respectively which are movable to engage a workpiece and determine the diameter thereof. The guage is a proprietary item and services therefore as recommended by the manufacturer are provides by means of cables and pipes generally designated 1350.

Wheel guard

FIGS. 62 to 65 provide details of the wheelguard assembly. Essentially this comprises a narrow generally rectangular housing generally designated 1352 which is adapted to be fitted to the table on which the grinding wheel is mounted and which includes a door 1354 hinged at 1356 and 1358 to the remainder of the housing to provide said access to the wheel for mounting and demounting wheels.

The front of the housing is generally open but an adjustable cover 1360 is hinged at 1362 and is adjustable relative to the remainder of the housing by a nut and screw arrangement generally designated 1364 by rotation of a nut 1366. Rotation of the latter adjusts the angle of the cover 1360 and allows the cover to be set to a minimum distance from the edge of the wheel shown in dotted outline at 20.

The wheel 28 is shown in FIG. 63 from which it will be seen how the cover 1360 extends down over part of the circumference of the wheel.

FIGS. 64 and 65 show how coolant fluid can be applied to the edge of the wheel just below the lower end of the cover 1360. To this end a bracket 1368 is attached to the left hand side of the cover 1360 as viewed in FIG. 63, to provide a mounting for a pipe 1370 extending from a pump (not shown). The pipe 1370 is bent around at 1372 and includes a pivotable union 1374 to allow a lower section of pipe 1376 to be angularly adjustable from the position shown at 1376 in FIG. 64 outwardly to the position shown at 1378 and inwardly to the position shown at 1380 and all intermediate positions therebetween so that the lower end of the pipe 1376 can be positioned at precisely the required distance from the edge of a grinding wheel 28. The curved outline of the wheel 28 is typical of the size of a grinding wheel in the context of the machine and the adjoining circular outline 1382 is intended to show the maximum diameter of a workpiece suitable for mounting on the machine.

FIG. 65 provides detail of the bracket 1370 and pivotable union 1374.

The lower end of the tube 1376 is provided with an adaptor plate 1384 to which a jet or spray nozzle can be attached to provide the requisite spray pattern for coolant fluid pumped via the pipe 1370 to be sprayed onto the edge of the rotating grinding wheel 28 via the nozzle at the lower end of the tube 1376 just ahead of the point of engagement between the grinding wheel and the workpiece.

Wheel forming unit

As described with reference to FIGS. 1 to 4, a wheel forming unit is mounted above the headstock housing 22 of FIG. 2 and is contained in the housing 36. The unit is provided so as to dress and form a diamond wheel identified by reference numeral 29 in FIG. 2 and by reference numeral 952 in FIGS. 38 and 41 which is mounted on the headstock assembly 950 (see FIG. 38). The wheel 29 is used to dress the grinding wheel 28 as required.

The external periphery of the diamond wheel 29 occasionally needs to be formed and to this end an EDM forming wheel 1386 is mounted above the diamond wheel 29 (shown in dotted outline in FIG. 66) and can be lowered into contact with the diamond wheel 29 by means of a feed and retract mechanism generally designated 1388. The latter is mounted on the front face of a triangular frame 1390 which is carried on a slideway generally designated 1392 for movement axis of rotation of the headstock and therefore workpiece. Rotation of a handle 1394 at the rear of the frame 1390, allows the frame to be moved along the slideway 1392 so as to enable the EDM wheel 1386 to be positioned over the diamond wheel 29, or retracted to the left, as shown in FIG. 6, back to the position shown in dotted outline at 1396, so that the wheel is well clear of the diamond wheel 29. This enables the worktable to be moved to the right to bring the diamond wheel 29 into registry with the grinding wheel 28.

Services for the advance and retract mechanism 1388 are conveyed via a flexible umbilical 1398 from a fixed termination 1400 to a termination 1402 mounted on the frame 1390.

Microswitch 1404 cooperates with a ramp and cam 1406 to provide an electrical interlock. This ensures that the worktable cannot be moved to the right unless the microswitch 1404 has been operated by the cam 1406 which only occurs when the frame 1390 and wheel 1386 have been withdrawn fully to the left hand side of FIG. 6 leaving the diamond wheel 29 clear.

FIG. 67 (which is an end elevation view of the assembly of FIG. 66) shows the headstock mounting block 22 and diamond wheel 29 and EDM forming wheel 1386. The height controlling mechanism 1388 may conveniently include a Mahr type 1300 probe and a servo drive whereby the EDM wheel 1386 can be raised and lowered.

An earthing cable 1408 connects the wheel 1386 to the machine bed.

Dressing of grinding wheel

Electrolytic wheel dressing of the grinding wheel 28 is preferred and reference has already been made to the mounting of an appropriate unit at 37 on the cover 30 for the grinding wheel 28. Detail of the electrolytic dressing device is shown in FIG. 68. Electrolyte is supplied to a manifold 1410 for supply via pipe 1412 from one side of the unit to the other. Drillings within the housing convey the liquid electrolyte to a pair of drillings at 1414 and 1416. These exit into a curve channel between a pair of electrodes one of which is shown at 1418 for locating on one side of the grinding wheel and the other behind 1418 and hidden from view but of similar configuration for locating on the other side of the grinding wheel. The curved profile inside the two electrodes shown at 1420 is adjusted to the radius of the wheel.

In use the unit is adjusted so as to provide just the right clearance between the curved surface 1420 and the internal side cheeks of the two electrodes of which one is shown at 1418 and the wheel (not shown in FIG. 68) and to this end a knurled knob 1422 is provided for adjusting the radial spacing and two knurled knobs 1424 and 1426 respectively provide for lateral adjustment of the two electrodes.

The unit is secured to the wheelguard 1352 shown in FIG. 62 and the cutaway region 1428 shown in FIG. 62 serves to accommodate the rear mounting bracket 1430 shown in FIG. 68. The upper face of the wheelguard 1352 is cut away to accommodate the electrodes and the unit is secured at its front end to an uncut away section of the wheelguard 1352 by means of fixing nut 1432.

Shoulder measurement

FIG. 69 provides detail of the shoulder touch probe which can be provided for measuring radial shoulders ground on the workpiece. The probe is adapted to be mounted on the wheelhead table and comprises an arcuate arm 1434 pivotable about a vertical axis 1436 by means of a hinge joint generally designated 1438 and about a horizontal axis 1440 by means of a motor 1442. The latter is carried by a bracket 1444 which is mounted on the wheelhead table 1446.

The arm 1434 can be swung from the operating position in which it is shown in FIG. 69 upwards through approximately 120° to occupy an elevated parked position shown partly in dotted outline at 1448. Normally, the probe will occupy the position shown at 1448 during grinding but afer a shoulder has been ground and the shoulder is to be checked, the grinding wheel is retracted, the probe arm 1434 is rotated down into the position shown in FIG. 69 and the worktable shifted until the probe makes contact with the radial shoulder which has been ground.

The actual sensing part of the probe comprises a finger 1450 pivotally mounted about an axis 1452 at the end of an arm 1454. Electrical connection to the probe 1450 is made via a cable 1456.

An end of travel stop 1458 is mounted on the front face of the wheelhead table and an adjustable stop is provided at 1460 so that the lower position of the arm 1434 can be adjusted during the setting up of the machine so that the probe finger 1450 protrudes upwardly.

Except for the pivoting about the horizontal axis 1440, the pivoting about the vertical axis 1436 and the pivoting of the finger 1450 about the vertical axis 1452 is resisted using centering spring means, or the like, so that resistance is needed to urge the pivotable component out of in-line alignment.

Active worksteady

During grinding, the force between the wheel 28 and the workpiece 30 can result in a deflection of the workpiece which can result in grinding inaccuracies. It is known to provide a worksteady or workrest which abuts the workpiece generally opposite the point of engagement between the wheel and the workpiece, and which is mounted in a manner which will resist any deflection of the workpiece.

FIG. 70 shows an improved worksteady generally designated 1462 comprising a table 1464 mounted on the worktable and provided with a workpiece engaging probe assembly 1468 which is moveable by a coarse drive comprising an electric motor and ball screw 1470, and by a fine drive comprising one or more piezo cells such as 1472. In use the probe 1468 is driven towards the workpiece by a motor driven ball screw 1470 until it is within 20–30 microns of the workpiece whereafter continued advancement of the probe table 1462 is inhibited by operation of a hydraulic clamp 1474. The probe assembly is engageable with the workpiece by expansion of the piezo cell 1472 by the application of an appropriate voltage to the cell, which is just sufficient to move the probe means 1468 into contact with the workpiece 30 so as to exert thereon a force equal and opposite to that exerted by the grinding wheel 28.

The probe assembly conveniently comprises two shoes each of which is independently movable by means of an associated piezo cell. The two shoes are and arranged above and below a plane containing the grinding wheel and workpiece axes, the grinding plane, in two planes equally inclined above and below the said grinding plane, and convergent on and intersecting the workpiece axis.

If appropriate equal voltages are applied to the two piezo cells, the two cells exert the same force on the workpiece, albeit from two convergent directions, and the resultant force is the sum of the two forces exerted by the two shoes on the workpiece.

If the direction in which the worksteady force is to be applied is coplanar with the grinding plane, equal voltages are applied to the two piezo cells.

If the direction in which the worksteady force is to be applied is not coplanar with the grinding plane, the appropriate tilting of the direction of the force is achieved by altering the relative magnitudes of the voltages applied to the piezo cells.

The magnitude and direction of the force to be applied is determined by the CPE controller 248 (see FIG. 7), from signals supplied from the headstock and tailstock pressure transducers, such as 978 in the case of the headstock and 1082 in the case of the tailstock. Signals are supplied via lines 1478 and 1480 to headstock force computing circuit 1482 and tailstock force computing 1484 respectively. Signals may be supplied from each of six transducers around each bearing in each of the headstock and tailstock. In this event, difference signals are computed within the units 1482 and 1484. Alternatively differential transducers may be used to produce difference signals for each of the three pairs of pads in each of the bearings in which event the units 1482 and 1484 serve to process these difference signals into a resultant signal for each of the headstock and tailstock.

The central controller 248 determines the magnitude and direction of the resultant of the two forces acting on the headstock and tailstock and in turn computes the forces needed to be applied via the upper and lower shoes of the probe assembly 1468, to counteract the forces exerted at the headstock and tailstock by the engagement of the grinding wheel with the workpiece.

Control signals for the motor 1462 and hydraulic clamp 1474 are derived by motor drive circuit 1486 and solenoid valve assembly 1488 respectively and electrical signals for extending the piezo cells such as 1472 are derived by the control circuit 1490.

Typically the two shoes subtend an angle of at least 60° (ie 30° above and 30° below the grinding plane) and conveniently the angle subtended is 90°, ie 45° above and below the grinding plane.

Correction of X-axis movement of the workpiece due to Z-axis imperfections

Correction of errors arising during Z-axis movement of the worktable and caused for example by yaw and/or roll of the worktable can be corrected by moving the wheelhead along the X-axis by an appropriate amount.

The worktable slides on a slideway and during setting up of the machine it is necessary to ensure that the worktable travel is orthogonal to the wheelfeed direction of movement by adjustment of the ceramic blocks forming the worktable slideways.

Use of straight edge on worktable

As shown in FIGS. 23A/B in this machine a conductive straight edge (660, 714) is mounted on the worktable to co-act with a conductive probe (710) forming with the straight edge a capacitance, the value of which will be dependent on the precise distance between the probe and the conductive surface 714 of the straight edge.

As a first approximation the latter can be assumed to be perfectly flat and straight. By setting it up on the worktable so as to be parallel to the worktable traverse (the Z-axis) using the adjustments provided such as 770 (see FIG. 22), the capacitance value should not vary as the table is moved from one end of its traverse to the other. (In fact at sub micron levels this is impossible to achieve but the variation in capacitance due to non parallelism will be linear and can be identified and corrected for, see below). Fine adjustments can be made by adjusting 770. Disregarding the linear variations, any other variation of capacitance noted with movement of the table along the Z-axis (assuming the straight edge is flat) can be attributed to Z-axis/table mounting imperfections yaw and/or roll and will need to be corrected. This is achieved by generating an error signal equal to the variation of capacitance from the "normal" constant value, and adjusting for example the X-axis demand signal or the X-axis encoder signal to take account of the error signal.

Referring to the schematic circuit diagrams of FIGS. 71 and 72, control of the wheelfeed is achieved by indicating the X-axis position required of the wheel and subtracting from this the X-axis position as determined by the X-axis encoder (ie the optical reading head and scale mounted on the wheelhead table see FIGS. 55 to 58) in device 1500. If there is any difference between the two X values, an error signal is generated, enabling the X-axis wheelfeed drive 1168 (FIG. 48) until the error signal is reduced to zero, at which the wheelfeed stops. To this end FIGS. 71 and 72 show the output of amplifier 1504 supplying an input to the X-axis drive measure 1168 which drives table 1090 and scale 1266 past the reading head 1268 (see FIG. 56). A feedback amplfier 1269 is also shown.

The introduction of the capacitance guage error signal is achieved by introducing a further adding device 1502 between the drive 1500 and the servo amplifier 1504. The basic position error signal from 1500 is supplied together with the error signal derived from the capacitance guage to the device 1502. If the capacitance guage signal is non-zero, then the X-axis drive 1168 (FIG. 48) will be enabled until the X-axis encoder reading (the reading head and scale on the wheelhead table see FIGS. 55 to 57), produces a position error signal of sufficient magnitude and sign so as to cancel out the capacitance guage error signal, so terminating the wheelfeed drive once again.

By allowing this to happen in real time, so the wheelfeed will be enabled to incrementally adjust the wheelhead position along the X-axis to take account of any capacitance guage error signals.

Typically the capacitance guage is read at regularly spaced intervals of time and the input to 1502 updated accordingly.

FIG. 72 is different from FIG. 71 in that it is the X-position encoder signal which is modified by the error signals before being combined in 1500 with the X-axis demand signal. The net effect is the same as the arrangement shown in FIG. 71 and it is merely drawn in this way to show the alternative way of handling the error signals.

The device 1516 may be a processor set to process Z-axis values in real time to produce the corresponding values of dx using the algorithm, for supply as error signals to adding device 1514.

The device 1514 thus serves to compensate for any non parallelism of the workpiece and worktable travel.

Misalignment (non-paralellism) of the reference straight edge

Any "linear" variation of capacitance reading from the capacitance guage for different values of Z can be compensated for by adjusting the algorithm to include this variation as well as the linear variation due to workpiece misalignment (already dealt with). Alternatively a further look-up memory 1520 may be used (or a processor with another algorithm) to generate error sianals for supply to another adding device 1522 in the line 1524 from device 1516 leading to the adding stage 1514. Alternatively 1522 could be located in the feedback path 1518 leading from 1269 to 1514 so that like the other devices it is also in series with the feedback path.

As with the circuit change between FIGS. 71 and 72, the alternative arrangement is shown merely to indicate how error signals can be combined before they are used to effect the return signal or can each individually be used to effect the return signal. The net effect is the same.

Calibration of reference straight edge

Flatness/straightness of the reference straight edge may be measured against a standard and set of calibration values relative to length obtained and stored.

Alternatively the capacitance guage in the machine may be used to measure the capacitance variation as the table is traversed and the values plotted against the Z displacement. If the reference straight edge is then removed and rotated through 180° so that the conductive strip is now facing the grinding wheel instead of the probe, and the straight edge is then refitted to the worktable, it is possible to again measure the capacitance variation as the table is traversed by extending the capacitance probe using an appropriate bracket so as to reach over the top of the reference straight edge so that the conductive electrode is spaced from the conductive strip which is now facing the grinding wheel. Since it is important that the height at which the measurement is made is constant, shins or spacers will be needed to lift the straight edge relative to the worktable when the straight edge has been rotated as described so that the conductive strip is again at the same height as it is when the reference straight edge is normally mounted on the worktable as shown in the drawings.

Traversing the table in the same way as before allows a set of capacitance values to be obtained and these again are plotted on a graph.

The two plots will both start at 00 and will show a general drift away from the X-axis of the graph (which corresponds to the Z-displacements) since the linear variation of capacitance due to non-paralellism of the straight edge relative to the worktable line of traverse will tend to generally increase or generally decrease the capacitance value. Any variation relative to the straight line drift will be brought about either as a result of inaccuracies in the worktable travel or due to variation in the surface of the conductive strip.

The two plots need to be normalised and this is achieved by simply drawing a straight line on each graph from the 00 point to the last plotted value of capacitance. The values of capacitance above or below the line represent the actual variations of capacitance disregarding the drift due to non-parallelism.

By adding the normalised plotted values for corresponding Z-axis displacement and dividing by 2, a true value of capacitance will be obtained for each Z-axis displacement.

Comparison of those values with the reference capacitance value (using a bridge or the like device) allows the actual capacitance variation to be determined relating to the straight edge non-flatness. These values may then be stored in the memory such as 1520.

We claim:

1. A grinding machine comprising:
   (a) a machine frame;
   (b) a workpiece carrier carried by said machine frame;
   (c) a headstock carried by said workpiece carrier and including a headstock drive;
   (d) a tailstock carried by said workpiece carrier;
   (e) said headstock and said tailstock being carried by said workpiece carrier for co-action with each other to mount therebetween a workpiece for machining and to drive such a workpiece about a predetermined work axis;
   (f) a grinding wheel carried by said machine frame for movement towards and away from said work axis and so as to co-act with a workpiece when disposed thereat to grind the workpiece,
   (g) a drive for said grinding wheel;
   (h) control means for controlling said headstock drive, and said grinding wheel to effect grinding of predetermined forms; and
   (i) further drive means associated with said tailstock for rotating a workpiece in synchronism with said headstock drive and so that no torque is developed across the workpiece;
   (j) said controll means also controlling said tailstock drive;
   (k) each said headstock drive, said tailstock drive and said grinding wheel drive including a transducer means for generating position and speed of rotation signals for use by said control means when effecting said control of said headstock drive, said tailstock drive and said grinding wheel drive, to enable grinding of predetermined forms with high accuracy.

2. A grinding machine according to claim 1 wherein said workpiece carrier includes a worktable movable relative to said machine frame along a linear path, and in which a further transducer means is provided for generating a position signal for said worktable.

3. A grinding machine as claimed in claim 2 wherein said transducer means for generating a position signal for said worktable along said linear path comprises a linear scale and a reading head associated therewith.

4. A grinding machine as claimed in claim 2 wherein said transducer means for generating a position signal for said grinding wheel comprises a linear scale and an optical reading head associated therewith.

5. A grinding machine as claimed in claim 2 wherein said transducer means associated with said rotational drives, particularly said headstock drive comprises a tachometer.

6. A grinding machine as claimed in claim 2 further comprising means for detecting any shift in the position of said worktable in a direction perpendicular to the direction of said linear path thereof and produced by either yaw or roll of the worktable, together with means for associating any such detected shift with a measurement of the position of said wheelhead in the same direction so as to compensate for lateral shift produced by either yaw or roll of said worktable and enable said drive to said wheelhead to be adjusted thereby to position said wheelhead so as to take any such shift into account.

7. The machine tool of claim 1, wherein said predetermined forms are relatively complex in configuration.

8. The machine tool of claim 7, wherein said predetermined forms include spirals, tapered spirals and the like.

9. The machine tool of claim 8, wherein said worktool is a grinding wheel and wherein said worktool drive effects rotation of said grinding wheel about a grinding wheel axis of rotation.

* * * * *